US011140924B1

(12) United States Patent
Bajpai et al.

(10) Patent No.: US 11,140,924 B1
(45) Date of Patent: *Oct. 12, 2021

(54) PORTABLE ELECTRONIC VAPORIZING DEVICE

(71) Applicant: Puff Corporation, Los Angeles, CA (US)

(72) Inventors: Avinash Bajpai, La Crescenta, CA (US); Siddhant Waghmare, Los Angeles, CA (US); Douglas Brunner, Pasadena, CA (US); Todd Watanabe, Rowland Heights, CA (US); Matthew Kozak, Orange, CA (US); Roger Volodarsky, Los Angeles, CA (US)

(73) Assignee: Puff Corporation, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/315,471

(22) Filed: May 10, 2021

Related U.S. Application Data

(63) Continuation of application No. 17/133,008, filed on Dec. 23, 2020, now Pat. No. 11,000,067.

(60) Provisional application No. 63/087,348, filed on Oct. 5, 2020.

(51) Int. Cl.
*A24F 13/00* (2006.01)
*A24F 40/90* (2020.01)
*H02J 50/10* (2016.01)
*A24F 40/51* (2020.01)
*A24F 40/465* (2020.01)

(52) U.S. Cl.
CPC ............ *A24F 40/90* (2020.01); *A24F 40/465* (2020.01); *A24F 40/51* (2020.01); *H02J 50/10* (2016.02)

(58) Field of Classification Search
CPC ...................................... A24F 47/00
USPC ............................... 131/328–329
See application file for complete search history.

(56) References Cited

U.S. PATENT DOCUMENTS

| | | |
|---|---|---|
| D232,355 S | 8/1974 | Wiedmann |
| D244,555 S | 5/1977 | Wiedmann |
| D246,600 S | 12/1977 | Kurata |
| D306,478 S | 3/1990 | von Philipp |
| 4,960,206 A | 10/1990 | Johannes |
| D413,172 S | 8/1999 | Belschner |
| D427,691 S | 7/2000 | Asselta |
| D445,493 S | 7/2001 | Nystrom |
| D458,639 S | 6/2002 | Anderson |
| D460,545 S | 7/2002 | Hautmann |
| D465,031 S | 10/2002 | Lodge |
| D470,235 S | 2/2003 | Kumar |
| D508,458 S | 8/2005 | Solland et al. |
| D536,434 S | 2/2007 | DongSheng |
| D543,312 S | 5/2007 | Guan |
| D553,122 S | 10/2007 | Solland |
| D558,193 S | 12/2007 | Ju |
| D581,035 S | 11/2008 | Conway |
| D581,905 S | 12/2008 | Solland |
| D588,687 S | 3/2009 | Drucker |
| D597,191 S | 7/2009 | Colombo |
| D605,303 S | 12/2009 | Monks |
| D608,879 S | 1/2010 | Colombo |
| D613,389 S | 4/2010 | Jorgensen |
| D613,390 S | 4/2010 | Jorgensen |
| D613,624 S | 4/2010 | Bodum |
| D634,832 S | 3/2011 | Abbondanzio |
| D652,571 S | 1/2012 | Shenassa et al. |
| 8,179,245 B2 | 5/2012 | Chander et al. |
| D661,827 S | 6/2012 | Moetteli |
| 8,294,300 B2 | 10/2012 | Cook et al. |
| D670,578 S | 11/2012 | Perry |
| D674,892 S | 1/2013 | Denton |
| D675,308 S | 1/2013 | Freeborn |
| D702,090 S | 4/2014 | Hogg |
| D706,212 S | 6/2014 | Zwierstra et al. |
| D709,624 S | 7/2014 | Baum |
| D713,100 S | 9/2014 | Salgueiro |
| D720,064 S | 12/2014 | Li |
| D724,264 S | 3/2015 | Chambers |
| D724,779 S | 3/2015 | Liu |
| D728,155 S | 4/2015 | Liu |
| D728,382 S | 5/2015 | Goswell |
| D752,278 S | 3/2016 | Verleur |
| D752,279 S | 3/2016 | Liu |
| D752,280 S | 3/2016 | Verleur |
| D757,647 S | 5/2016 | Engel |

(Continued)

FOREIGN PATENT DOCUMENTS

BR          DI6002906         3/2002
CN          303259701         6/2015
(Continued)

OTHER PUBLICATIONS

Puffco Peak web page located at planetvape.ca 2019.
Puff Co., Peak Atomizer Assembly posted on Instagram retrieved from www.instagram.com/p/BfMk5MKIBp1/ Feb. 14, 2018.
Puff Co., Peak Video posted on Instagram retrieved from www.instagram.com/p/Bd-oaEkFrXC/ Jan. 15, 2018.
Puff Co. Glass Attachment Video posted on Instagram retreived from www.instagram.com/p/Bd3DfMRIWLo/ Jan. 12, 2018.
Puff Co., Puffco Peak Case posted on Instagram retrieved from www.instagram.com/p/Bd027vflYzM/ Jan. 11, 2018.

(Continued)

*Primary Examiner* — Phuong K Dinh
(74) *Attorney, Agent, or Firm* — Bryan Cave Leighton Paisner LLP

(57) ABSTRACT

The present invention relates to a battery-powered wireless charging station for charging an electronic device, and including a wireless charging station sensor configured to detect a predetermined spatial relationship between a wireless charge receiving system of the electronic device and a wireless charge providing system of the wireless charging station.

28 Claims, 41 Drawing Sheets

(56) References Cited

U.S. PATENT DOCUMENTS

| | | |
|---|---|---|
| D757,996 S | 5/2016 | Hua |
| D769,519 S | 10/2016 | Chen |
| D772,478 S | 11/2016 | Liu |
| D774,247 S | 12/2016 | Chen |
| D778,460 S | 2/2017 | Marechal |
| D789,374 S | 6/2017 | King |
| D790,122 S | 6/2017 | Hawes |
| D792,645 S | 7/2017 | Fornarelli |
| D796,433 S | 9/2017 | Langhammer et al. |
| D800,383 S | 10/2017 | Verleur |
| D801,545 S | 10/2017 | Wiesli |
| D802,839 S | 11/2017 | Scott |
| D806,941 S | 1/2018 | Hawes |
| D809,190 S | 1/2018 | Schuler |
| D810,015 S | 2/2018 | Carreon et al. |
| D810,680 S | 2/2018 | Carreon et al. |
| D811,931 S | 3/2018 | Yu |
| D812,736 S | 3/2018 | Parker |
| D813,448 S | 3/2018 | Servutas |
| D814,103 S | 3/2018 | Levinson |
| D818,638 S | 5/2018 | Wright |
| D821,641 S | 6/2018 | Watson |
| D823,534 S | 7/2018 | Chen |
| D824,586 S | 7/2018 | Fornarelli |
| D825,844 S | 8/2018 | Verleur et al. |
| D827,149 S | 8/2018 | Self |
| D827,152 S | 8/2018 | Ou |
| D828,623 S | 9/2018 | Fornarelli |
| D830,536 S | 10/2018 | White |
| D833,030 S | 11/2018 | Sasano |
| D837,999 S | 1/2019 | Sasano |
| D839,446 S | 1/2019 | Sasano |
| 10,211,658 B2 | 2/2019 | Bonwit et al. |
| D844,441 S | 4/2019 | DeMarco |
| D847,419 S | 4/2019 | Hawes |
| D848,673 S | 5/2019 | Xu |
| D849,318 S | 5/2019 | Deng et al. |
| 10,321,714 B1 | 6/2019 | Kane |
| D867,657 S | 11/2019 | Fornarelli |
| D870,375 S | 12/2019 | Patil |
| 10,517,334 B1 | 12/2019 | Volodarsky et al. |
| D873,831 S | 1/2020 | DePaolo et al. |
| D875,676 S | 2/2020 | Segev |
| D892,043 S | 8/2020 | Raghunathan |
| D897,282 S | 9/2020 | Ye et al. |
| 11,000,067 B1 * | 5/2021 | Bajpai ............ H02J 50/10 |
| 2009/0071481 A1 | 3/2009 | Fishman |
| 2010/0104993 A1 | 4/2010 | Ryser |
| 2013/0319437 A1 | 12/2013 | Liu |
| 2014/0083441 A1 | 3/2014 | Kaplani |
| 2014/0290677 A1 | 10/2014 | Liu |
| 2015/0015182 A1 | 1/2015 | Brandtman et al. |
| 2015/0122275 A1 | 5/2015 | Wu |
| 2015/0165137 A1 | 6/2015 | Mullinger et al. |
| 2015/0188339 A1 | 7/2015 | Green et al. |
| 2015/0257444 A1 | 9/2015 | Chung |
| 2015/0320116 A1 | 11/2015 | Bleloch |
| 2016/0015082 A1 | 1/2016 | Liu |
| 2016/0219937 A1 | 8/2016 | Rado |
| 2016/0302486 A1 | 10/2016 | Eroch |
| 2016/0366936 A1 | 12/2016 | Liu |
| 2017/0027224 A1 | 2/2017 | Volodarsky et al. |
| 2017/0027230 A1 | 2/2017 | Fornarelli |
| 2017/0055579 A1 | 3/2017 | Kuna |
| 2017/0055588 A1 | 3/2017 | Cameron |
| 2017/0064994 A1 | 3/2017 | Xu |
| 2017/0079324 A1 | 3/2017 | Eksouzian |
| 2017/0105451 A1 | 4/2017 | Fornarelli |
| 2017/0202265 A1 | 7/2017 | Hawes et al. |
| 2017/0251718 A1 | 9/2017 | Armoush |
| 2017/0295845 A1 | 10/2017 | Bajpai et al. |
| 2018/0098569 A1 | 4/2018 | Martin |
| 2018/0125115 A1 | 5/2018 | Mueller |
| 2018/0271150 A1 | 9/2018 | Sparklin |
| 2019/0000138 A1 | 1/2019 | Han |
| 2019/0014822 A1 | 1/2019 | Bless et al. |
| 2019/0037921 A1 | 2/2019 | Kennedy et al. |
| 2019/0089184 A1 | 3/2019 | Mininger et al. |
| 2019/0109497 A1 | 4/2019 | Yang et al. |
| 2019/0116884 A1 | 4/2019 | Conley et al. |
| 2019/0174825 A1 | 6/2019 | Neuhaus |
| 2020/0031237 A1 | 1/2020 | Colafrancesco et al. |
| 2020/0183335 A1 | 6/2020 | Mininger et al. |

FOREIGN PATENT DOCUMENTS

| | | |
|---|---|---|
| CN | 205285006 | 6/2016 |
| CN | 304205433 | 7/2017 |
| CN | 107529827 | 1/2018 |
| CN | 109275961 | 1/2019 |
| CN | 208798698 | 4/2019 |
| DE | 40010509 | 1/2001 |
| DE | 102016012830 | 8/2017 |
| ES | D0518135 | 11/2013 |
| FR | 960094 | 5/1996 |
| MX | 22818 | 5/2007 |
| WO | 2020161570 | 8/2020 |

OTHER PUBLICATIONS

Puff Co., Puffco Peak Video posted on Instagram retrieved from www.instagram.com/p/BdtMs4qlHnH/ Jan. 8, 2018.

Puff Co., Puffco Peak Hero Shot posted on Instagram retrieved from www.instagram.com/p/BdybEMAI_zX/ Jan. 10, 2018.

Pax Labs, Inc., web page of vaporizers, retrieved from www.paxvapor.com Feb. 25, 2015.

Puffco Peak by Sneaky Pete Vaporizers, found online May 31, 2019, located at www.youtube.com/watch?v=7W7zX9LCxoQ Apr. 23, 2018.

Koerber, B., This weed company just made a smart bong and it's awesome, Mashable, located at mashable.com/2018/01/08/puffco-peak-smart-bong-dab-rig-concentrates/ Jan. 8, 2018.

Tarantola, A., The Puffco Peak vaporizer is a quick hit of concentrated genius, Engadget, located at www.engadget.com/2018/03/16/puffco-peak-vaporizer-hands-on/?guccounter=1 Mar. 18, 2018.

Puff Co., Reservations are now open for Peak Atomizer Assembly, retrieved from web.archive.org/web/20180224162936/https://www.puffco.com/ Feb. 24, 2018.

Engadget, Hands on Peak, retrieved from web.archive.org/web/20180330221034/https://www.engadget.com/2018/03/16/puffco-peak-vaporizer-hands-on/ Mar. 31, 2018.

Puff Co., Introducing the Peak, retrieved from vimeo.com/257080728 Feb. 28, 2018.

Dr. Dabbler, Vaporizers for sale, retrieved from https://web.archive.org/web/20170222202821/https://drdabbervaporizersforsale.weebly.com/ Feb. 22, 2017.

Dr. Dabbler, Boost: Black Edition retrieved from www.drdabber.com/products/boost-black-edition 2019.

Dr. Dabbler, Boost Black Edition retrieved from www.drdabber.com/collections/all/products/boost-black-edition 2019.

Source Vapes, web page for Atomizers, retrieved from www.sourcevapes.com 2019.

Source Vapes, web page for Atomizers, retrieved from www.sourcevapes.com/collections/atomizers Feb. 16, 2016.

Vapexhale, Give the gift of relaxation, retrieved from www.xhl3.com Nov. 27, 2017.

Vapexhale, web page for starter kits, retrieved from www.xhl3.com 2019.

Cloud V Enterprises, Cloud V Bubbler Options, retrieved from cloudvapes.com/vaporizers/portable-enail/cloudv-electro-portable-dab-rig 2019.

Cloud V Enterprises, Ultra Slim Design Vaporizers, retrieved from cloudvapes.com/store/ Jan. 21, 2013.

Cloud V Enterprises, Cloud V, retrieved from cloudvapes.com/store/ Feb. 22, 2016.

Dabado Vaporizers, web page for Dabado Bolt, retrieved from dabadovaporizers.com/collections/bolts 2019.

Dabado Vaporizers, web page for Dabado Bolt, retrieved from dabadovaporizers.com Jan. 1, 2016.

(56) References Cited

OTHER PUBLICATIONS

Kevin H., Focusvape Tourist Review—The Accidental Tourist, retrieved from vapesterdam.com/review/focusvape-tourist-review/ 2019.
Focus Vape, web page of vaporizers, retrieved from focusvape.eu/shop/ Jul. 17, 2017.
Pax Labs, Inc., PAX 3, retrieved from paxvapor.com 2019.
Waxxim, Vape Pen Bubblers shopping page, retrieved from www.waxxim.com 2019.
Patent Cooperation Treaty, International Search Report for PCT/US2019/013501, 6 pages dated Oct. 10, 2019.
Polar Bottle, Sport Cap, retrieved from polarbottle.com/product/bottles/free-replacement-cap/sport/ on Nov. 1, 2019 2019.
Lock & Lock, Lock & Lock, No BPA, Water Tight, Food Container, 2.5-cup, 20-oz, HPL933, retrieved from www.amazon.com/Water-Tight-Container-2-5-cup-HPL933/dp/B005BRGWZE on Nov. 1, 2019 Oct. 2014.
Smokea, Piecemaker Kahuna 2 in. Silicone Bong, retrieved from https://smokea.com/products/piecemaker-kahuna-2-silicone-bong?variant=37965420929 on Nov. 1, 2019 Jun. 2018.
Osprey, Hydraulics Bite Valve, retrieved from https://www.osprey.com/us/en/product/hydraulics-bite-valve-NONMAGVALV.html on Nov. 1, 2019 Apr. 2013.
Bray, Flowtek Triad Series, retrieved from www.bray.com/ball-valves/3-piece-valves/triad-series on Nov. 1, 2019 Mar. 2017.
SourceVape.Ca, PuffcoPeak, retrieved from planetvape.ca/puffco-peak.html Nov. 21, 2019.
DHgate.com, SOC Enail Kit 2600mAh Capacity for Very Long Lasting and 4 Led Heat Settings VS Puffco the Lucid Lighting Peak, retrieved from dhgate.com/product/soc-enail-kit-2600mah-capacity-for-very-long/479400626.html Nov. 21, 2019.
Shenzhen Slinya Electronic Co Ltd., Crystal Qi Wireless Charging Pad for Iphone 6 6s Plus Samsung Galaxy S7 S6 / Nexus 6/ HTC 8X Smart Phone Wireless Charger, retrieved Nov. 30, 2020.
Kwmobile Store, Kwmobile Charging Station—5V 1.3A Charger With Micro USB Cable—Docking Station Compatible With IQOS 2.4/2.4 Plus Holder E-Cigarette, retrieved Nov. 30, 2020.
Otter Products, LLC OtterSpot Wireless Charging System, retrieved from bit.ly/3r1rvLf 2020.
Mophie Powerstation Wireless—External Battery Charger for Qi Enabled Devices (10,000mAh)—Black, retrieved from www.amazon.com/dp/B01JCIJ2PO?tag=androidcentralb-20&ascsubtag=UUacUdUnU73790YYwYg 2020.
MOMA Design Store, Lexon Oblio Wireless Charging Station & UV Sanitizer, retrieved from store.moma.org/tech/featured/lexon-pop-up/lexon-oblio-wireless-charging-station-uv-sanitizer/11451.html 2020.
PhoneSoap, PhoneSoap Go, retrieved from www.phonesoap.com/products/phonesoap-go 2020.
Nomad Goods, Inc., Nomad Charging Hub 5 Port Edition, retrieved from www.amazon.com/Nomad-charging-Powers-devices-indicators/dp/B075747DM4 2020.
Spansive, Spansive Source Multi Device Wireless Charging Station—Compatible with iPhone 11 Pro Max 11 Pro 11 Xs Max XR XS X 8 8 Plus (White), retrieved from www.amazon.com/Spansive-Source-Device-Wireless-Charger/dp/B07YXCVRJ9 2020.

\* cited by examiner

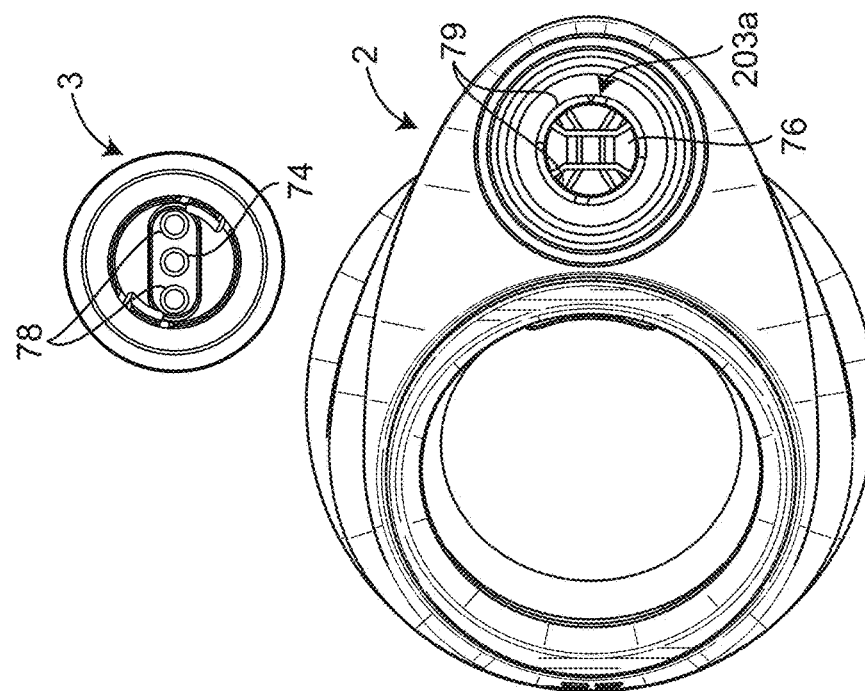
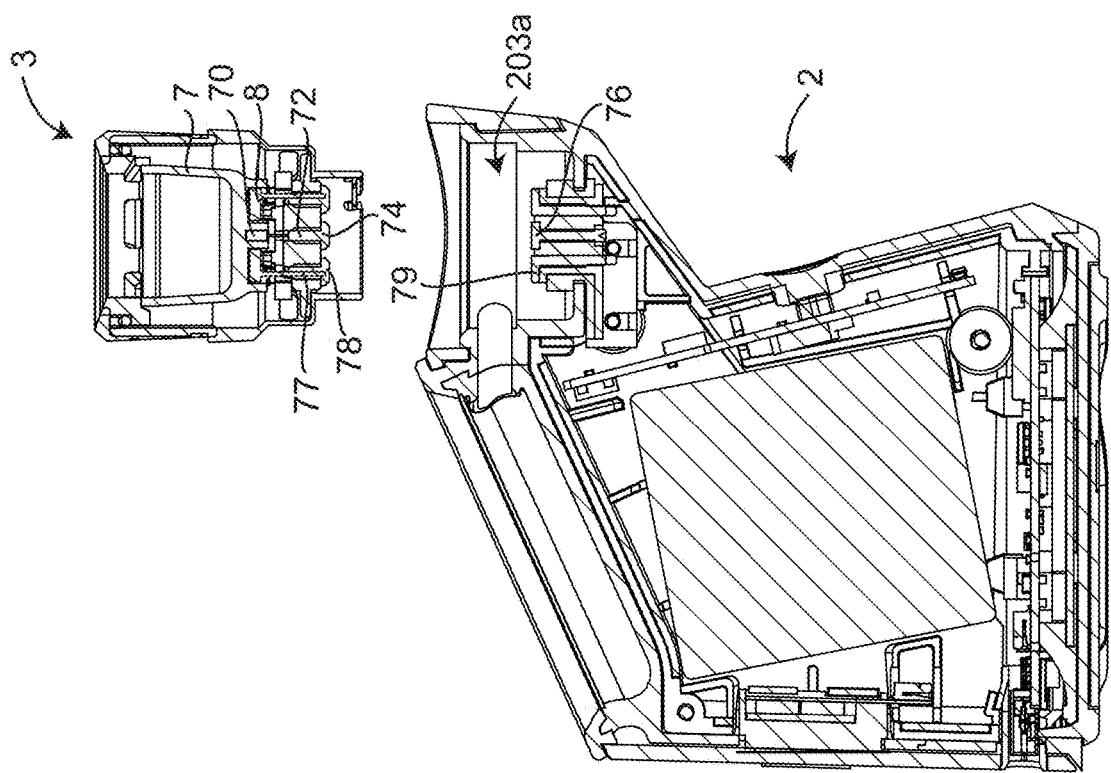
FIG. 25B
FIG. 25A

PORTABLE ELECTRONIC VAPORIZING DEVICE

CROSS-REFERENCE TO RELATED APPLICATIONS

The present application is a continuation of U.S. patent application Ser. No. 17/133,008 filed on Dec. 23, 2020, now U.S. Pat. No. 11,000,067, which claims priority to U.S. provisional application No. 63/087,348 filed on Oct. 5, 2020. The entire contents of the above patent documents are incorporated by reference as if recited in full herein.

FIELD OF THE INVENTION

Aspects of the present invention relate to portable electronic vaporizing devices for use with vaporizable products.

BACKGROUND

Electronic vaporizers are common place and are generally utilized for the purpose of aroma and/or inhalation therapy. In this regard, vaporizers heat a substance, herbs for example, such as tobacco, cannabis, lavender, chamomile, and many other types of plant material. The vaporizer may work by heating the substance through the use of direct heat or the use of hot air. There are three common ways of heating the substance. The first is thermal conduction where the substance is set directly on a heating element such as a ceramic or metal plate. The second is thermal radiation in which light is used to heat the substance. The third is convection where hot air is passed over the substance. Yet another suitable mechanism for vaporizing a substance may be via inductive heating.

At lower levels of heat, vapors extracted from substances such as vegetable materials are mainly aroma therapeutic (inactive fragrance) and do not usually contain the active ingredients of the substance. Without the active ingredients being present, there is no physiological reaction. At higher levels of heat, active ingredients will be increasingly included in the vapor given off during heating. Usually, aromatic vapors have already been released and are not always present at the higher heat levels. With some substances, such as cannabis, active ingredients appear at different levels of heat.

After the substance is heated a mist or vapor containing some aspect of the substance is released and either enjoyed as an aromatic or inhaled to obtain a physiological reaction. The warm air containing the substance product can be harsh on the throat and bronchial tubes. Accordingly, some vaporizers use a cooling down process that allows water moisture to be included in the vapor produced. These vaporizers enable the user to inhale a cool moist vapor that is relatively less harsh and irritating. Vaporizers are often preferred over traditional methods of heating or smoking substances due to the reduction of harsh side effects. Some of these side effects include inhalation of tar, carbon monoxide, and other carcinogens either directly or from second hand smoke. With many states imposing smoking bans in public areas, vaporizers have become popular substitutes.

Accordingly, there is a need for improved vaporizers that provide an enhanced vaporizing experience, including vaporizers with improved quality of the vapor produced for inhalation and improved ease of use.

SUMMARY

Aspects of the invention are directed to a system comprising a wireless charging station and a portable electronic vaporizing device, wherein the portable electronic vaporizing device comprises: a vaporization assembly comprising a container to receive a vaporizable product, and a heating device configured to transfer energy to the vaporizable product in the container to heat the vaporizable product and form a vapor therefrom; a mouthpiece for receiving a flow of gas comprising the vaporizable product entrained therein from the vaporization assembly, the mouthpiece comprising an inhalation outlet through which the flow of gas having the vaporizable product therein can exit the portable electronic device; and a base comprising a device battery for powering the heating device, and a wireless charge receiving system configured to receive a wireless charge from the charging station to charge the device battery. The wireless charging station comprises a wireless charge providing system configured to provide a wireless charge to the wireless charge receiving system of the base, a wireless charging station battery configured to provide power to the wireless charge providing system, a wireless charging station sensor configured to detect a predetermined spatial relationship between the wireless charge receiving system of the base and the wireless charge providing system of the wireless charging station, and a wireless charging station controller configured to activate the wireless charge providing system to automatically initiate wireless charging to the wireless charge receiving system of the base, in relation to detection of the predetermined spatial relationship between the wireless charge receiving system of the base and the wireless charge providing system of the charging station by the wireless charging station sensor.

According to yet another aspect of the invention, a wireless charging station is provided that is configured to charge a portable electronic device, the portable electronic device comprising a base comprising a device battery for powering the portable electronic device, and a wireless charge receiving system configured to receive a wireless charge from the charging station to charge the device battery, wherein the wireless charging station comprises: a wireless charge providing system configured to provide a wireless charge to the wireless charge receiving system of the base, a wireless charging station battery configured to provide power to the wireless charge providing system, a wireless charging station sensor configured to detect a predetermined spatial relationship between the wireless charge receiving system of the base and the wireless charge providing system of the wireless charging station, and a wireless charging station controller configured to activate the wireless charge providing system to automatically initiate wireless charging to the wireless charge receiving system of the base, in relation to detection of the predetermined spatial relationship between the wireless charge receiving system of the base and the wireless charge providing system of the charging station by the wireless charging station sensor.

According to yet another aspect of the invention a system comprising a wireless charging base and a portable electronic vaporizing device is provided, wherein the portable electronic vaporizing device comprises: a vaporization assembly comprising a container to receive a vaporizable product, and a heating device configured to transfer energy to the vaporizable product in the container to heat the vaporizable product and form a vapor therefrom, a mouthpiece for receiving a flow of gas comprising the vaporizable entrained therein from the vaporization assembly, the mouthpiece comprising an inhalation outlet through which the flow of gas having the vaporizable product therein can exit the portable electronic device, and a base comprising: a device battery for powering the heating device, a wireless charge receiving system configured to receive a wireless charge from the charging station to charge the device battery, and a base sensor configured to detect whether the base is positioned with respect to the charging station such that a wireless charge can be received from the charging station to charge the wireless charge receiving system; and a heating controller configured to control the heating device. The wireless charging station comprises a wireless charge providing system configured to provide a wireless charge to the wireless charge receiving system of the base, and a wireless charging station battery configured to provide power to the wireless charge providing system. The base sensor is configured to detect whether the base is positioned to receive the wireless charge by detecting a predetermined spatial relationship between the wireless charge receiving system of the base and the wireless charge providing system of the wireless charging station, and the heating controller is configured to automatically initiate a heating cycle with the heating device, when it is detected that the wireless charge receiving system and wireless charge providing system are no longer in the predetermined spatial relationship.

According to yet another aspect of the invention, a portable electronic vaporizing device is provided that is configured to be wireless charged by a battery-powered wireless charging station comprising a receiving region configured to receive the portable electronic vaporizing device, wherein the portable electronic vaporizing device comprises: a vaporization assembly comprising a container to receive a vaporizable product, and a heating device configured to transfer energy to the vaporizable product in the container to heat the vaporizable product and form a vapor therefrom, a mouthpiece for receiving a flow of gas comprising the vaporizable entrained therein from the vaporization assembly, the mouthpiece comprising an inhalation outlet through which the flow of gas having the vaporizable product therein can exit the portable electronic device, and a base comprising: a device battery for powering the device, a wireless charge receiving system configured to receive a wireless charge from the charging station to charge the device battery, a base sensor configured to detect whether the base is positioned with respect to the charging station such that a wireless charge can be received from the charging station to charge the wireless charge receiving system, and a heating controller configured to control the heating device. The base sensor is configured to detect whether the base is positioned to receive the wireless charge by detecting a predetermined spatial relationship between the wireless charge receiving system of the base and the wireless charge providing system of the wireless charging station, and the heating controller is configured to automatically initiate a heating cycle with the heating device, when it is detected that the wireless charge receiving system and wireless charge providing system are no longer in the predetermined spatial relationship.

According to yet another aspect of the invention, a cap configured to releasably cover an inlet of vaporization assembly for a portable electronic vaporizing device is provided, wherein the cap comprises: a first inner cap portion comprising an outer sidewall, a second outer cap portion comprising an inner sidewall that at least partly circumferentially surrounds the outer sidewall of the inner cap portion, a channel formed in between the first inner cap portion and the second outer cap portion, the channel having first and second opposing ends, a cap inlet configured to flow gas into the first end of the channel, and a cap outlet configured to exhaust gas from the second end of the channel, wherein the cap is configured to flow gas therethrough from the cap inlet to the cap outlet via the channel, to introduce gas into the vaporization assembly, when the cap is positioned to cover the inlet.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIGS. 25A-25B are a schematic side view, and a top view, of an embodiment of a base and atomizer for the portable electronic vaporizing device;

DETAILED DESCRIPTION OF THE INVENTION

Aspects of the invention as described herein are directed to an improved portable electronic vaporizing device for the inhalation of vaporizable substances, such as aromatic substances, therapeutic substances and/or substances with physiological effects. Examples of such substances can include herbs, such as tobacco, cannabis, lavender, chamomile, and other types of plant material. In one embodiment, a vaporizable substance can comprise a cannabinoid, such as for example one or more of cannabadiol (a generally non-psychoactive therapeutic substance) and tetrahydrocannabinol (THC) (a psychoactive therapeutic substance). The vaporizable substance may in some embodiments be in the form of an oil and/or wax product comprising the vaporizable substance, e.g., as extracted from plant material containing the substance, and may optionally be provided in combination with carriers or other additives.

Figure 1:
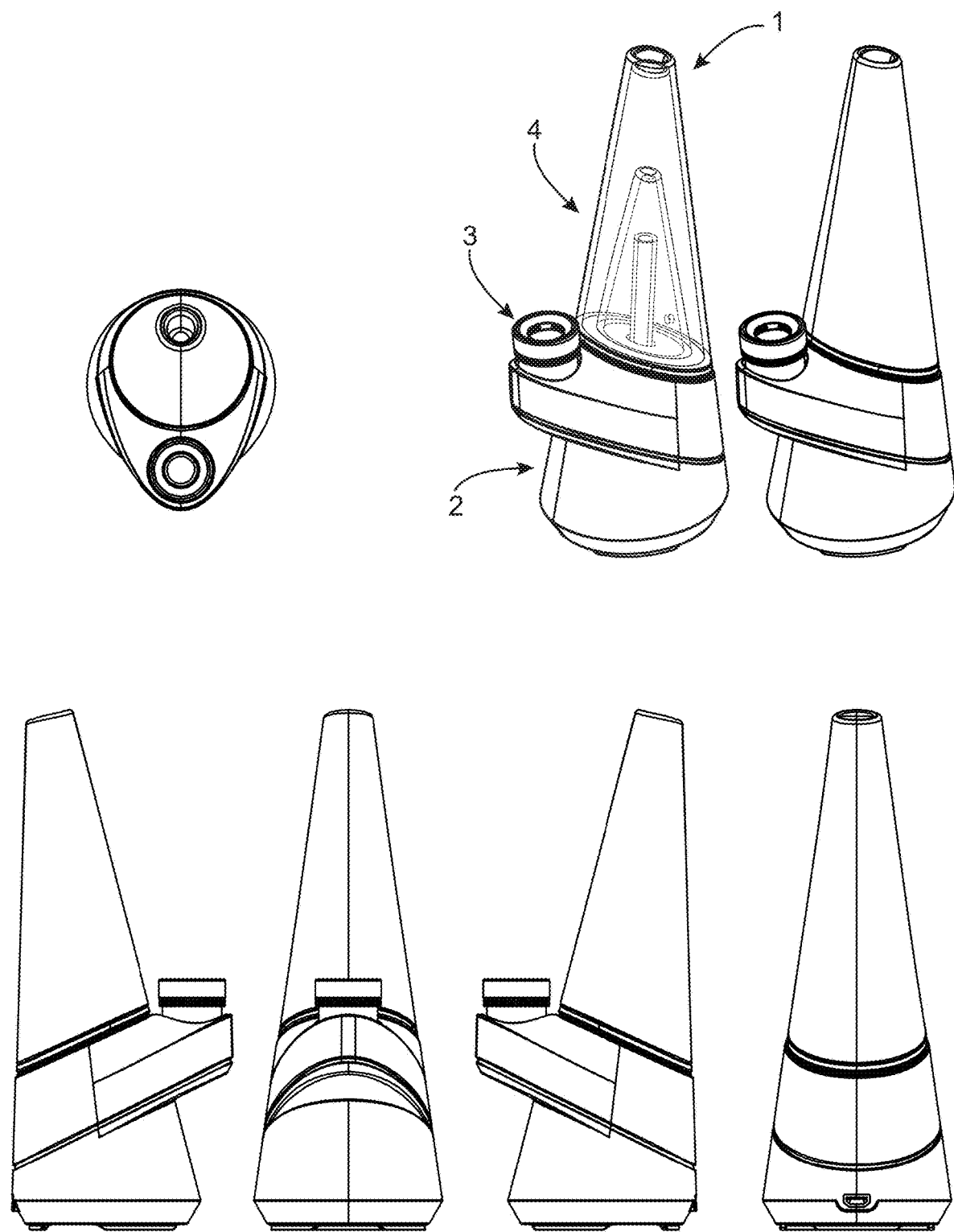
FIG. 1 shows embodiments of a portable electronic vaporizing device comprising a base, atomizer and mouthpiece.

Referring to FIG. 1, an embodiment of a portable electronic vaporizing device 1 is shown according to aspects of the disclosure herein. The portable electronic device 1 comprises a base 2, an atomizer 3, and a mouthpiece 4. The atomizer 3 is configured to receive a vaporizable product therein and to heat the vaporizable product to form a vapor therefrom. The mouthpiece 4 comprises an outlet where a user can inhale the vapor produced by the atomizer, optionally with water or other substances entrained therein. The base 2 provides a gas flow connection between the atomizer 3 and mouthpiece 4, to deliver the vaporized product from the atomizer 3 to the mouthpiece 4 for delivery to the use via inhalation thereof. The base 2 can also comprise a housing for one or more components for powering and/or controlling the device 1. For example, the base may contain compartments therein for storing a power source, such as a battery, for powering elements of the device 1 such as a heating element or other heating device used in the atomizer 3. In a case where the device is powered by a rechargeable battery, such as a lithium ion battery, the base 2 may also comprise a charging port connectable to a battery charger (not shown). The base may also have compartment doors to allow access to a battery or other components held within the housing. The base 2 may also house further control circuitry for controlling the device, such as to provide predetermined heating cycles or heating programs, and may also allow for user interaction with the device via control buttons and/or control interface, a display and/or lights to signal to the user, and/or other control and operation features.

Figure 2:
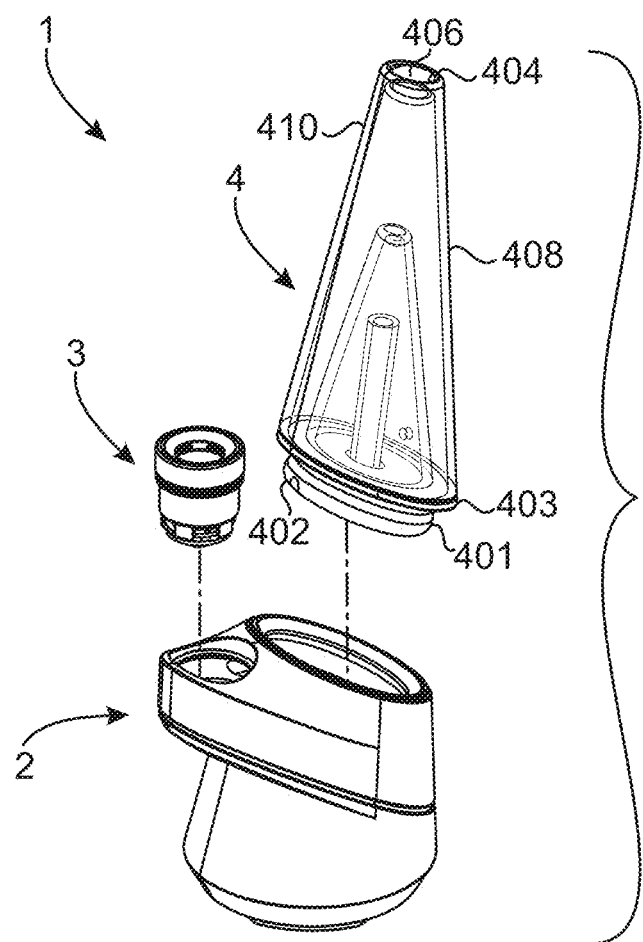
FIG. 2 is an exploded view of the device of FIG. 1.

Referring to FIG. 2, an embodiment of the device 1 is shown in exploded view, with the mouthpiece 4 and atomizer 3 removed from the base 2. In one embodiment, the mouthpiece 4 is removably attachable to the base 2, for example so as to allow a user to readily remove the mouthpiece for cleaning and/or replacement, as is described in further detail herein. In yet another embodiment, the atomizer may be removably attachable to the base, for example so as to allow a user to replace the atomizer 3 when no longer serviceable, for cleaning of the atomizer, and/or to more readily allow access to a container (e.g. bowl) where a vaporizable product may be loaded into the atomizer 3. In one embodiment, both the atomizer 3 and the mouthpiece 4 may be removably attachable to the base 2. In yet another version, the atomizer 3 may be independently removable from the base 2. That is, the atomizer 3 may be configured to be removably attached to the base such that it can be removed therefrom, without requiring that the mouthpiece 2 be removed beforehand.

Figure 3:
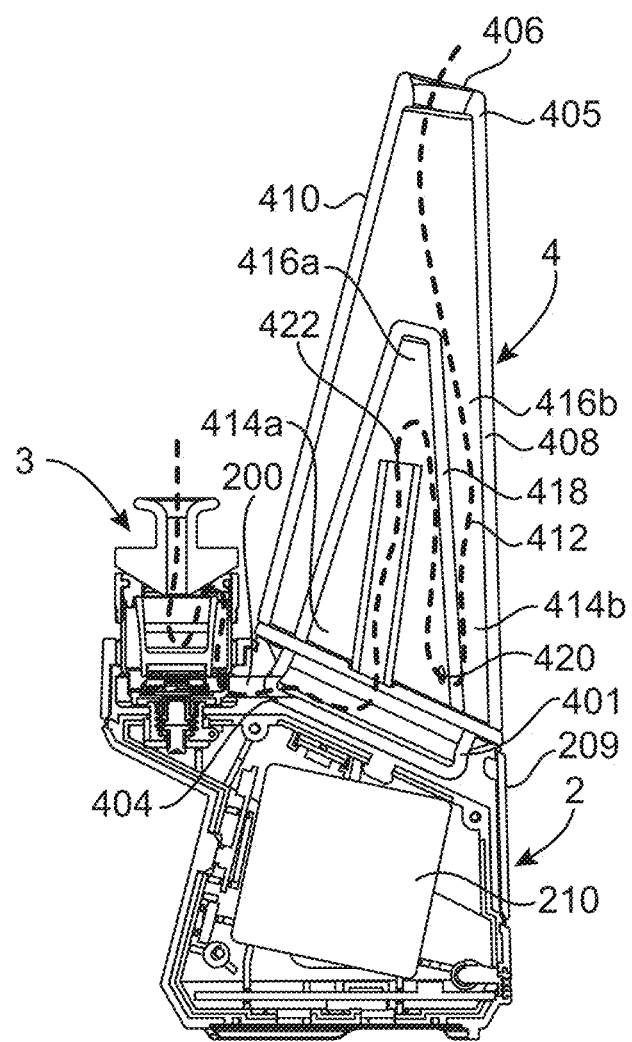
FIG. 3 is a schematic view of the device of FIG. 1.

Referring to FIG. 3, an embodiment of a gas flow path through the portable electronic device 1 is shown. In one embodiment, a flow of ambient air is received in the atomizer 3, where the ambient air is entrained with vaporizable product that is vaporized in the atomizer via a heating element. The gas comprising the ambient air and vaporizable product flows from the atomizer 3 to a portion of the base 2 having a gas flow conduit therein, and which provide a sealed gas flow connection between the atomizer 3 and mouthpiece 4. The gas received into the mouthpiece 4, where it is directed to an inhalation outlet of the mouthpiece, where the gas comprising the vaporizable product can be inhaled by the user. In one embodiment, water is provided a region of the mouthpiece 4 such that water is entrained with the gas passing through the mouthpiece, thereby providing a more pleasant inhalation experience to the user. An embodiment of an overall flow path of gas through the device 1 is depicted via dashed lines in FIG. 3.

Referring to FIGS. 4A-4D, embodiments of the base 2, and mechanism of attachment of the base 2 to one or more of the atomizer 3 and mouthpiece 4 are described in more detail. As shown in FIGS. 4A-4D, the base 2 comprises a gas flow path conduit 200 therein, the gas flow path conduit 200 comprising a conduit inlet 201a and a conduit outlet 201b, an embodiment of which may also be viewed with respect to FIG. 5. The conduit inlet 201a receives gas exhausted from the atomizer 3, and provides a flow of gas to the mouthpiece 4. In one embodiment, one or more airtight seals are formed between the base 2 and/or the atomizer 3 and mouthpiece 4, so as to create an airtight gas flow path between from the atomizer, through the gas flow path conduit 200 in the base 2, and to the mouthpiece 4. In the embodiment as shown, the gas flow conduit 200 in the base separates an atomizer internal gas flow path from a mouthpiece internal flow path.

According to one embodiment, the atomizer 3 and/or mouthpiece 4 are removably attachable to the base 2 via a fastening feature 202 that allows for repeated removal and re-insertion of the atomizer 3 and/or mouthpiece 4 into the base. In one embodiment, the fastening feature 202 may be located on the base 2, and/or the fastening feature 202 may be located on one or more of the atomizer 3 and mouthpiece, and/or the components may have mutually complementary fastening features that allow for repeatable removal and re-attachment of the atomizer 3 and/or mouthpiece 4 to the base 2.

Figure 4A:
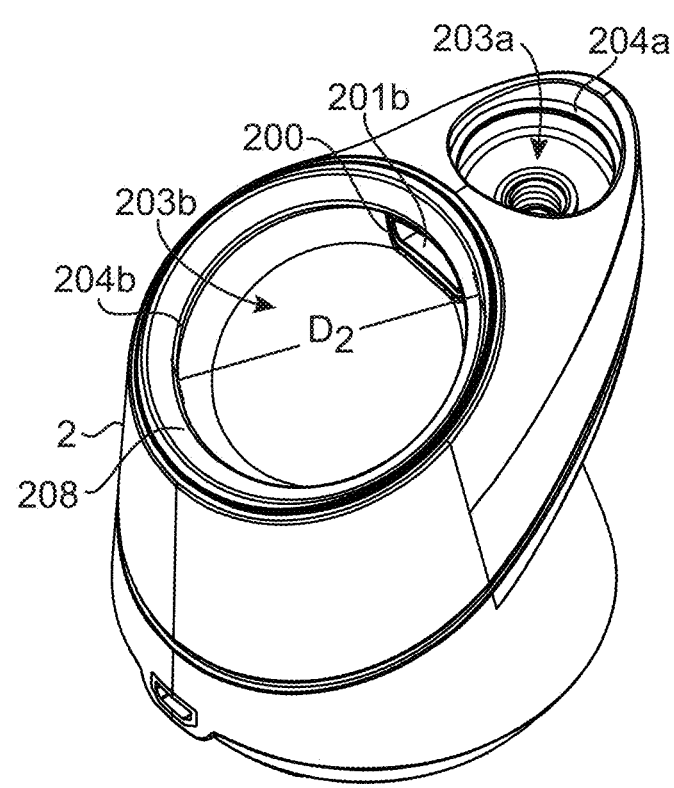
FIGS. 4A-4D shows an embodiment of a base.
Figure 4B:
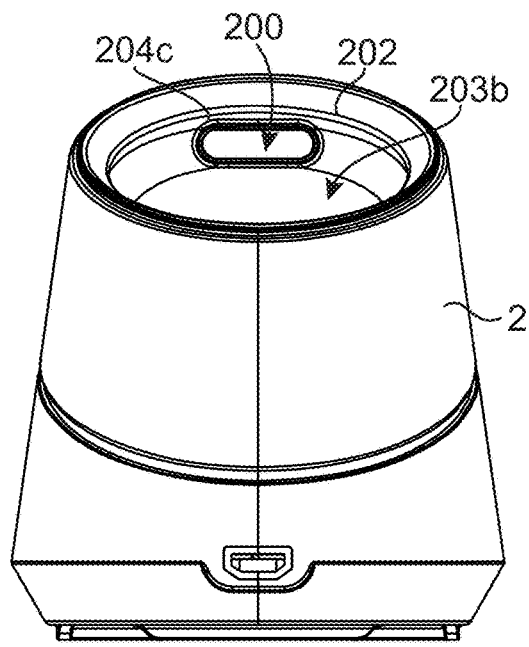
Figure 4C:
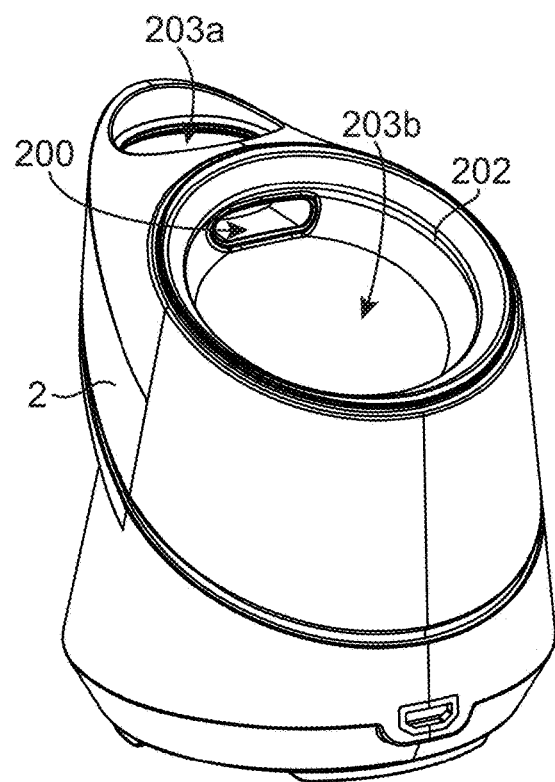
Figure 4D:
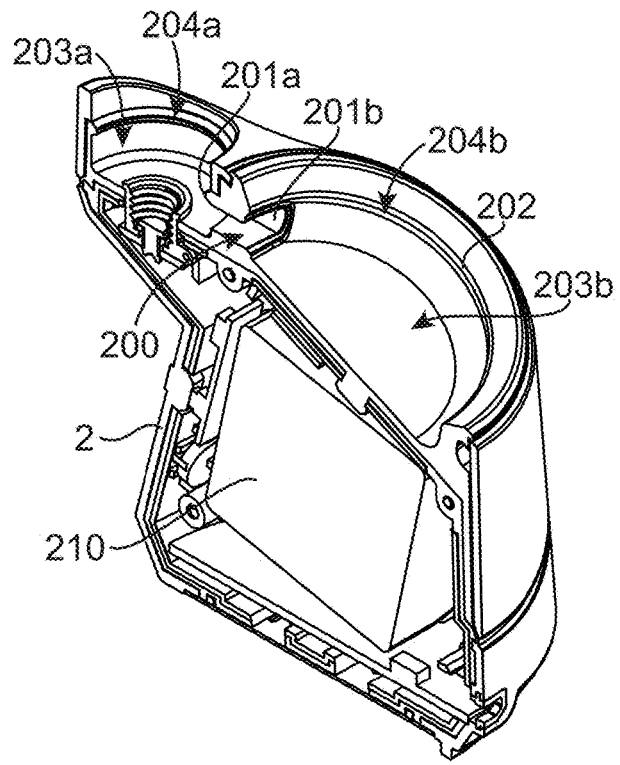

In the embodiment as shown in FIGS. 4A-4D, the base 2 comprises first and second recessed regions 203a and 203b, comprising cavities formed in the base 2 that are configured to receive at least a portion of the atomizer 3 and mouthpiece therein. For example, the base can comprise a first recessed region 203a configured to receive at least a portion of the atomizer 3 therein, and a second recessed region 203b configured to receive at least a portion of the mouthpiece 4 therein. In one embodiment, the fastening feature 202 is provided as part of the base, and can comprise one or more airtight sealing members 204a, 204b located in the base, such as a first airtight sealing member 204a provided in the first recessed region to retain the atomizer therein, and/or a second airtight sealing member 204b provided in the second recessed region to retain the mouthpiece 4 therein. In yet another embodiment, the fastening feature 202 may be provided on the atomizer and/or mouthpiece. For example, the mouthpiece 4 may comprise a snap region 401 that is configured to be received by the second recessed region of the base, and that comprises a fastening feature 202 thereon to retain the step region in the base. In one embodiment, the fastening feature that removably retains one or more of the atomizer and/or mouthpiece in their respective recessed region is also capable of providing an airtight seal between the base and atomizer and/or mouthpiece. In the embodiment as shown in FIG. 4B, an airtight sealing member 204c can be provided about the gas conduit outlet 201b to provide an airtight connection to the mouthpiece inlet.

Figure 5:
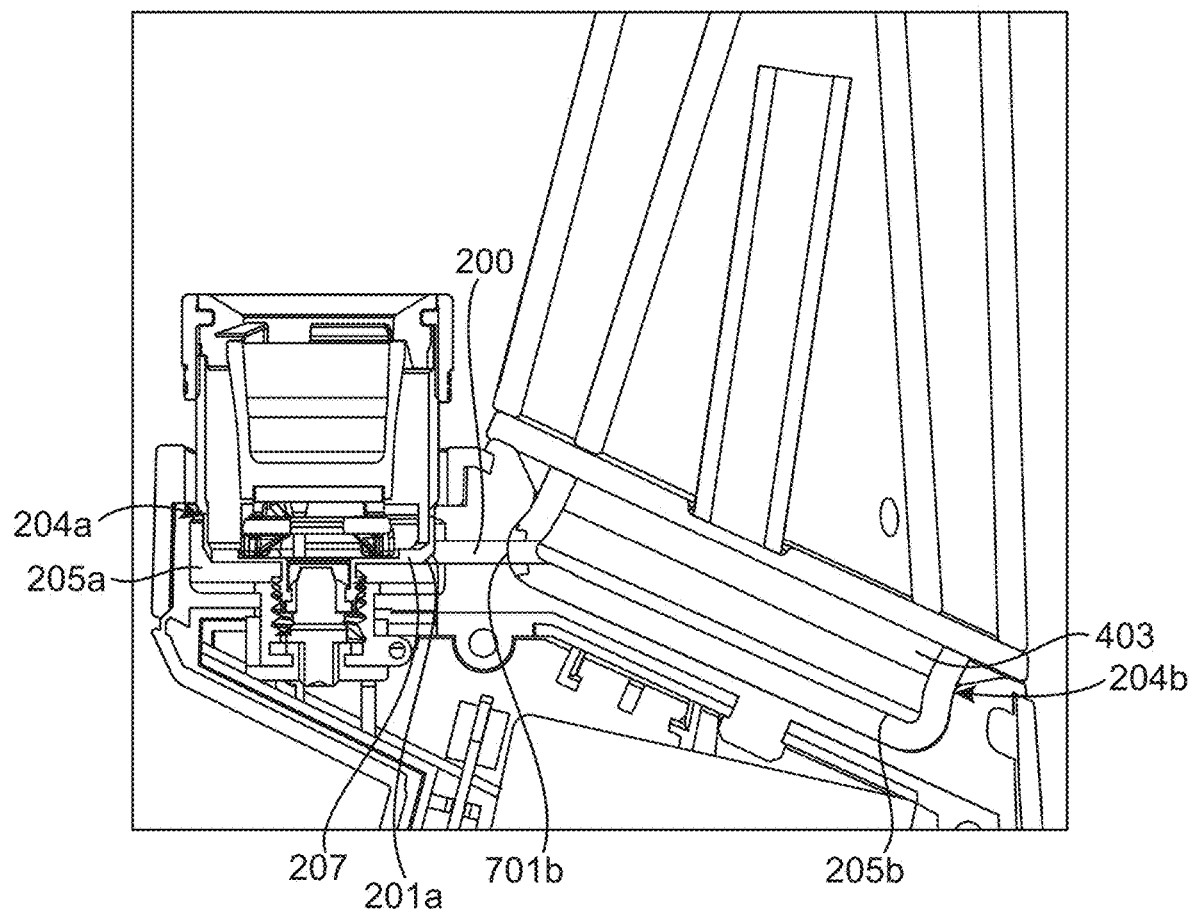
FIG. 5 shows a close-up schematic view of the device of FIG. 1

In one embodiment, the base 2 is capable of forming a first airtight compartment 205a via airtight seal with the atomizer, and/or is capable of forming a second airtight compartment 205b via an airtight seal with the mouthpiece 4, as shown in FIG. 5. In one embodiment, the base comprises a first recessed receiving region 203a formed therein that is configured to receive the atomizer 3, the first recessed receiving region 203a comprising an annular sealing region 204a provided about an internal circumference 206a of the first recessed receiving region, to form the airtight compartment between the base and atomizer in the portion of the first recessed region below the annular sealing region. In another embodiment, the base comprises a second recessed receiving region 203b formed therein that is configured to receive the mouthpiece, the second recessed receiving region 203b comprising an annular sealing region 204b provided about an internal circumference 206b of the second recessed receiving region, to form the airtight compartment between the base and mouthpiece in the portion of the second recessed region below the annular sealing region.

In one embodiment, an annular sealing region provided about a recessed cavity in the base, and/or about a circumference of the atomizer and/or mouthpiece, comprises an elastomeric, rubber and/or silicone material. In another embodiment, the base 2 comprises one or more elastomeric, rubber and/or silicone sleeves 208 conformally lining one or more recessed regions 203a, 203b, and/or the conduit 200. In one embodiment, the sleeve 208 may be a single sleeve piece lining at least a portion of the recessed regions 203a, 203 and conduit. According to yet another embodiment, at least one of the atomizer and mouthpiece can comprise an elastomeric, rubber and/or silicone sleeve conformally lining at least a part of a surface thereof that is received by first and/or second recessed regions of the base. In yet another embodiment, the sleeve 208 provided in one or more of the recessed regions 203a, 203b comprises one or more annular protrusions extending therefrom, such as by molding of the sleeve material to form the protrusions, which can serve as airtight sealing members 204a, 204b between the base and atomizer and/or mouthpiece.

In one embodiment, the base 2 comprises a second recessed receiving region 203b formed therein that is configured to receive the snap region 401 of the mouthpiece 4, the second recessed receiving region comprising the annular sealing region 204b provided about an internal circumference thereof, to form an airtight compartment between the base and snap region of the mouthpiece in the portion of the second recessed region below the annular sealing region. In yet another embodiment, the second recessed receiving region further comprises the annular sealing region 204c about the conduit outlet 201b to form an airtight seal between the conduit outlet 204c and a mouthpiece inlet 402. In one embodiment, the gas flow path conduit outlet 201b in the base is located below the annular sealing region 204b in the second recessed region, such that an interface between the gas flow path conduit outlet in the base, and the mouthpiece inlet is located in an airtight compartment portion of the second recessed receiving region. In one embodiment, the annular sealing region 204b, 204c comprises at least one of a rubber, elastomeric, and a silicone material.

As described above, in one embodiment the base 2 comprises a housing 209 that is configured to house a power source 210 for powering a heating device such as a heating element 8 in the atomizer 3, and optionally comprises one or more control elements for operating components of the device 1. For example, in one embodiment the power source 210 can comprise a rechargeable battery, such as a lithium-ion battery. The housing may also contain outlets to connect the device with an electrical outlet and/or other devices, and may house control elements such a CPUs and/or wireless transmitters for controlling heating and vapor production with the device, either via direct or wireless input into the device by a user.

Referring to FIGS. 6A-6C and 7-11, an embodiment of an atomizer 3 is described. In the embodiment as shown, the atomizer 3 is removably attachable to the base, an includes an atomizer inlet 301 configured to receive a flow of gas into the atomizer 3, and an atomizer housing 10 comprising one or more atomizer housing walls 304 that at least partially define an atomizer internal flow path therein. The atomizer 3 is further configured to contain a container 7 (e.g., a bowl) within the atomizer housing 302 that is capable of holding a vaporizable product therein. The atomizer further comprises a heating element 8 capable of heating the vaporizable product held in the container 7. According to the embodiment as showing, the atomizer comprises a first container inlet 305 capable of introducing gas into the container 7 to entrain vaporizable product therein, and comprises one or more second container outlets 306 capable of flowing the gas having the vaporizable product entrained therein into an atomizer internal flow path 308. Embodiments of the atomizer 3 comprise one or more atomizer outlets 309 capable of receiving the flow of gas from the atomizer internal flow path 308, and providing the flow of gas to the conduit inlet 201a of the base 2.

According to one embodiment, the at least one heating element 8 is disposed within the atomizer housing 10. For example, the at least one heating element 8 may be disposed below a bottom surface 310 of the container 7 that is adapted to receive the vaporizable product therein. In one embodiment, the heating element comprises a ceramic heating plate, such as an alumina plate, and may also comprise, e.g. a metal wire, coil, or other element that is capable of resistively heating, and which may also be embedded in a ceramic or glass heating plate or used alone. The heating element 8 may be capable of resistively heating the container 7 via thermal contact therewith, as in direct contact with the bottom surface 310. In one embodiment, the heating element 8 is attached to conductive elements such as wires leading to the power source (e.g. battery) to provide an applied voltage for the resistive heating. In one embodiment, the container 7 adapted to receive and hold the vaporizable product comprises a thermally conductive ceramic material, such as alumina, such that placing the container is in thermal contact with the heating element causes heating of the container.

Figure 6A:
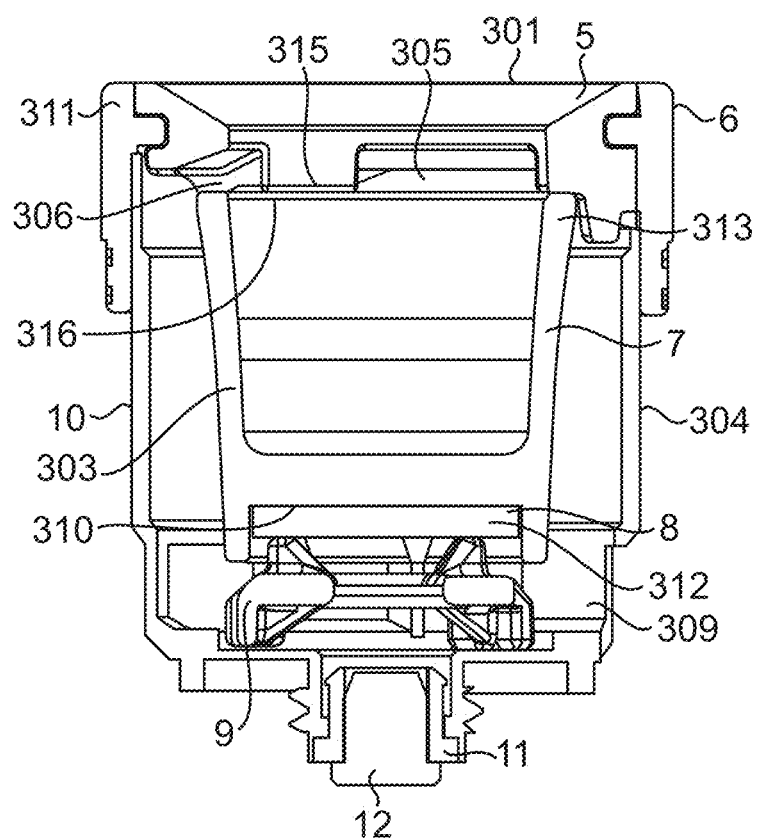
FIGS. 6A-6C show embodiments of an atomizer.

According to yet another embodiment, the atomizer 3 comprises a bottom insulating element 9 comprising a spacer disposed between the heating element 8 and atomizer housing 10 that thermally insulates the heating element 8 from the atomizer housing 10. According to another embodiment, the atomizer 3 comprise a top insulating element 311 that thermally insulates a top end 313 of the container 7 from the atomizer housing 10. In one embodiment, the top insulating element 311 is configured to receive a cap 17 thereon. For example in one embodiment, the device 1 is configured to operate with a cap 17 (FIG. 6B) positioned upstream of the atomizer 3, the cap comprising a stopper having a conduit 314 formed therein to provide a flow of ambient air into the atomizer 3. In one embodiment, the container 7 is thermally insulated from the atomizer housing 10 by both the bottom insulating element 9 that positions the container within the housing at a bottom end of the container, and the top insulating element 311 that positions a top end of the container in the housing. In one embodiment, referring to FIG. 6C, the top insulating element 311 comprises inner and outer annular insulating rings 5, 6. In one embodiment, an inner circumference of the inner annular insulating 5 ring defines the atomizer inlet 301, and is in communication with the first inlet 305 of the container 7. In the embodiment as shown in FIG. 6A, the atomizer inlet 301 is directly above the first inlet 305, and/or the atomizer inlet 301 and first container inlet may comprise the same inlet. That is, in one embodiment, the atomizer inlet may be aligned with and lead to a container inlet positioned below the inner annular ring 5 of the top insulating element 311.

In one embodiment, the atomizer 3 comprises an outer annular ring 6 that forms an annular jacket that is flush with the outer surface of the inner annular ring 5, and extends in an axial direction beyond the inner annular ring such that a portion of the interior surface of the outer annular ring is in contact with an outer surface of the atomizer housing 10. In one embodiment, the outer annular ring 6 may secure the inner annular ring 5 to the atomizer housing 10 via frictional forces and/or via a snap mechanism or other fastening mechanism between a portion of the interior surface of the outer annular ring and the outer surface of the atomizer housing. In one embodiment, the outer annular ring comprises an annular jacket that forms an airtight seal with the atomizer housing.

In one embodiment, one or more of the inner and outer annular rings 5, 6 are capable of thermally isolating the container 7 from the atomizer housing 10, by having a lower thermal conductivity. For example, one or more of the inner and outer annular insulating rings can comprise a thermal conductivity of less than 4 W/mk, less than 3.5 W/mk and/or less than 3 W/mk, whereas the container may comprise a thermal conductivity of at least 10 W/mk, at least 15 w/mk and/or at least 20 W/mk. In one embodiment, a bottom surface 315 of the inner annular insulating ring 5 is in contact with an upper surface 316 of the container 7.

In one embodiment, one or more of the container 7 and/or thermally insulating element 311, such as the inner annular ring 5, comprise one or more apertures 318 therein that correspond to the one or more container second outlets 306. For example, in one embodiment the inner annular ring 5 comprises one or more indentations 320 formed in the bottom surface 315 thereof, such as about a circumference thereof, which form one or more apertures 318 between the bottom surface 315 of the inner annular ring 5 and the top surface 316 of the container 7. In yet another embodiment, the inner annular ring 5 comprises one or more apertures formed in the body thereof, such as about a circumference thereof, to provide the one or more container outlets. In yet another embodiment, the container itself comprises one or more apertures 318 formed in one or more walls thereof, wherein the one or more apertures comprise the one or more second container outlets 306. According to certain embodiments, first container inlet 305 introduces a gas flow received through the inner insulating annular ring 5 into the container 7, and the one or more second container outlets 306 flow gas out of the container through the one or more apertures 318. The second container outlets 306 may thus be a separate aperture and/or opening than the first container inlet 305, such that air comes through the inlet and passes through a separate outlet when exiting the container 7.

Furthermore, in one embodiment, the top insulating element 311 is removable from the atomizer housing 10 to allow access to the container 7. For example, the insulating element 311 may be removable by simply lifting or twisting the top insulating element form the atomizer housing 10. According to yet another embodiment, the atomizer housing 10 comprises a lower portion 322 that is threaded, and that may be complementary to a threaded socket in the first recessed region 203a of the base 2, so the atomizer can be screwed into the threaded socket of the base. In yet another embodiment a lower portion of the atomizer housing may connects to the base via a magnet, span mechanism or other fastening feature.

Figure 6B:
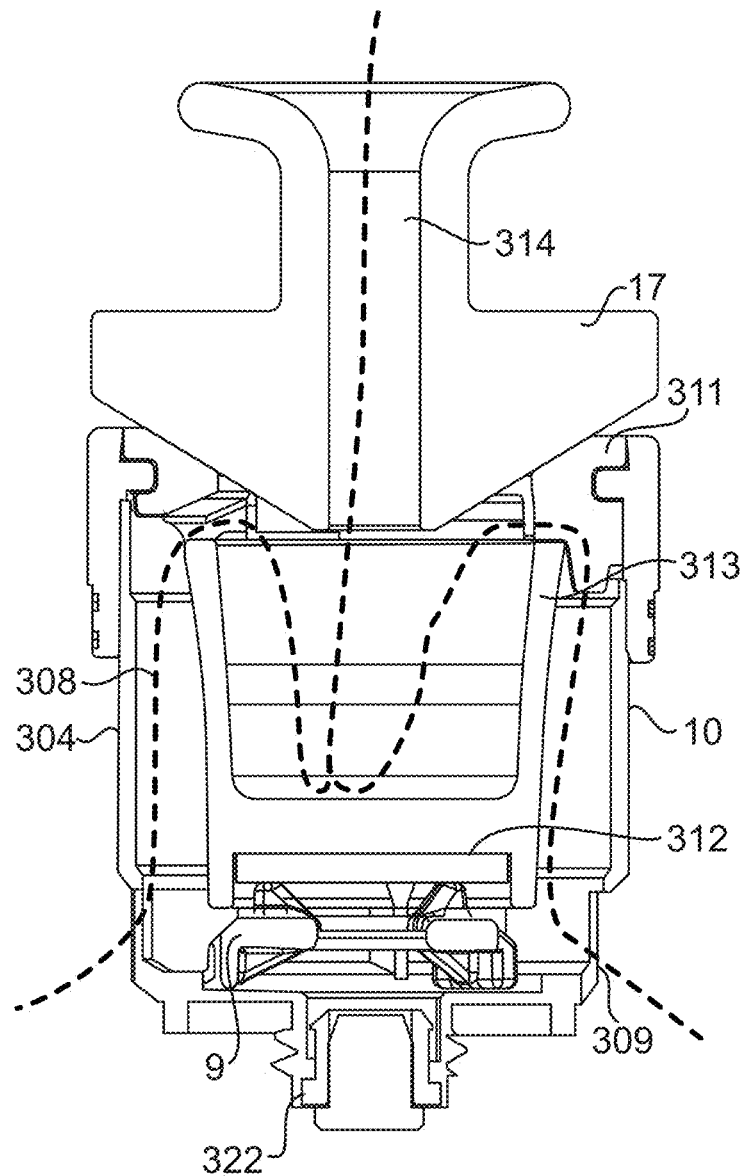
Figure 6C:
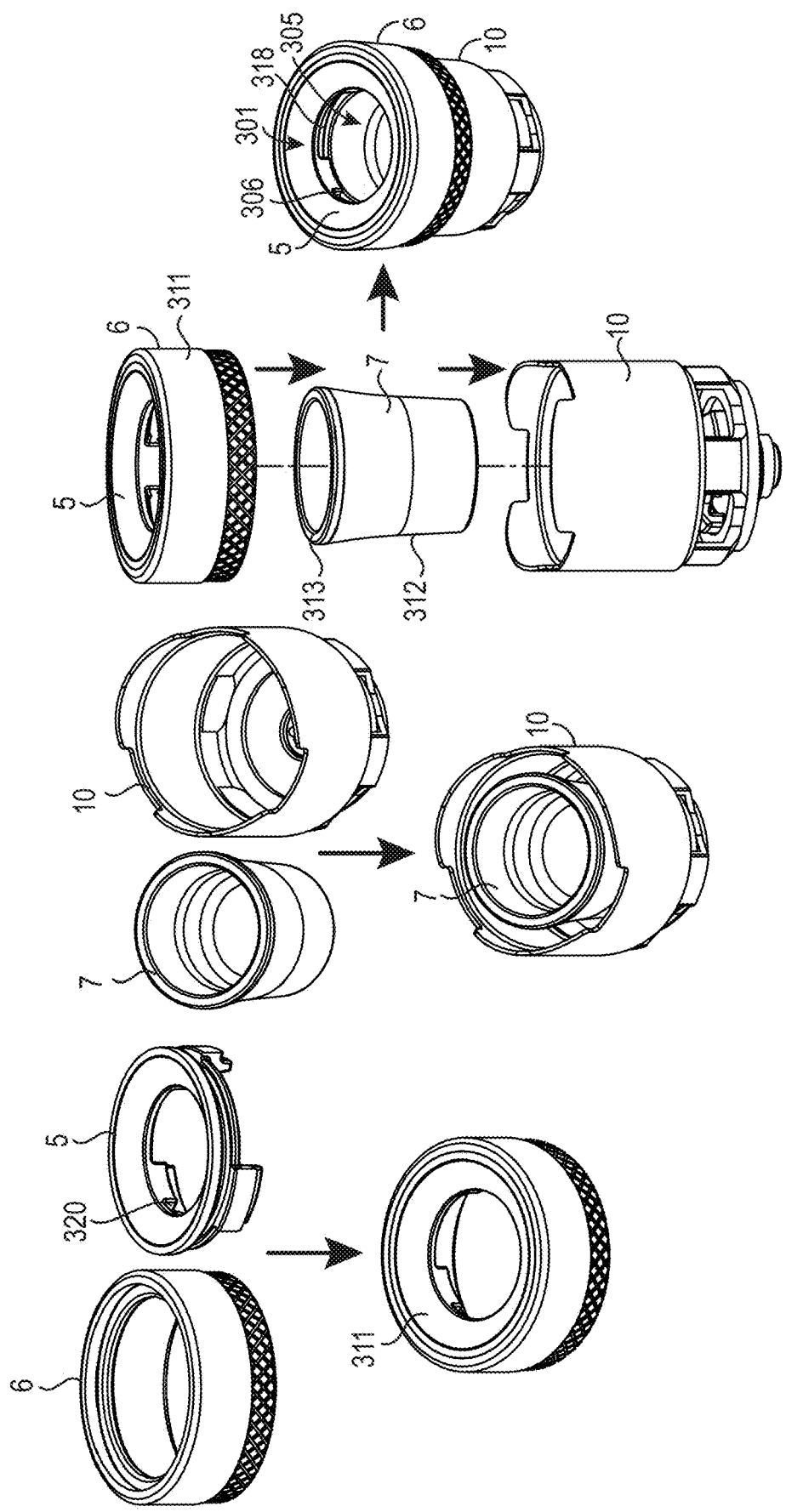
Figure 7:
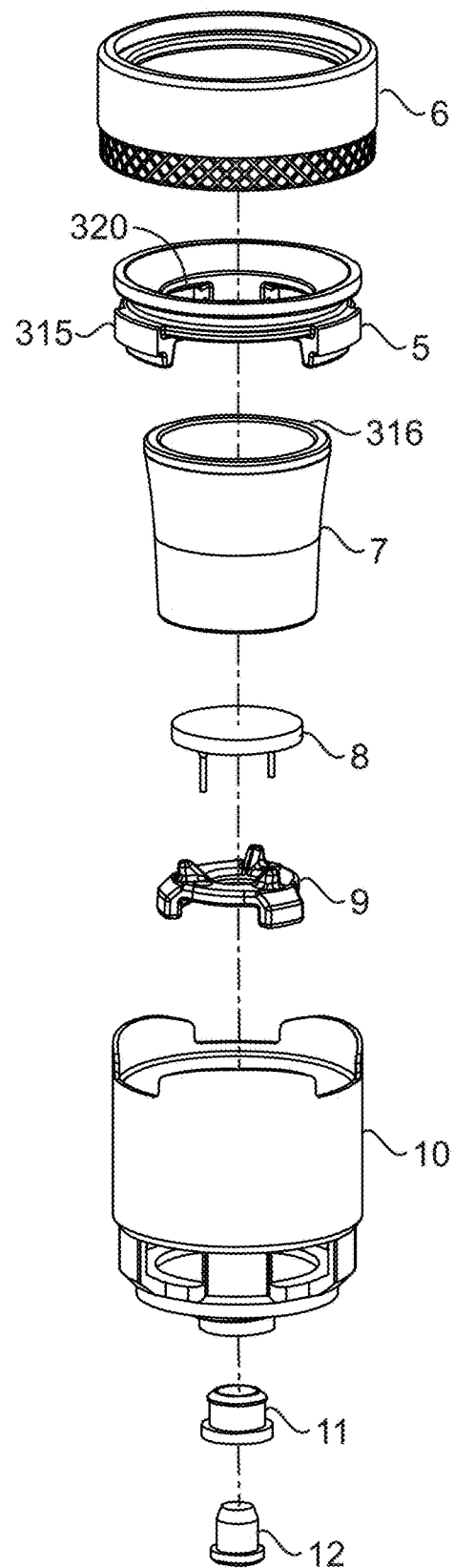
FIGS. 7-11 show views of embodiments of components of an atomizer.
Figure 8:
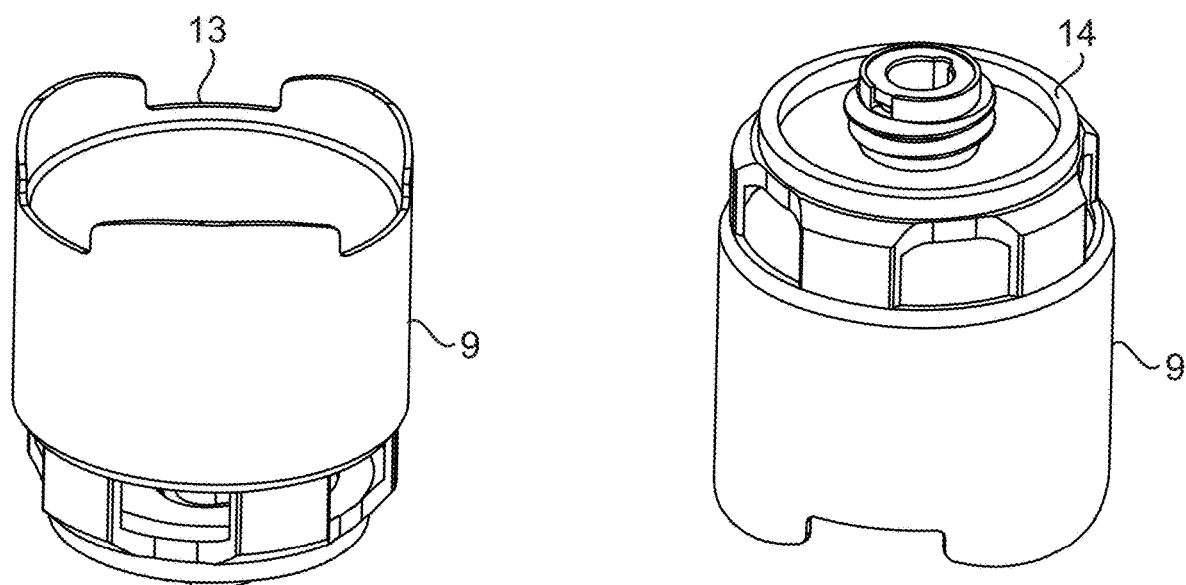
Figure 9:
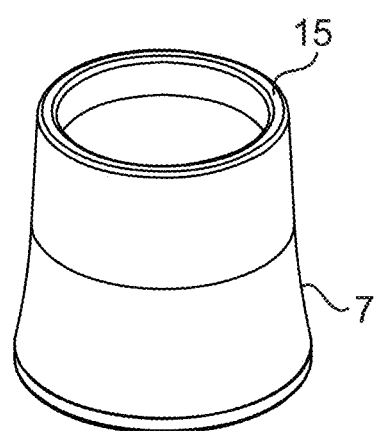
Figure 10:
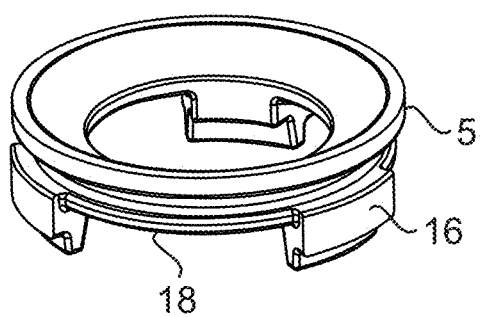
Figure 11:
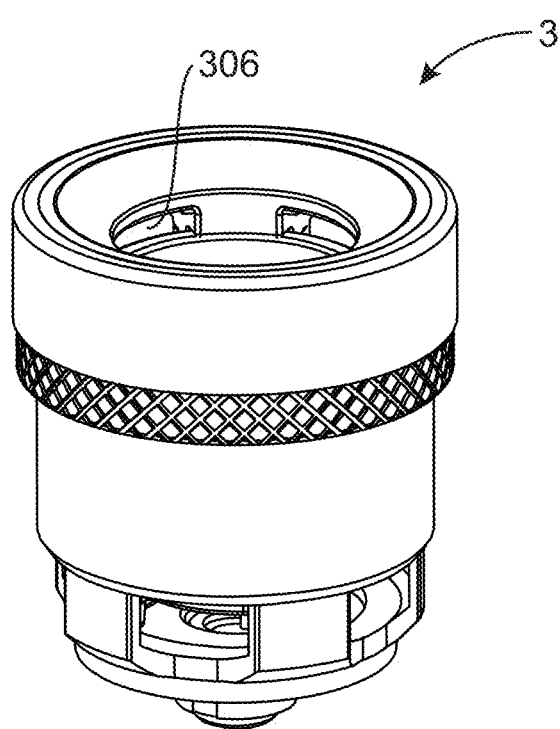

According to one embodiment, atomizer housing at least partially direct gas from the one or more second container gas outlets 306 along the internal atomizer gas flow path 308 (shown as a dashed line in FIG. 6B), in a passage 324 formed between walls of the container 7 and the atomizer housing 10. The atomizer housing 10 can comprises one or more apertures/outlets 309 formed therein to flow gas from the internal atomizer gas flow path 308 to the airtight passage 207 that is external to the atomizer housing in the first recessed region 203a of the base 2. In one embodiment, the atomizer housing apertures/outlets 309 are located at a lower end of the atomizer housing, and the atomizer housing 10 redirects flow of the gas from the one or more second container gas outlets 306 in a downward direction along a passage 324 formed between the housing walls and container walls, to the atomizer housing apertures/outlets 309. As shown in FIG. 6B, in one embodiment a flow of gas through the atomizer 8 comprises a flow through the first container inlet into a top of the container, flow out of the container through second container outlets that are separate from the inlet, and that are towards a top 313 of the container, flow downward between the atomizer housing and container wall towards a bottom of the atomizer and through apertures of the atomizer towards the bottom of the atomizer housing.

In one embodiment, the one or more second container outlets 306 are located radially externally to the first container inlet 305, and/or are positioned in an arrangement circumferentially surrounding the first container inlet 305. The second container outlets 306 may also be located towards a top end of the atomizer and/or container. In a further embodiment, the apertures and/or outlets 309 for exhausting gas from the atomizer are located below the first container inlet and/or second container outlet, towards a lower end of the atomizer.

Further embodiments of the atomizer are described herein. For example, in one embodiment, inside the atomizer housing 10, a container comprising a bowl 7 is positioned on top of the heating element 8, and may be made of a highly thermally conductive material, which can include ceramic, quartz, or metals, allowing efficient heat transfer. The heating element 8 and the bowl 7 may be secured and insulated by the bottom insulating element 9 and top insulating element 311 respectively, with these two elements firmly locating the heating element 8 and bowl 7 within the atomizer. These two elements are made with low thermally conductive, yet high heat withstanding, material so that minimal heat is lost from the heating element and bowl. The top insulating element comprises an outer annular ring comprising sleeve 6, made of an insulating material, like silicone or plastic. The sleeve 6 fastens to the housing 10 and makes an airtight seal while the inner annular ring 5 insulates and positions the bowl 7. The sleeve 6 may also protect the user from heat and serves as a grip for screwing and unscrewing the atomizer.

According to certain embodiment, air may enter the top of the bowl through a cap 17. The cap 17 may be capable of directing high velocity air to the bottom of the bowl, where the material is vaporized. Air then exits the top of the bowl as vapor through the second outlets which are apertures in the inner annular ring 5 above the bowl. These slots/apertures could also be cut into the top of the bowl. The vapor travels through the slots in the inner annular ring and down a gap formed between the bowl and the atomizer housing. The vapor can leaves the bottom of the atomizer and travels through an airpath into the mouthpiece. FIG. 6B shows a cross-sectional view of the assembled atomizer with the cap and illustrates the airflow through the atomizer, entering through the cap and exiting out of the bottom of the atomizer.

Referring to FIGS. 1-3, 5 and 12, embodiments of the mouthpiece 4 are further described. In one embodiment, the mouthpiece 4 is removably attachable to the base 2. The mouthpiece can generally comprise a mouthpiece housing 408, comprising one or more mouthpiece walls 410 at least partly defining a mouthpiece internal flow path 412 through the mouthpiece housing (e.g., as shown in FIG. 3). The mouthpiece can further comprises the inhalation outlet 406 formed in a region of the one or more mouthpiece walls 410, such as towards a top end 405 of the mouthpiece 4. The mouthpiece can further comprise at least one mouthpiece inlet 402 capable of being placed in communication with the conduit outlet 201b of the base 2 upon attachment of the mouthpiece 4 to the base 2, to receive a flow of gas into the mouthpiece 4 from the base 2. In some embodiments a gas flowed through the mouthpiece from the mouthpiece inlet 402 to the inhalation outlet 406, may take a convoluted path through the interior volume of the mouthpiece and along the internal flow path, such as for example when a water filtering region is provided as part of the mouthpiece.

In one embodiment, the mouthpiece comprises a snap region 401 that is configured to removably attach the mouthpiece to the base. For example, in one embodiment, the base can comprises the second recessed receiving region 203b for receiving the mouthpiece therein via the snap region 401, which may be shaped and sized to fit within the second recesses receiving region. The snap region 401 may be located at the bottom end 404 of the mouthpiece, an in certain embodiments the mouthpiece inlet 402 may located in the snap region 401, of the mouthpiece. In one embodiment, the second receiving region 403b may be at least partially lined with a rubber, silicone, and/or elastomeric sleeve to conformally mate the second recessed region with the snap region of the mouthpiece.

In yet another embodiment, the mouthpiece comprises one or more a water filtering regions 414a, 414b, capable of holding a volume of water therein, the water filtering region being located along the mouthpiece internal flow path, such that water vapor becomes entrained into gas passing through water in the water filtering region. In the embodiment as shown in FIG. 3, a volume of water can be provided to partly fill in internal volume of the mouthpiece volume along a lower region of the internal mouthpiece volume.

In one embodiment, the at least one mouthpiece inlet 402 is located towards a bottom region 404 of the mouthpiece housing 408, and the inhalation outlet 406 is located distal to the at least one mouthpiece inlet 402 at an upper region 405 of the mouthpiece housing. According to yet another embodiment, the mouthpiece 4 comprises a plurality of chambers 416a, 416b that are connected to one another along the mouthpiece internal flow path 412. For example, the mouthpiece can comprise a first chamber 416a that is internal to a second chamber 416b, and wherein a flow of gas along the mouthpiece internal flow path 412 passes through the first chamber and into the second chamber. In one embodiment, the second chamber at least partially circumferentially surrounds the first chamber. In one embodiment, the mouthpiece comprises one or more internal walls 418 defining the first chamber 416a, and wherein the second chamber 416b is defined between the one or more internal walls 418 and the mouthpiece housing 408. In one embodiment, lower portions of the first and second chambers 416a, 416b comprise water filtering regions configured to receive and hold water therein. Furthermore, in one embodiment, the first and second chamber are connected to each other by at least one port 420 formed in the one or more internal walls 418.

In the embodiment as shown in FIG. 3, the first chamber 416a comprises a first chamber inlet 422 that is positioned above the at least one port 420 formed in the one or more internal walls, which port may be located at or below a level of water in the chambers when water is provided in the mouthpiece. In one embodiment, a flow of gas exiting the first chamber inlet 422 is directed by the one or more internal walls 418 towards the water filtering region in a lower portion of the first chamber 416a, and the gas exits the water filtering region in the lower portion of the first chamber 416a through the one or more ports 420 to enter a water filtering region of a lower portion of the second chamber 461b, and wherein gas having water vapor therein exits the water filtering region of the lower portion of the second chamber and is directed by the passage formed between the housing walls 410 and internal walls 418 to be output from the mouthpiece via the inhalation outlet. In the embodiment as shown in FIG. 3, the first chamber inlet 422 is at the end of a tube 424 extending upwardly into the first chamber 416a, the tube comprising an aperture to receive gas from the mouthpiece inlet, and wherein the first chamber inlet is located at a location that is higher than the port connecting the chambers. In another embodiment, the one or more internal walls 481 comprise a conically-shaped internal wall, and the mouthpiece housing comprises a conical housing wall about the conically-shaped internal wall.

Figure 12:
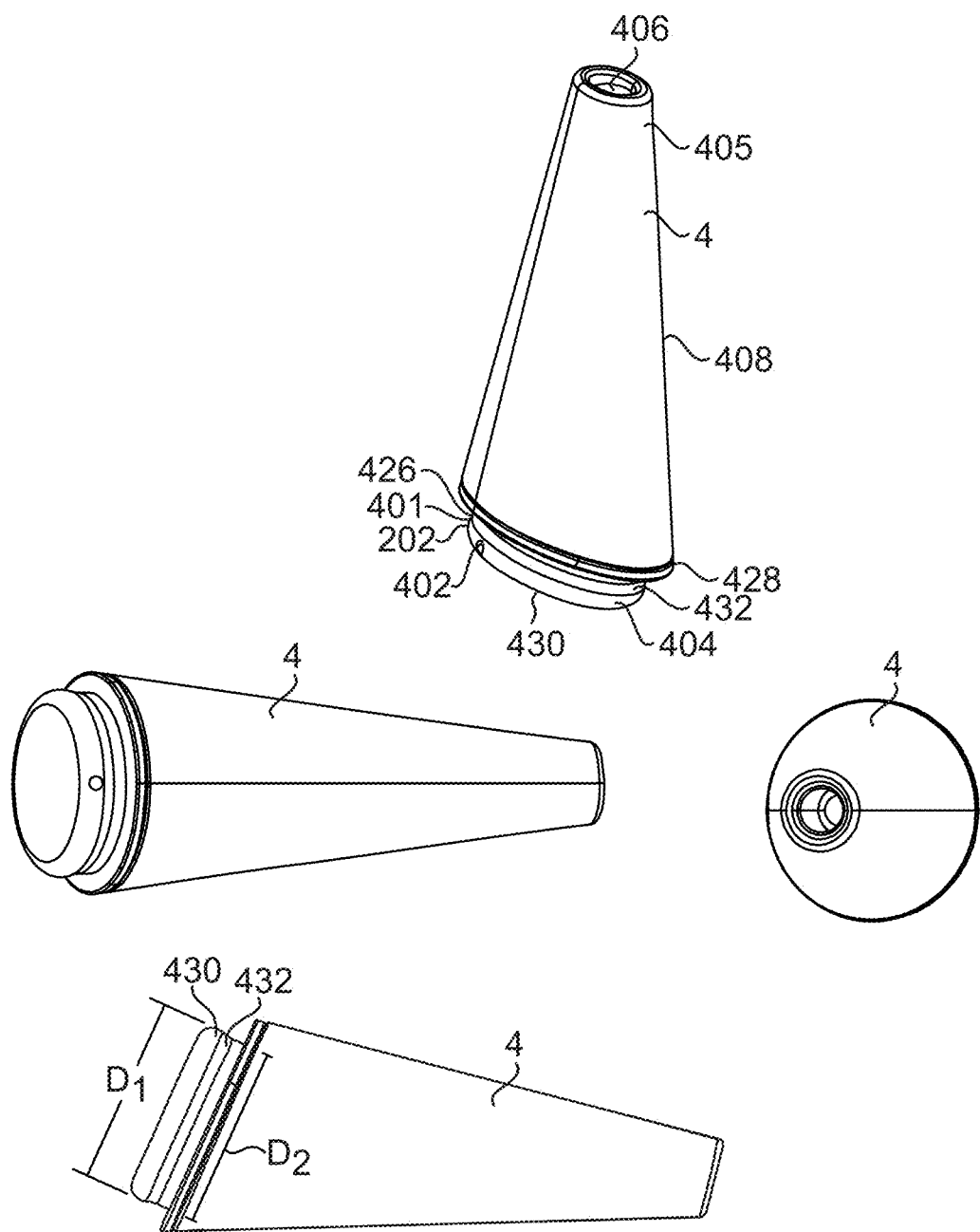
FIG. 12 shows views of embodiments of a mouthpiece.
Figure 13A:
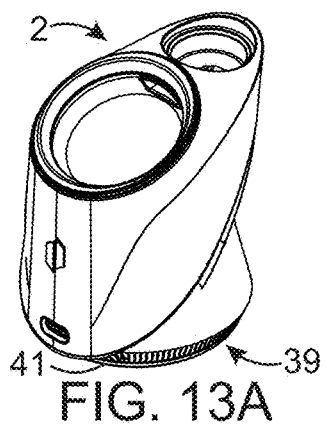
FIGS. 13A-13J show views of another embodiment of a base for the portable electronic vaporizing device, according to aspects of the invention.
Figure 13B:
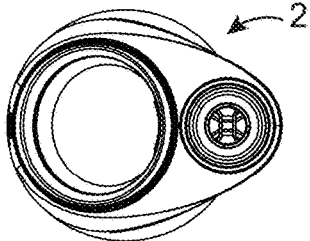
Figure 13C:
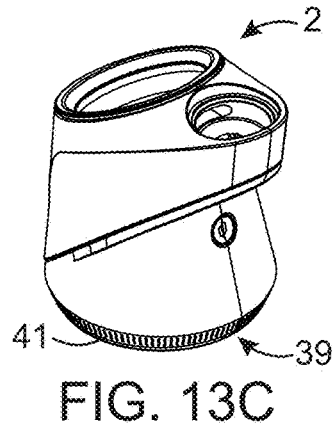
Figure 13D:
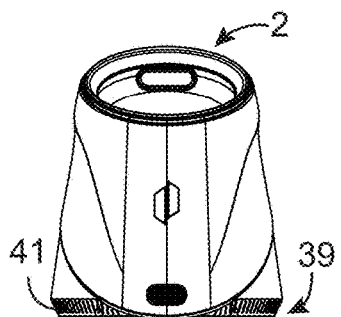
Figure 13E:
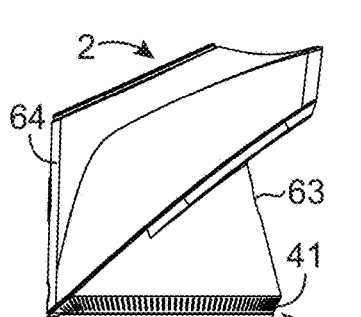
Figure 13F:
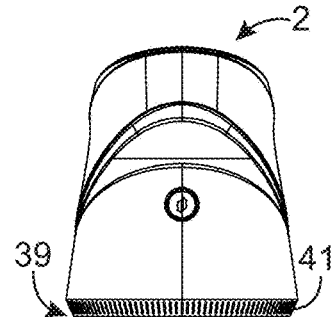
Figure 13G:
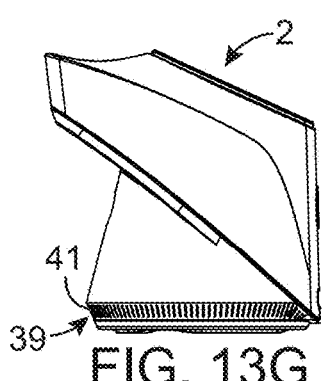
Figure 13H:
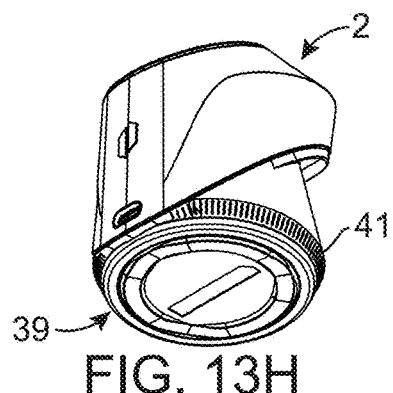
Figure 13I:
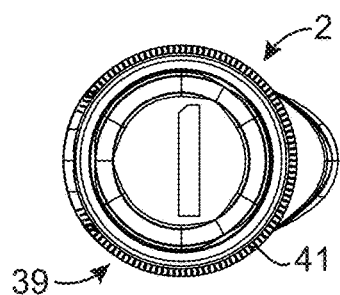
Figure 13J:
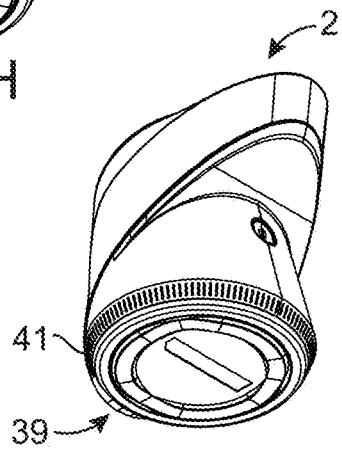
Figure 14A:
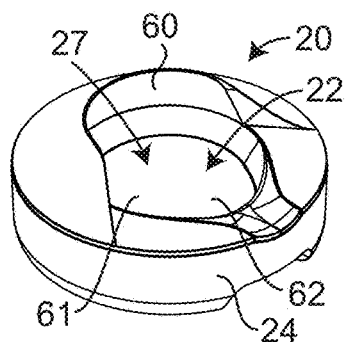
FIGS. 14A-14J show views of an embodiment of a charging station, according to aspects of the invention.
Figure 14B:
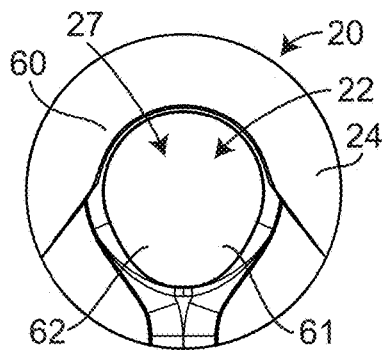
Figure 14C:
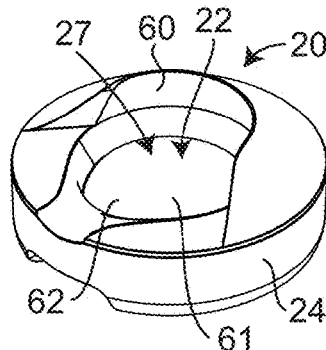
Figure 14D:
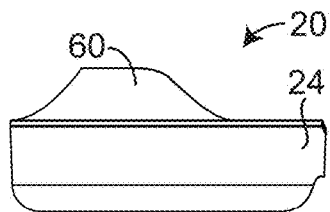
Figure 14E:
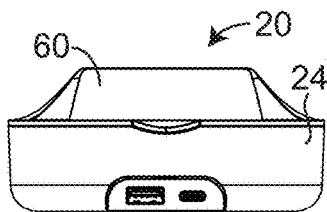
Figure 14F:
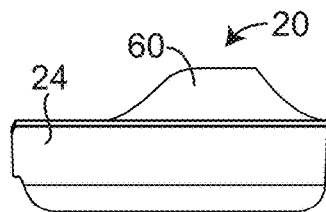
Figure 14G:
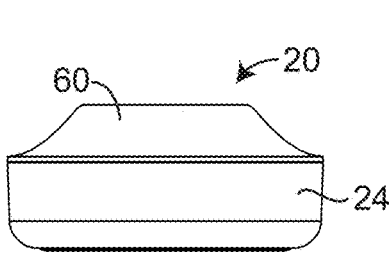
Figure 14H:
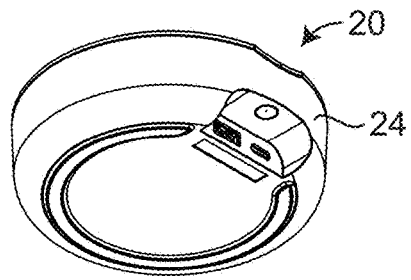
Figure 14I:
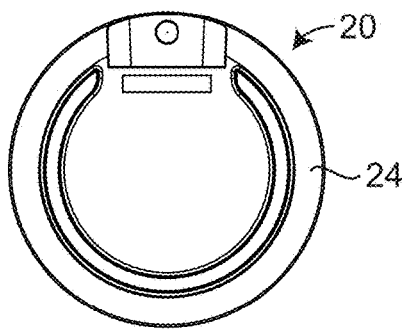
Figure 14J:
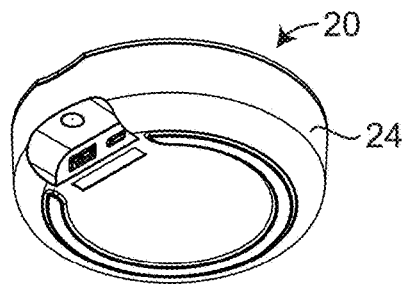
Figure 15A:
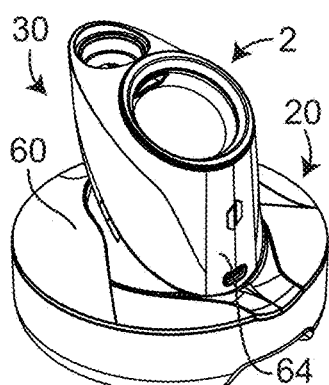
FIGS. 15A-15J show views of embodiments of the base of FIGS. 13A-13J as docked with the charging station of FIGS. 14A-14J.
Figure 15B:
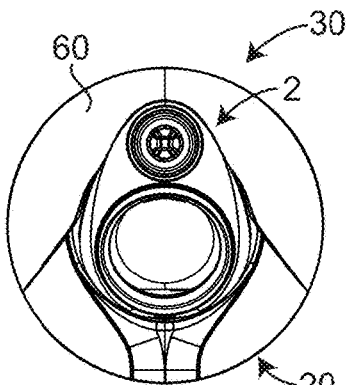
Figure 15C:
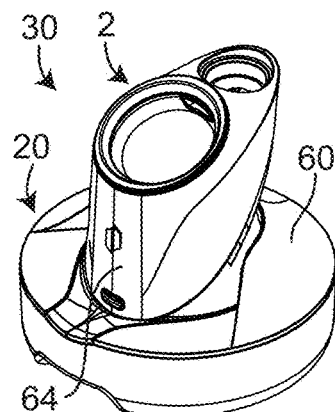
Figure 15D:
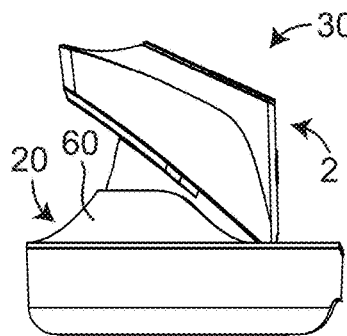
Figure 15E:
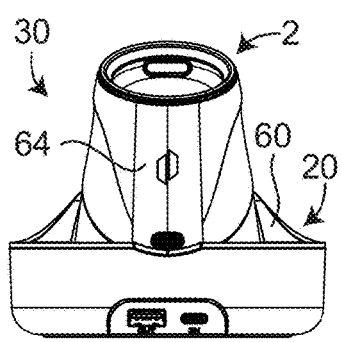
Figure 15F:
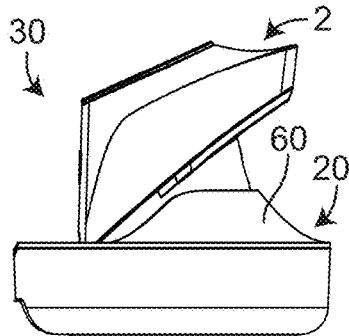
Figure 15G:
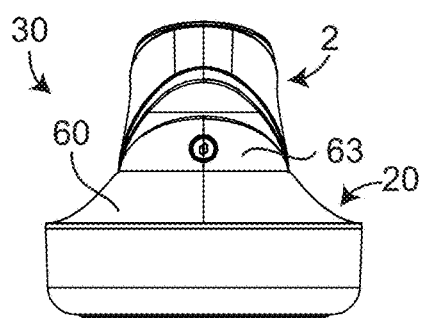
Figure 15H:
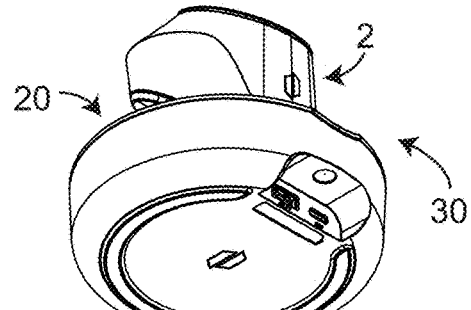
Figure 15I:
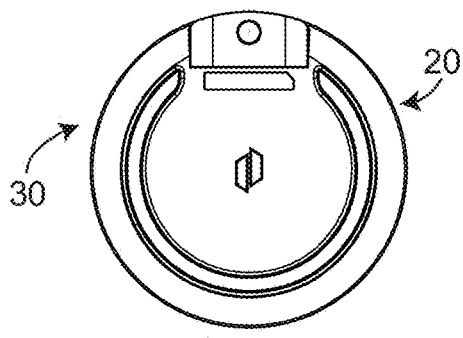
Figure 15J:
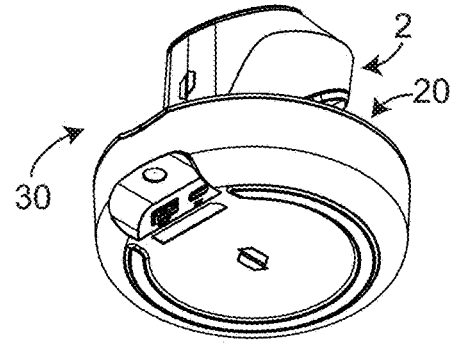

In one embodiment, referring to FIG. 12, the snap region 401 of the mouthpiece can comprises a fastening feature 202 comprising a circumferentially bulging protrusion 430 along a height of the snap region, where a diameter D of the protrusion 430 exceeds a minimum diameter $D_2$ of the recessed region of the base at some point along the height of the region (e.g., at a point where a sealing member 204b protrudes into the recessed region, see FIG. 4A). In certain embodiments, passing the bulging protrusion 430 past the minimum diameter $D_2$ of the recessed region causes the snap region to be removably retained in the recessed region. In one embodiment, the mouthpiece further comprises a fastening feature 202 comprising an annular indentation 432 formed about a circumference of the snap region portion of the mouthpiece. For example, the annular indentation may be configured to conformally mate with the circumferential sealing member 204b extending from a sidewall of the recessed region of the base, so as to form a seal therebetween. In one embodiment, the annular indentation can comprise an annular groove and/or annular channel formed in the mouthpiece housing at the snap region. In one embodiment, the annular indention may be located above the at least one mouthpiece gas inlet in the snap region, and/or the circumferentially bulging protrusion may have the at least one mouthpiece inlet formed therein. According to yet another embodiment, the fastening feature comprises a tapering snap region profile, the snap region having a first region adjacent the bottom of the mouthpiece housing (e.g., at the bulging protrusion) having a first diameter $D_1$, and a second region that is spaced apart from the first region (e.g. at the annular indentation) having a second diameter $D_3$, and wherein the diameter of the snap region decreases from the first region to the second region (e.g., D3 is less than D1).

In one embodiment, a method of using a portable electronic vaporizing device as described according to any of the embodiments herein, can comprise loading vaporizable product into the container, optionally at least partially filling the mouthpiece with water in water filter regions thereof, activating the heating element to at least partially vaporize the product in the container, and inhaling gas exiting the mouthpiece outlet, the gas comprising ambient air having vaporized product and water vapor entrained therein.

In one embodiment, aspects of the invention herein comprise a system 30 comprising the portable electronic vaporizing device 1, and a wireless charging station 20 for charging the portable electronic vaporizing device 1. According to certain embodiments, the wireless charging station 20 can be a battery-powered charging station that is capable of charging the portable electronic vaporizing device 1 from a battery 23 contained within the wireless charging station, and without requiring a separate power source (e.g. without requiring connection of the charging station to an electrical outlet during charging of the portable electronic vaporizing device 1). Thus, according to certain aspects, the wireless charging station may itself be a portable station that allows for charging of the device 1 in a variety of different environments, including when out of reach of electrical outlets. According to further aspects, the wireless charging station 20 may also be capable of providing wireless charging to battery-powered portable electronic devices other than portable electronic vaporizing devices 1, such as for example cell phones, toothbrushes, smartwatches, cameras, flashlights, and other portable electronic devices having chargeable batteries.

Figure 16:
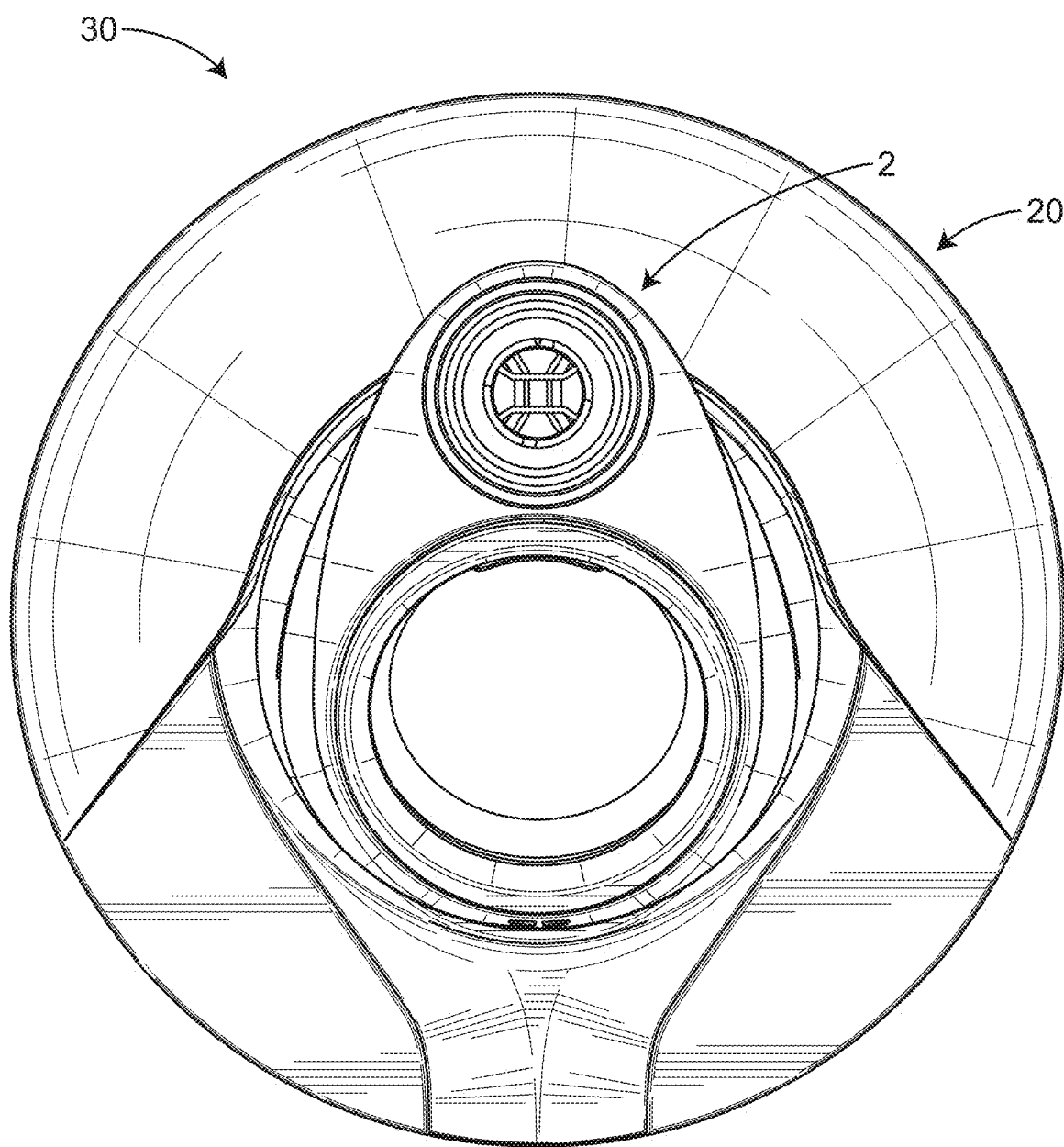
FIG. 16 shows a top plan view of an embodiment of the base of FIGS. 13A-13J as docked with the charging station of FIGS. 14A-14J.

Referring to FIGS. 13A-13J, an embodiment of a base 2 of a portable electronic vaporizing device 1 that may be used as a part of a system 30 including the device 1 and wireless charging station 20 is shown according to various different views thereof. According to one embodiment, the portable electronic vaporizing device 1 used in the system 30 can comprise any portable electronic vaporizing device described herein, such as a portable electronic vaporizing device 1 comprising a base 2, atomizer 3 and mouthpiece 4. According to yet another embodiment, the portable vaporizing device can comprise a combination of base 2, mouthpiece 4, and vaporization assembly 300, which may be for example the atomizer 3 as described elsewhere herein, and/or another assembly such as assembly that provides for vaporization of a product via inductive heating. Referring to FIGS. 14A-14J, an embodiment of a wireless charging station 20 is shown according to various different views thereof. Other embodiments of the wireless charging station 20 of than the specific embodiments herein may also be provided as a part of the system 30. FIGS. 15A-15J show an embodiment of a system 30 having the portable electronic vaporizing device 1 and wireless charging station 20, where the portable electronic vaporizing device is docked with the wireless charging station, for example to provide wireless charging from the wireless charging station 20 to the portable vaporizing device 1. FIG. 16 provides a top-down and close up view of an embodiment of the system 30, with the portable electronic vaporizing device 1 docked with the charging station.

According to certain embodiments, the system 30 for wireless charging can provide for the initiation of automatic wireless charging from the charging station to the device 1, without requiring any user input such as pushing of a button or other user signal to initiate the charging. For example, the system 30 may be capable of detecting that a spatial relationship between the device and station exists that permits charging, and may automatically initiate charging when this spatial relationship is detected, without notifying the user or otherwise awaiting user feedback before initiating the charging. According to yet another aspect, the system may be capable of powering down and/or powering up heating or other electrical functions, in relation to identification of the spatial relationship. Accordingly, embodiments of the system may provide for wireless charging of the portable vaporizing device from a battery-powered charging station in an efficient and easy-to use manner that can enhance the user's experience with the portable vaporizing device.

Figure 17:
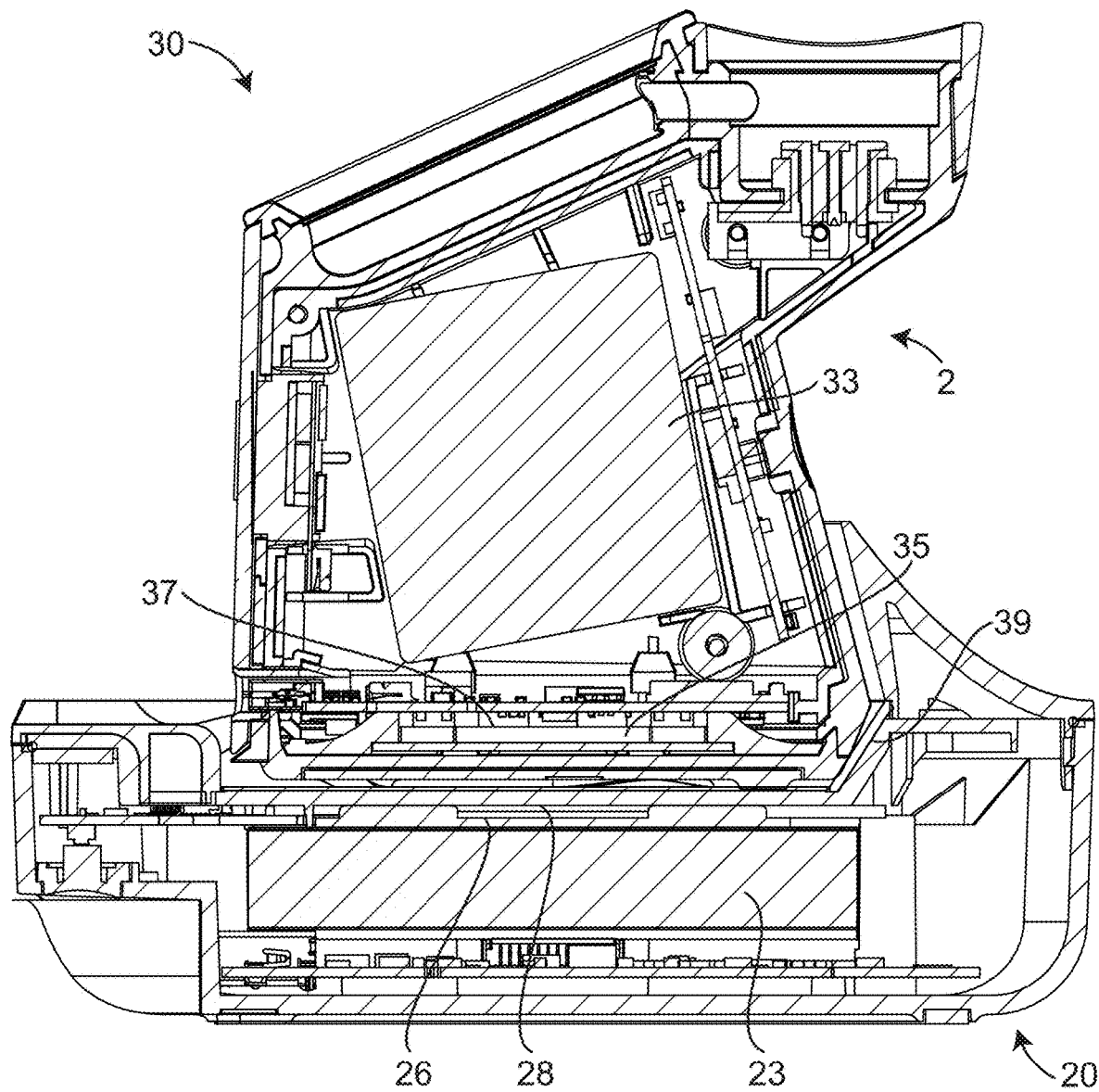
FIG. 17 shows a sectional schematic side view of an embodiment of the base of FIGS. 13A-13J as docked with the charging station of FIGS. 14A-14J.

One embodiment of the system 30 comprising the wireless charging station 20 and a portable electronic vaporizing device 1 comprises a system is shown in FIG. 17. According to the embodiment as shown, the portable electronic vaporizing device 1 comprises a base 2 that comprises a device battery 33 for charging by the wireless charging station 20. The wireless charging station 20 can also comprise a charging station battery 23 to provide for charging of the device battery 33 from the charge stored in the charging station battery 23. In the embodiment as shown, the portable vaporizing device 1 and/or base 2 thereof may further be configured to accommodate an atomizer 3 (or other vaporization assembly 300) and/or mouthpiece 4, such as any of those described herein, and/or alternative suitable components. For example, according to certain embodiments, the portable electronic vaporizing device 1 can be configured to accommodate components for the vaporization of products such as oils, waxes and/or products in liquid form. According to other embodiments, the portable electronic vaporizing device 1 can be configured to accommodate components for the vaporization of products such as herbs or solid materials. According to one embodiment, the portable electronic vaporizing device is configured to accommodate an atomizer 3 comprising a heating element 8 configured to heat a vaporizable product contained therein. For example, the atomizer 3 can comprise a container 7 for receiving the vaporizable product therein, which is heated by a heating element 8. According to yet another embodiment, the portable electronic vaporizing device is configured to accommodate another type of vaporization assembly 300, such as for example a vaporization assembly 300 that provides inductive heating of the vaporizable product. The vaporization assembly 300 can similarly comprise a container 7, and a heating device 800 configured to transfer energy to the vaporizable product in the container 7 to heat the vaporizable product and form a vapor therefrom. In one embodiment, the heating device 800 may be capable of transferring energy to the vaporizable product via any one or more of conductive, radiative, convective and inductive heating. For example, in one embodiment, the heating device 800 can comprise a heating element, such as any of those described elsewhere herein, that is capable of resistively heating the vaporizable product received in the atomizer. The portable electronic vaporizing device 1 can further be configured to accommodate a mouthpiece for receiving a flow of gas comprising the vaporizable product entrained therein from the atomizer, the mouthpiece comprising an inhalation outlet through which the flow of gas having the vaporizable product therein can exit the portable electronic device (see, e.g., FIGS. 2-3 and 6A).

According to certain embodiments, the base 2 comprises structures and/or components to provide power to the heating device 800 (e.g. heating element 8) and/or other electrical systems in the device 1. For example, the base 2 can comprise the device battery 33 (e.g. a rechargeable lithium-ion battery) for powering the heating device (e.g. heating element) and/or other electrical systems of the device, such as lighting, haptics, communications and/or wireless control systems. As discussed above, the base may also contain outlets and/or wires to connect the device with an electrical outlet and/or other devices and power supplies external to the device.

Figure 18A:
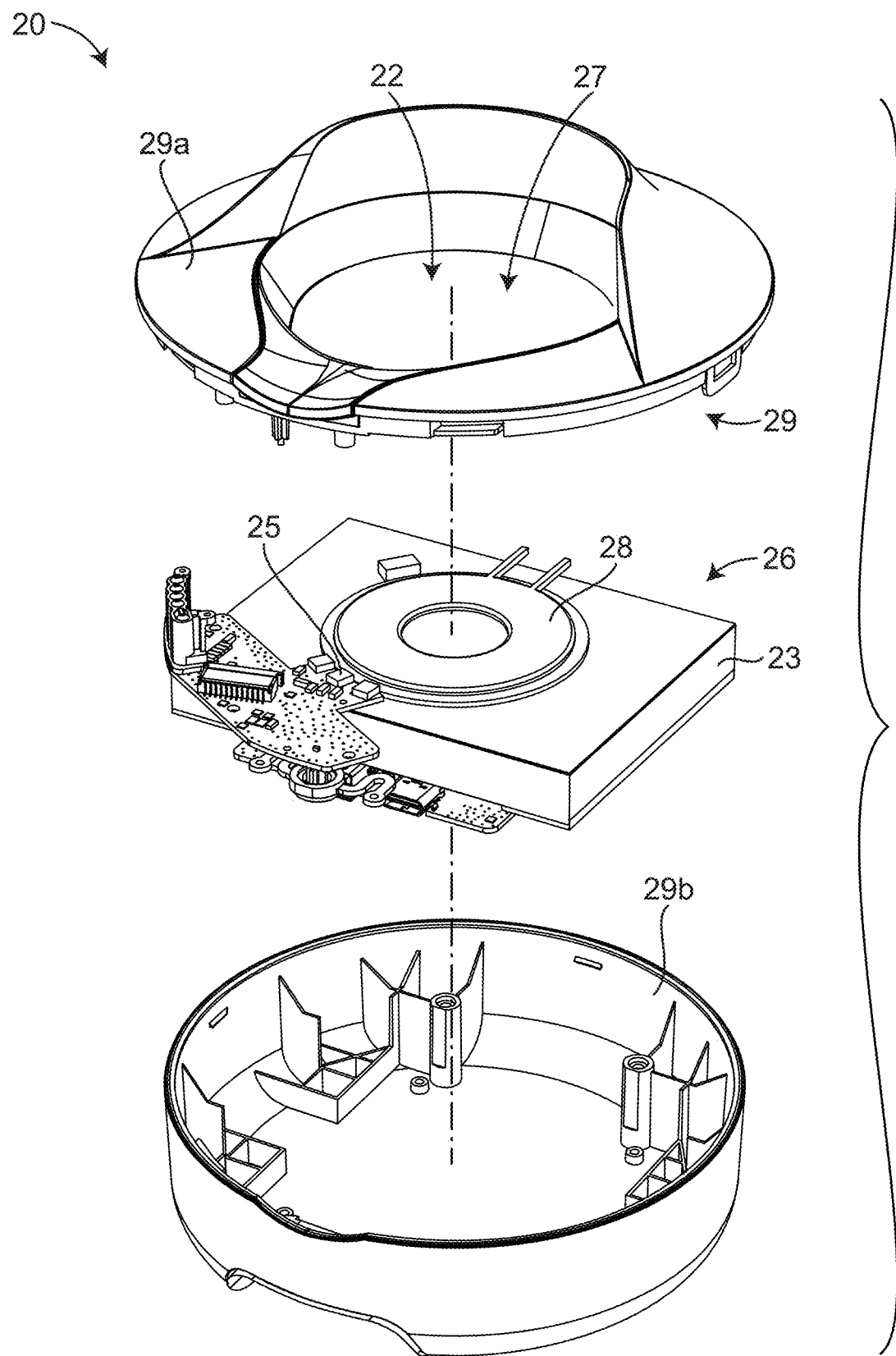
FIG. 18A shows a exploded view of the embodiment of the charging station of FIGS. 14A-14J.
Figure 18B:
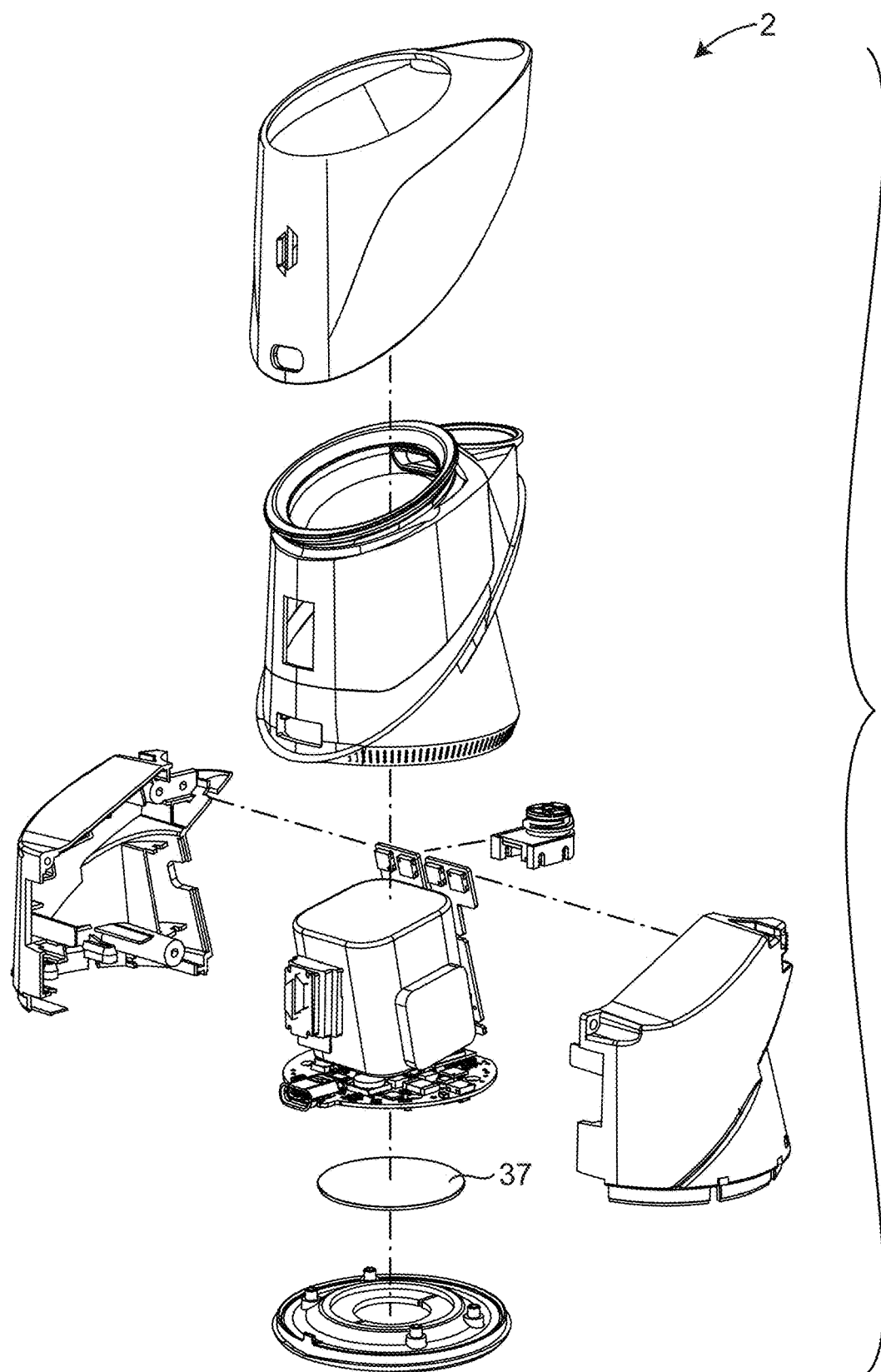
FIG. 18B shows an exploded view of the embodiment of the base of FIGS. 13A-13J.

According to certain embodiments, the base 2 comprises a wireless charge receiving system 35 that is configured to receive a wireless charge from the wireless charging station 20, to charge the device battery 33. In one embodiment, the wireless charge receiving system 35 comprises one or more of an inductive and/or resonant charging system that is capable of recharging the device battery 33 using inductively coupled energy provided by the wireless charging station. For example the wireless charge receiving system 35 can comprise one or more inductive coils 37 (and/or resonant coils) that are capable of receiving inductively coupled energy to re-charge the device battery. An example of a wireless charge receiving system 35 that provides charging via inductive coupling is the Qi standard developed by the Wireless Power Consortium, which provides for wireless power transfer using inductive coupling between a transmitting coil (e.g. in the wireless charging station 20) and a receiving coil (e.g. in the wireless charge receiving system 35 of the device base). Other methods of wirelessly coupling energy may also be provided. The wireless charge receiving system 35 can receive the wireless charge from the wireless charging station 20, and provide the charge to the device battery 33 for storage thereof and/or powering of components of the device 1. FIG. 18B shows an embodiment of a base 2 comprising an inductive coil 7 provided as a part of the wireless charge receiving system, and that is located in the docking region 39 of the base 2.

According to certain embodiments, the base 2 can comprise a docking region 39 that is configured to dock with the wireless charging station 20. For example, the docking region 39 can comprise a lower region 41 of the base 2 that is configured to be received by a receiving region 22 of the wireless charging station 20, as shown for example in FIGS. 13A-13J and FIGS. 14A-14C. According to certain embodiments, the wireless charging station 20 comprises a receiving body 24 having the receiving region 22 that is configured to receive the docking region 39 of the base, as shown for example in FIGS. 14A-14J. The docking region 39 and receiving region 22 can comprise various different configurations that may be suitable for receiving the docking region of the base 2 at the receiving region 22, and in certain embodiments the docking region 39 and receiving region 22 can be configured such that the base 2 is supported and/or retained by the wireless charging station 20, for example to provide for uninterrupted charging and/or to provide a secure holder for the base 2. In one embodiment, the docking region 39 of the base 2 is received on an upper surface 27 of the charging station 20 comprising the receiving region 22.

According to certain aspects, the wireless charging station 20 comprises a wireless charge providing system 26 to provide a wireless charge to the wireless charge receiving system 35 of the base 2, to charge the device battery 23. In one embodiment, wireless charge providing system 26 comprises one or more of an inductive and/or resonant charging system that is capable of providing inductively coupled energy to the wireless charge receiving system 35. For example the wireless charge providing system 26 can comprise one or more inductive coils 28 (and/or resonant coils) that are capable of providing inductively coupled energy that can be received by the wireless charge receiving system 35 of the base 2. As with the wireless charge receiving system 35 of the base, an example of a wireless charge providing system 26 that provides charging via inductive coupling is the Qi standard developed by the Wireless Power Consortium, which provides for wireless power transfer using inductive coupling between a transmitting coil (e.g. in the wireless charge providing system 26 of the wireless charging station 20) and a receiving coil (e.g. in the wireless charge receiving system 35 of the device base). Other methods of wirelessly coupling energy may also be provided. The wireless charge providing system 26 can further be powered by the charging station battery 23, for example without requiring a separate electrical outlet or power source, such that in effect the wireless charge is transferred from the charging station battery 23 to the device battery 33, by way of the wireless charge providing and receiving systems 26, 35. The charging station battery 23 may further be capable of providing power to other systems of the charging station 20, such as lighting, haptics, communications and/or control systems of the charging station. The charging station 20 may also comprise outlets and/or wires for receiving electrical power from a power supply external to the charging station.

According to one embodiment, the wireless charging station 20 further comprises a wireless charging station sensor 25 configured to detect a predetermined spatial relationship between the wireless charge receiving system of the base and the wireless charge providing system of the charging station. For example, the wireless charging station 20 can comprise a wireless charging station sensor 25 configured to detect a predetermined spatial relationship between the docking region 39 of the base 2 and the receiving region 22 of the wireless charging station 20, as shown for example in FIGS. 18A and 19A-19B. For example, the charging station sensor 25 may be capable of detecting whether the docking region 39 is in a position, or is close to a position, that is suitable for initiating wireless charging, and/or whether the wireless charge receiving system and wireless charge providing system are in a position that is suitable to initiate wireless charging. According to one embodiment, the charging station sensor 25 may be capable of detecting whether the docking region 39 is properly docked with the charging station 20, such as by detecting the presence of the docking region 39 at the receiving region 22. According to another embodiment, the charging station sensor 25 may be capable of detecting whether the base 2 and charging station 20 are properly aligned with respect to each other, and/or are in close enough proximity to each other, to provide for wireless charging. The predetermined spatial relationship may be, for example, a relationship that indicates that the base 2 and charging station are in a proper alignment and/or in close enough proximity to one another that wireless charging can be provided. The predetermined spatial relationship may also be, for example, a relationship that indicates that the wireless charge receiving system and wireless charge providing system are in a proper alignment and/or in close enough proximity to one another that wireless charging can be provided. According to another embodiment, the predetermined spatial relationship may be an orientation and/or configuration of the base 2 with respect to the charging station that is within certain predetermined alignment limits, such as a predetermined orientation and/or configuration range. According to yet another embodiment, the predetermined spatial relationship may be a distance between a portion of the base and a portion of the charging station that is within certain predetermined distance limits, such as a predetermined range of distances. In one embodiment, the predetermined spatial relationship detected by the sensor 25 may be an orientation and/or configuration of the wireless charge receiving system with respect to the wireless charge providing system that is within certain predetermined alignment limits, for example to provide good charging between the systems. According to yet another embodiment, the predetermined spatial relationship may be a distance between the wireless charge receiving system of the base and wireless charge providing system of charging station that is within certain predetermined distance limits.

Figure 19A:
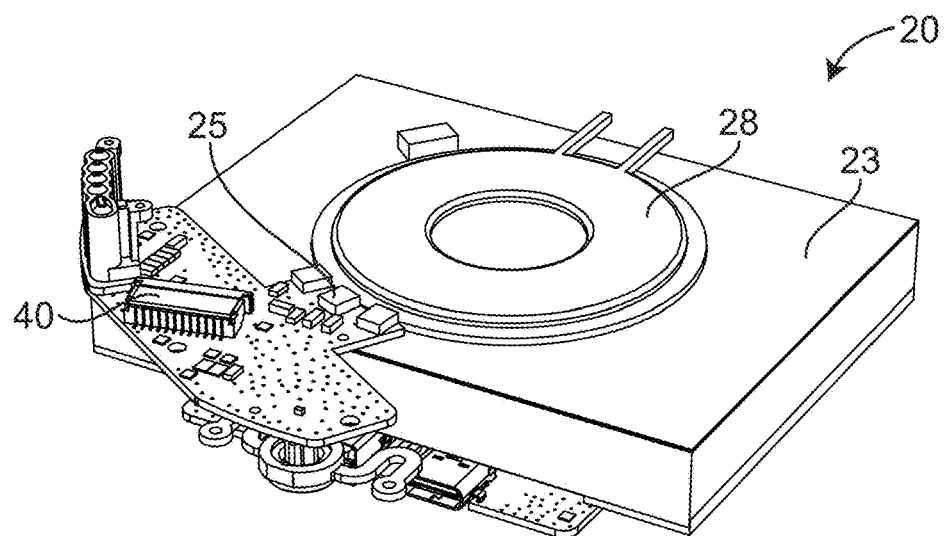
FIGS. 19A-19B are partial schematic sectional views of the embodiment of the charging station of FIGS. 14A-14J.
Figure 19B:
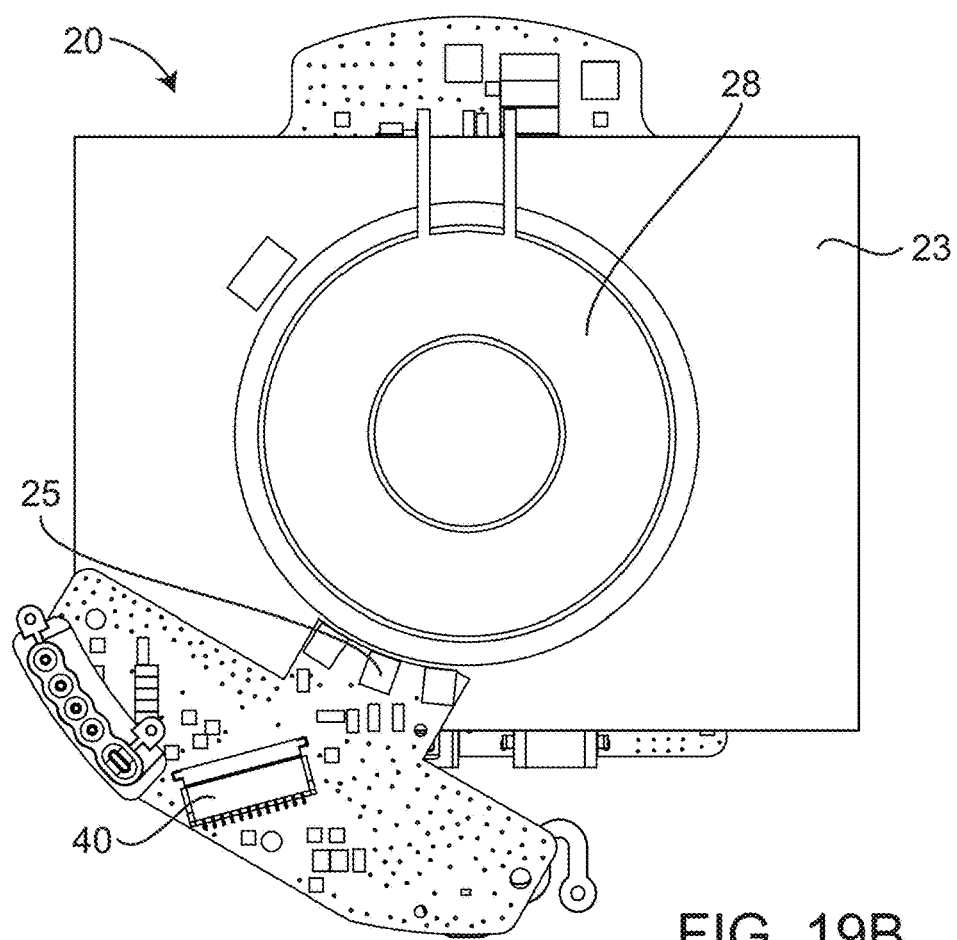

In one embodiment, where the wireless charge receiving system 35 and wireless charge providing system 26 are capable of wirelessly transferring charge via inductive and/or resonant coupling, the sensor 25 can be capable of detecting whether a predetermined spatial relationship exists between at least one inductive coil 28 of the wireless charge providing system 26 of the charging station, and at least one inductive coil 27 of the wireless charge receiving system 35 of the base 2, to provide for wireless charge transfer. For example, the sensor 25 may detect whether the inductive coils are within close enough proximity with one another, and/or are adequately aligned with each other, within tolerance limits that will allow for wireless charge transfer. Referring to FIGS. 18A and 19A-19B, embodiments are shown in which the charging station 20 comprises a sensor 25 that is configured to detect whether a predetermined spatial relationship exists between the inductive coils 37, 28 of the base 2 and wireless charging station. In these embodiments, the wireless charging station 20 comprises the inductive coil 28 for providing the wireless charge transfer and the charging station sensor 25 located within charging station housing 29 comprising top housing portion 29a and bottom housing portion 29b. For example, the top housing portion 29a can comprise the receiving region 22 for receiving the docking region 39 of the base 2, and the bottom housing portion 29b may house the charging station battery 23, wireless charge providing system 26, sensor 25 and/or other control systems.

According to certain embodiments, the charging station sensor 25 can comprise any sensor that is capable of detecting the predetermined spatial relationship between the docking region 39 of the base 2 and the receiving region 22 of the charging station 20, and/or detecting the predetermined spatial relationship between the wireless charge receiving system and the wireless charge providing system. The charging station sensor 25 can detect the predetermined relationship to determine whether the base 2 and charging station are in position with respect to one another to provide for wireless charging, for example. For example, as discussed above, the sensor may be capable of detecting whether inductive coils 37, 28 of the respective charging station and/or base 2 are within the predetermined spatial relationship, e.g. alignment and/or proximity with one another, to provide for inductive and/or resonant charging. As an example, in a case where the base 2 is not docked with the wireless charging station 20, the sensor detects that the predetermined spatial relationship does not exist, and so the conditions for wireless charging are not met. However, in a case where a user has docked the base 2 with the wireless charging station 20, and the predetermined spatial relationship exists (e.g., the base and station have been properly docked to provide for charging), the sensor is capable of detecting that the predetermined spatial relationship exists and conditions for wireless charging are met. In certain embodiments, the predetermined spatial relationship can exist even when the docking region 39 has not been fully received by the receiving region 22, such as when the docking region 39 has been brought in close enough proximity to the receiving region 22. In other embodiments, full docking and alignment of the docking region 39 and receiving region 22 may be required to meet the predetermined spatial relationship. That is, depending on the type and nature of the wireless charging to be provided, the predetermined spatial relationship may require either tight or looser tolerances for the alignment of the docking region 39 with the receiving region. In certain embodiments, docking of the docking region 39 with the receiving region 22 may be optional, for example in certain resonant wireless charging techniques the predetermined spatial relationship may only require general proximity of the inductive coils 37, 28 to one another (e.g. within a few centimeters of each other), such that the device battery 33 may be charged even when simply adjacent to, but not docked with, the charging station 20. According to yet another embodiment, the charging station sensor 25 is capable of detecting the presence of the docking region 39 of the base 2 on the upper surface 27 of the wireless charging station 20.

Figure 20:
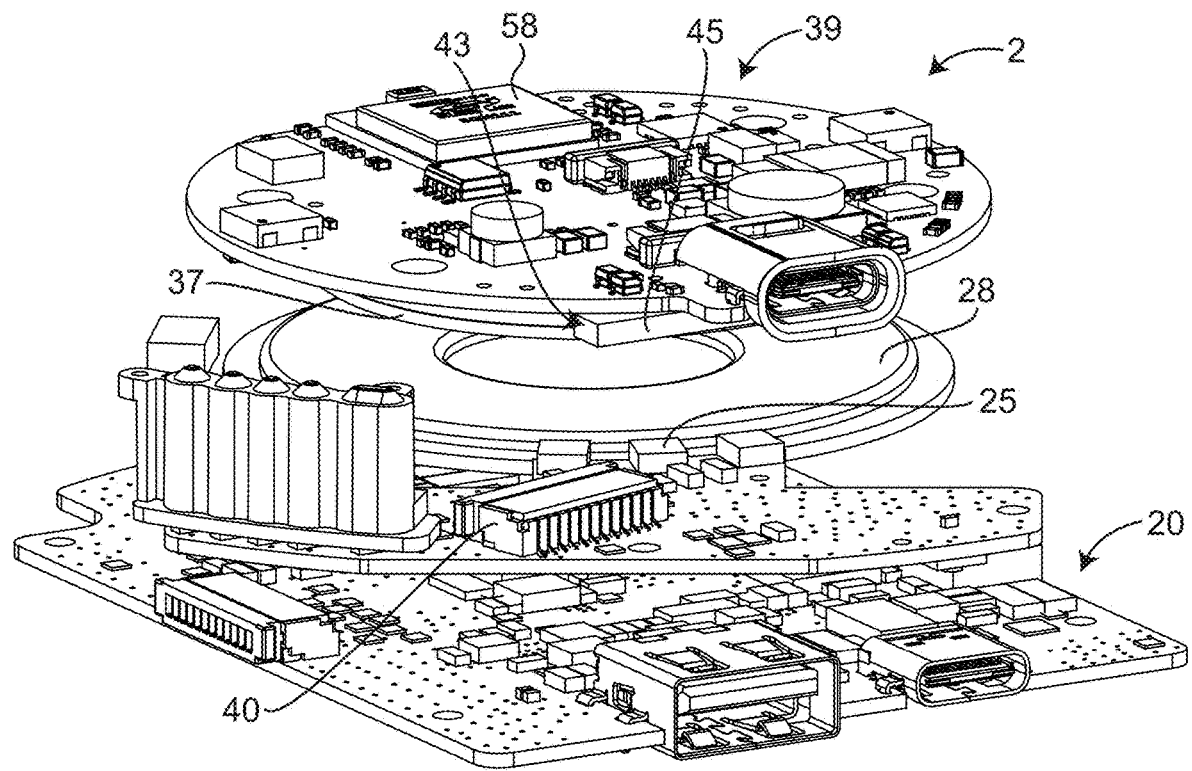
FIGS. 20-21 are partial exploded views showing docking of portions of the base of FIGS. 13A-13J with the charging station of FIGS. 14A-14J.

According to certain embodiments, the charging station sensor 25 can comprise any one or more a Hall effect sensor, an inductive sensor, a light detector, a pressure sensor, a reed switch, an infrared (IR) proximity sensor and near field communication (NFC) sensor, or other suitable sensor that is capable of detecting the predetermined spatial relationship. According to certain embodiments, the Hall Effect sensor is a sensor that is cable of measuring and/or detecting the magnitude of a magnetic field, and output a voltage in relation to the detected magnetic field. In certain embodiments, the Hall Effect sensor can be combined with threshold detection such that the sensor provides an output indicative of detection once a magnetic field of a certain magnitude has been detected. Accordingly, the proximity and/or alignment of a magnetic field generating element with respect to the Hall Effect sensor can be detected, by detection of whether the magnitude of the magnetic field is large enough to be indicating of proximity and/or alignment. In one embodiment, as shown in FIG. 20, the charging station sensor 25 is capable of detecting whether the predetermined spatial relationship exists by detecting a sensor alignment indicator 43 provided in the docking region 39 of the base. The sensor alignment indicator 43 may be an indicator that is detectable by the charging station sensor 25, or that otherwise provides a signal to the sensor 25, to indicate whether the predetermined spatial relationship exists. For example, in a case where the charging station sensor 25 comprises a Hall Effect sensor that detects the presence of magnetic fields, the sensor alignment indicator 43 can comprise magnetic field generating element 45, such as an electromagnet or permanent magnet, that can be detected by the Hall Effect sensor when the predetermined spatial relationship is met, such as when the magnetic field generating element is brought within detection range of the Hall Effect sensor. For example, the Hall Effect sensor can detect when the docking region 39 of the base has been received on the upper surface 27 of the charging station, and/or is in position for wireless charging.

In the embodiment as shown in FIG. 20, the magnetic field generating element 45 is provided in the docking region 39 of the base 2 such that, when the base is docked with the wireless charging station 20, the magnetic field generating element 45 is aligned substantially above the Hall Effect Sensor, in a position where the inductive coils 37, 28 are aligned for wireless charging. For example, in the embodiment as shown in FIG. 20, the Hall Effect sensor (sensor 25) is positioned adjacent to, and at a periphery of, the inductive coil 28, and the magnetic field generating element 45 is positioned adjacent to, and at a periphery of, the inductive coil 37, such that the Hall Effect sensor detects the magnetic field generating element when the base is docked and the coils 28, 37 are aligned for wireless charging. Other sensors other than Hall Effect sensors may also be used to detect the predetermined spatial relationship. For example, a light detector may detect a light signature of the base region, and/or a pressure sensor may detect pressure corresponding to proper docking of the base region. As another example, the sensor alignment indicator 43 can comprise, for example, markings or other indicia on the docking region that can be detected to determine the spatial relationship of the docking region with respect to the charging station.

According to one embodiment, the charging station sensor 25 and/or the sensor alignment indicator 43 provided in the docking region 39 of the base 2 may be relatively low power devices, so as to reduce a draw of power on the charging station battery 23 and/or device battery 33. For example, in one embodiment, the charging station sensor 25 may be able to continuously detect whether or not the predetermined spatial relationship exists, without excessively running down charge in the charging station battery 23, so the charging station can continue to operate for significant durations of time without having to be plugged into an outlet or other external power source. For example, the Hall Effect sensor may provide a relatively low power sensor that can continuously monitor for the presence of the base docked with the charging station, and can be coupled with a permanent magnet as the sensor alignment indicator 43 of the base, which does not require any power from the device battery 33 to be detected by the Hall Effect sensor. Other low power/low power draw charging station sensors 25 and/or alignment indicators 43 can also be provided. In one embodiment, the charging station sensor 25 uses less than 5 mA, less than 3 mA, less than 2 mA, less than 1.5 mA and/or less than 1 mA of power, for sensing the predetermined spatial relationship (and assuming the charging station battery is not used to wirelessly charge during that time). Furthermore, according to certain embodiments, in the case where wireless charging occurs via inductive coils provided 37, 28 provided in the charging station and base, the charging device sensor 25 can comprise a device that is other than the inductive coil 37 provided for wireless charging. That is, while the inductive coil 28 of the charging station may be capable of detecting the presence of inductive coil 37 of the base in certain embodiments, the inductive coil 28 in certain embodiments is not used for this purpose, and is maintained in a powered-down or at least low power state, for example when wireless charging is not being performed. Accordingly, in certain embodiments, the separate charging station sensor can provide a low power alternative that allows for continuous detection of whether a predetermined spatial relationship indicative of suitability for charging is met, without requiring powering of the coils or systems used for transmitting the wireless charge during this detection stage.

According to further embodiments, the wireless charging station further comprises a wireless a wireless charging station controller 40 configured to activate the wireless charge providing system 26 to automatically initiate wireless charging to the wireless charge receiving system 35 of the base 2, in relation to detection of the predetermined spatial relationship between the docking region 39 of the base and the receiving region 22 of the charging station (and/or detection of the predetermined spatial relationship between the wireless charge receiving system and wireless charge providing system), by the wireless charging station sensor 25. The wireless charging station controller 40 can comprise, for example, a CPU coupled to memory and/or any other control device and/or circuit that is capable of receiving and/or processing signals from the charging sensor 25, and provide signals to the wireless charge providing system 26 to initiate and/or control a wireless charging process to charge the device battery 33. That is, according to certain embodiments, upon detection of the predetermined spatial relationship by the sensor 26, e.g. that the base has been docked with the charging station 20 (or the wireless charge receiving system and charge providing system are otherwise in sufficient proximity and/or proper alignment with respect to one another, the controller 40 provides a signal to the wireless charge providing system 26 to initiate charging, for example by powering up the inductive coil 28 to inductively couple energy to the coil of the base. According to certain embodiments, the initiation of wireless charging comprises powering up the wireless charge providing system 26 and/or coil 28 from a dormant and/or from a low power state, or in other words from a state where energy is not being transmitted and/or transmitted only at low levels. For example, in certain embodiments, the inductive coil 28 may be maintained in a powered-down state that substantially does not transmit energy, until the predetermined spatial relationship is detected, in order to limit the power draw from the charging system battery. As an alternate embodiment, the wireless charging station controller 40 may be capable of providing a signal to a user (e.g. via lights, haptics, sound, or display of a message) that the conditions for wireless charging are met, and may wait for further input from the user to initiate wireless charging. However, according to embodiments herein, the wireless charging station is capable of automatically initiating wireless charging via the wireless charge providing system in response to detection of the predetermined spatial relationship, without requiring any further input or acknowledgement by the user.

According to certain embodiments, the controller 40 of the wireless charging station may be configured to automatically initiate wireless either charging immediately upon detection of the predetermined spatial relationship, or after a predetermined duration of time has passed following detection of the predetermined spatial relationship. That is, the controller 40 may be pre-programmed with a delay before wireless charging is initiated, for example to ensure that the user has properly docked the base, or in case the user docks but then immediately removes the base from the charging station, and/or to give the user a period of time in which to provide input to the charging station to de-select automatic charging after docking, should the user desire to do so. According to certain embodiments, when the wireless charging between the wireless charge providing system of the charging station and the wireless charge receiving system of the base has been initiated, the wireless charging can be continued until any one or more of a wireless charge endpoint is reached, until the user removes the base from the wireless charging station, and/or the user provides input to the base 2 and/or wireless charging station 20 to cease charging. For example, in one embodiment, the charging station controller 40 may be configured to control the wireless charge providing system to cease wireless charging once a wireless charging end condition is met, which may be, for example, a predetermined wireless charging duration, or determination that adequate charging of the device battery 33 has been performed, such as by receiving a signal from base and/or receiving input from the user. In one embodiment, the wireless charge providing system may be capable of detecting when the device battery 33 has been adequately charged. Once the wireless charging end condition is met, the wireless charge providing system and/or coil 28 may be powered down by the controller 40 (and the same may be true for the wireless charge receiving system and coil 37) to preserve battery charge. In one embodiment, the charging station sensor 25 is configured to detect when the docking region has been moved with respect to the receiving region (or the wireless charge receiving system has otherwise been moved with respect to the wireless charge providing system) such that they are no longer in the predetermined spatial relationship with respect to one another. In this embodiment, the wireless charging end condition can correspond to detection of the end of the predetermined spatial relationship, in which case the wireless charge providing system and/or coil 28 may be powered down by the controller 40 to preserve battery charge (the wireless charge receiving system and coil 37 in the base may also be powered down). For example, the controller 40 can be configured to automatically cease wireless charging when the docking region of the base is removed from the receiving region of the wireless charging station.

Figure 21:
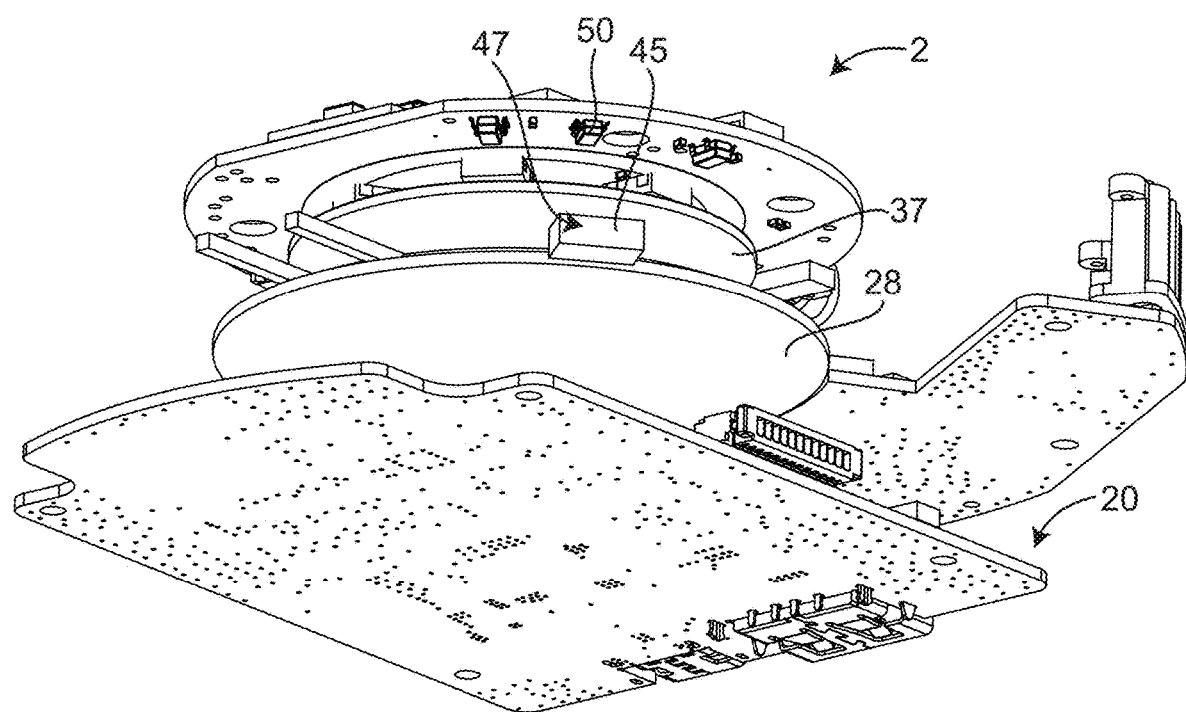
Figure 22A:
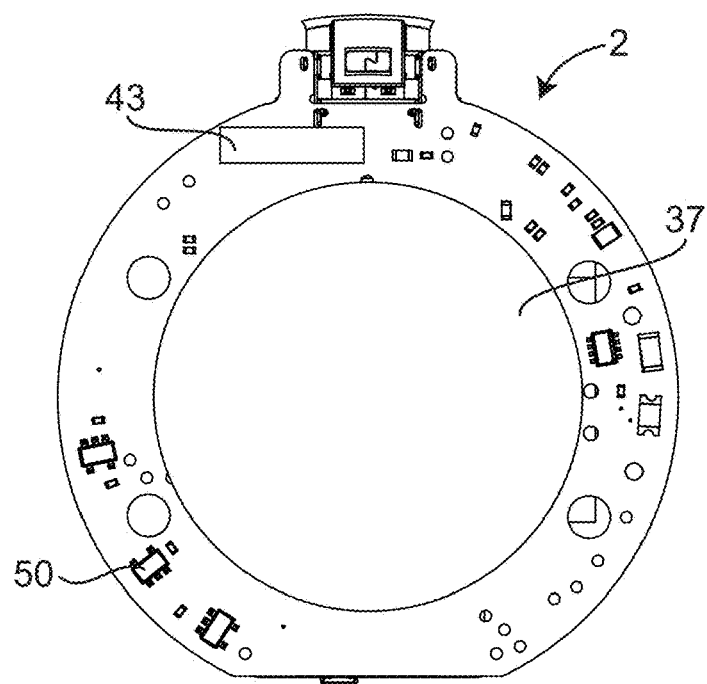
FIGS. 22A-22B are partial sectional and schematic views of the base of FIGS. 13A-13J, showing an embodiment of a wireless charge receiving system.
Figure 22B:
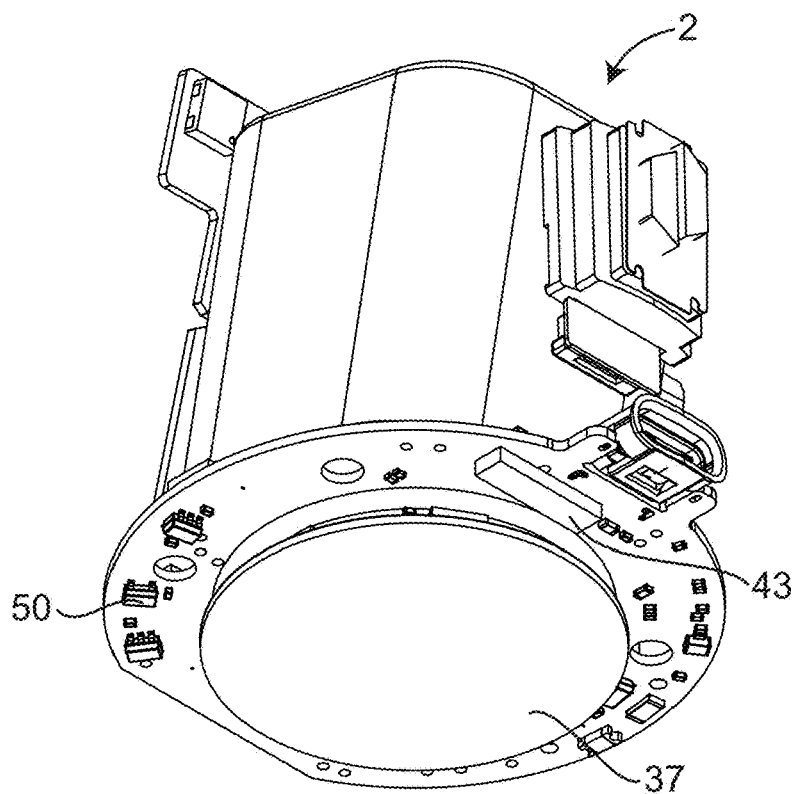

According to further embodiments, the base 2 can further comprise a base sensor 50 that is similarly configured to detect the predetermined spatial relationship, in order to perform operations of the base in relation to whether the base is or is not docked for charging with the wireless charging station, as shown for example in FIGS. 21 and 22A-22B. In certain embodiments, the base sensor 50 can comprise any of the sensor configurations and/or devices described for the charging station sensor 25, to detect the predetermined spatial relationship. The predetermined spatial relationship may be detected, for example, to signal initiation of wireless charging of the base. According to further embodiment, the predetermined spatial relationship can be detected by the base in order to control initiation or ceasing of a heating cycle with the heating element.

According to certain embodiments, the base sensor 50 can comprise any one or more of a Hall effect sensor, an inductive sensor, a light detector, a pressure sensor, a reed switch, an infrared (IR) proximity sensor and near field communication (NFC) sensor, or other suitable sensor that is capable of detecting the predetermined spatial relationship. As discussed above, the Hall Effect sensor is a sensor that is cable of measuring and/or detecting the magnitude of a magnetic field, and output a voltage in relation to the detected magnetic field. In certain embodiments, the Hall Effect sensor can be combined with threshold detection such that the sensor provides an output indicative of detection once a magnetic field of a certain magnitude has been detected. Accordingly, the proximity and/or alignment of a magnetic field generating element with respect to the Hall Effect sensor can be detected, by detection of whether the magnitude of the magnetic field is large enough to be indicating of proximity and/or alignment. In one embodiment, as shown in FIG. 21, the base sensor 50 is capable of detecting whether the predetermined spatial relationship exists by detecting a sensor alignment indicator 47 provided in the receiving region 22 of the wireless charging station 20. The sensor alignment indicator 47 may be an indicator that is detectable by the base sensor 50, or that otherwise provides a signal to the sensor 50, to indicate whether the predetermined spatial relationship exists. For example, in a case where the base sensor 50 comprises a Hall Effect sensor that detects the presence of magnetic fields, the sensor alignment indicator 47 can comprise magnetic field generating element 45, such as an electromagnet or permanent magnet, that can be detected by the Hall Effect sensor when the predetermined spatial relationship is met, such as when the magnetic field generating element is brought within detection range of the Hall Effect sensor. For example, the Hall Effect sensor can detect when the docking region 39 of the base has been received on the upper surface 27 of the charging station, and/or is in position for wireless charging.

In the embodiment as shown in FIG. 21, the magnetic field generating element 45 is provided in the receiving region 22 of the wireless charging station 20 such that, when the base is docked with the wireless charging station 20, the magnetic field generating element 45 of the station is aligned substantially below the Hall Effect sensor of the base, in a position where the inductive coils 37, 28 are aligned for wireless charging. For example, in the embodiment as shown in FIG. 21, the Hall Effect sensor of the base (sensor 50) is positioned adjacent to, and at a periphery of, the inductive coil 37, and the magnetic field generating element 45 of the wireless charging station 20 is positioned adjacent to, and at a periphery of, the inductive coil 28, such that the Hall Effect sensor detects the magnetic field generating element when the base is docked and the coils 28,37 are aligned for wireless charging. Other sensors other than Hall Effect sensors may also be used to detect the predetermined spatial relationship. For example, a light detector may detect a light signature of the base region, and/or a pressure sensor may detect pressure corresponding to proper docking of the base region. As another example, the sensor alignment indicator 47 of the wireless charging station can comprise, for example, markings or other indicia on the receiving region of the station that can be detected to determine the spatial relationship of the docking region with respect to the charging station.

Figure 23:
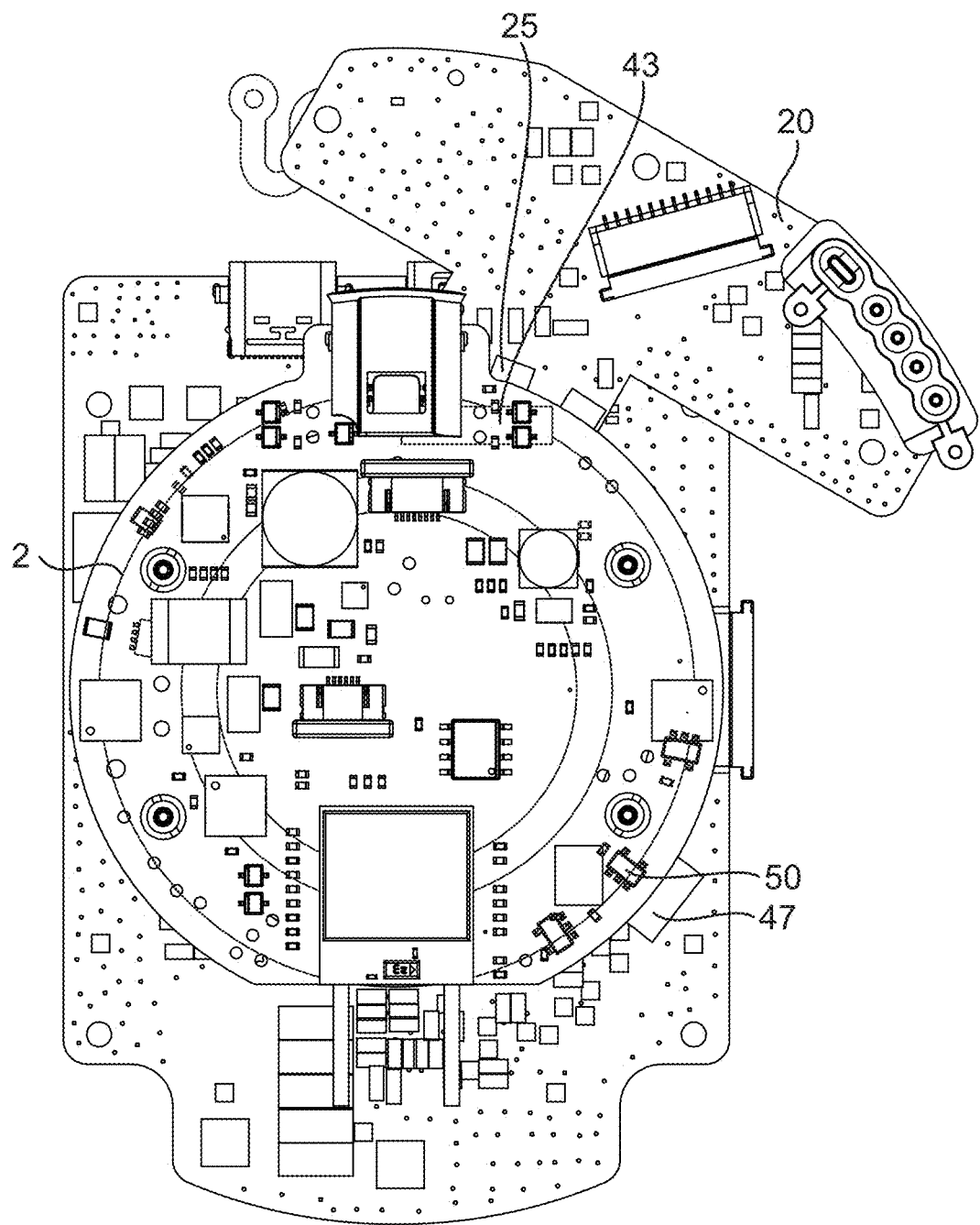
FIG. 23 is another partial exploded view showing docking of portions of the base of FIGS. 13A-13J with the charging station of FIGS. 14A-14J.

Referring to FIG. 23, an embodiment is shown of a sectional top view of system 30 depicting the overlap and/or alignment of the sensors 25, 50 and alignment indicators 47, 43 (e.g. magnets) in the base 2 and wireless charging station 20, when the base is docked with the charging station 20. In the embodiment as shown, the base sensor 50 is positioned over the charging station alignment indicator 47 (e.g. magnet), and the charging station sensor 25 is positioned underneath the base station alignment indicator 43 (e.g. magnet), when the base 2 is docked with the charging station, such that the docking relationship and conditions suitable for charging and/or heating functions can be detected.

According to one embodiment, the base sensor 50 and/or the charging station sensor alignment indicator 47 provided in the receiving region 22 of the charging station 20 may be relatively low power devices, so as to reduce a draw of power on the charging station battery 23 and/or device battery 33. For example, in one embodiment, the base sensor 50 may be able to continuously detect whether or not the predetermined spatial relationship exists, without excessively running down charge in the device battery 30, so the device 20 and/or base 2 can continue to operate for significant durations of time without having to be plugged into an outlet or other external power source. For example, the Hall Effect sensor may provide a relatively low power sensor that can continuously monitor for the presence of the receiving region of the charging station, and can be coupled with a permanent magnet as the sensor alignment indicator 47 of the charging station, which does not require any power from the device charging station battery 23 to be detected by the Hall Effect sensor. Other low power/low power draw base sensors 50 and/or alignment indicators 47 can also be provided. In one embodiment, the base sensor 50 uses less than 5 mA, less than 3 mA, less than 2 mA, less than 1.5 mA and/or less than 1 mA of power, for sensing the predetermined spatial relationship (and assuming the device battery is not used for heating cycles during that time). Furthermore, according to certain embodiments, in the case where wireless charging occurs via inductive coils provided 37, 28 provided in the charging station and base, the base sensor 50 can comprise a device that is other than the inductive coil 37 provided for wireless charging. That is, while the inductive coil 37 of the base may be capable of detecting the presence of inductive coil 28 of the charging station in certain embodiments, the inductive coil 37 in certain embodiments is not used for this purpose, and is maintained in a powered-down or at least low power state, for example when wireless charging is not being performed. Accordingly, in certain embodiments, the separate base sensor can provide a low power alternative that allows for continuous detection of whether a predetermined spatial relationship indicative of suitability for charging is met, without requiring powering of the coils or systems used for receiving the wireless charge during this detection stage.

In certain embodiments, the base comprises a base controller 58 as shown for example in FIG. 20, that is configured to activate and/or de-activate functions of the base in relation to detection of the predetermined spatial relationship between the docking region 39 of the base and the receiving region 22 of the charging station (or otherwise between the wireless charge receiving system and wireless charge providing system), by the base sensor 50. For example, the base controller 58 can comprise a heating controller configured to control the heating device 800 (e.g. heating element 8) in relation to detection of the predetermined spatial relationship. The base controller 58 can comprise, for example, a CPU coupled to memory and/or any other control device and/or circuit that is capable of receiving and/or processing signals from the base sensor 50, and provide signals to components and/or systems of the base, such as the heating element 8 and/or the wireless charge receiving system 35. For example, according to certain embodiments, upon detection of the predetermined spatial relationship by the sensor 50, e.g. that the base has been docked with the charging station 20, the controller 58 provides one or more signals to the wireless charge receiving system 35, for example to power-up and/or receive a charge from the power station. Alternatively, the wireless charge receiving system 35 may be capable of receiving the wireless charge without requiring detection by the sensor 50, such as for example when wireless charging is initiated by the wireless charge providing system of the base in response to detection by the charging station sensor 25. According to other embodiments, upon detection of the predetermined spatial relationship by the sensor 50, e.g. that the base has been docked with the charging station 20, the controller 58 provides one or more signals to control heating with the heating device 800 (e.g heating element 8), such as for example to reduce and/or cease heating, and/or to initiate a heating cycle when the base has been removed from the charging station.

For example, in one embodiment, the controller 58 may be configured to send one or more signals to reduce and/or cease heating by the heating device 900 (e.g. heating element 8), when the predetermined spatial relationship is detected by the base sensor 50. For example, the controller 58 may instruct that heating is reduced and/or completely halted, when the base is docked with the charging station, such as for example to allow for uninterrupted charging of the device battery 33. In certain embodiments, the controller 58 may automatically reduce and/or halt heating with the heating device, when the predetermined spatial relationship is detected by the sensor, for example without requiring any input from the user. As an alternate embodiment, the controller 58 may be capable of providing a signal to a user (e.g. via lights, haptics, sound, or display of a message) to request input from the user to reduce and/or cease heating. However, according to embodiments herein, the base is capable of automatically ceasing and/or reducing heating with the heating device, in response to detection of the predetermined spatial relationship, without requiring any further input or acknowledgement by the user.

According to yet another embodiment, the controller 58 may be configured to send one or more signals to increase heating and/or initiate a heating cycle with the heating device 800 (e.g. heating element 8), when the base sensor detects that the predetermined spatial relationship no longer exists, for example when the docking region of the base and the receiving region of the charging station are no longer in the predetermined spatial relationship because the base has been removed from the charging station. For example, while the heating device 800 may be powered down or maintained in a reduced heating state while being charged by the charging station, the heating device 800 (e.g. heating element 8) may be automatically controlled to increase heating and/or initiate a heating cycle, when the base has been removed from the charging station, such as for use by the user. In certain embodiments, the controller 58 may automatically increase heating and/or initiate a heating cycle with the heating device, when the sensor 50 detects that the predetermined spatial relationship no longer exists (e.g. that the base has been removed from the charging station), for example without requiring any input from the user. As an alternate embodiment, the controller 58 may be capable of providing a signal to a user (e.g. via lights, haptics, sound, or display of a message) to request input from the user to initiate a heating cycle and/or increase heating. However, according to embodiments herein, the base is capable of automatically initiating a heating cycle and/or increasing heating with the heating device, in response to detection by the sensor 50 that the predetermined spatial relationship no longer exists (e.g., that a change in the spatial relationship between the base and charging station has occurred such that the criteria for the predetermined spatial relationship is no longer met), without requiring any further input or acknowledgement by the user. According to certain embodiments, to initiate a heating cycle with the heating device, the controller 58 can control a current provided to the heating device (e.g. heating element 8) to provide a predetermined rate of increase of the temperature of the heating device, such as for example to achieve a suitable temperature for vaporization of a vaporizable product provided in atomizer of device 1 having the base 2.

According to certain embodiments, the controller 58 of the base may be configured to either automatically increase heating and/or initiate a heating cycle either immediately upon detection that the predetermined spatial relationship no longer exists, or after a predetermined duration of time has passed following detection that the predetermined relationship no longer exists. For example, the controller 58 may be pre-programmed with a delay before heating is initiated and/or increased, for example to ensure that the base has been properly removed from the charging station, or in a case where the user undocks but then immediately re-docks the base, and/or to give the user a period of time in which to provide input to the base regarding heating, should the user decide to do so. Similarly, according to certain embodiments, the controller 58 of the base may be configured to either automatically reduce and/or cease heating by the heating device 800, either immediately upon detection of the predetermined spatial relationship, or after a predetermined duration of time has passed following detection of the predetermined spatial relationship. For example, the controller 58 may be pre-programmed with a delay before heating is reduced and/or ceased, for example to ensure that the user has properly docked the base, or in case the user docks but then immediately removes the base from the charging station, and/or to give the user a period of time in which to provide input to the base to maintain heating after docking, should the user desire to do so.

Thus, the controller 58 may control heating with the heating device (e.g. heating element 8) in relation to a change in the arrangement between the base and charging station, reflected in the detection of the existence or absence of the predetermined spatial relationship. For example, in the case where a Hall Effect sensor is provided as the sensor 50 of the base and is paired with a magnet in the charging station, when the base is removed from the charging station, the sensor 50 detects that a magnetic field from the magnet is no longer present, and thus the criteria for the predetermined spatial relationship is no longer met. Conversely, when the base is brought back for docking with the charging station, the sensor 50 detects the magnetic field from the charging station magnet is present, and the criteria for the predetermined spatial relationship is met. The controller may thus provide signals to automatically de-activate and/or reduce heating while the base is re-charging, and/or to automatically re-activate and/or increase heating when the base has been removed from the charging station, so the device can be prepared for use by the user. In certain embodiments, the controller 58 may be configured to provide signals to have the base automatically enter a "standby" mode with reduced and/or ceasing of heating during charging, and automatically enter a "ready" mode where heating has been initiated and/or increased to provide for vaporization of the product, when the base is removed from the charging station.

Referring again to FIGS. 14A-14J, 15A-15J and 16, according to certain embodiments, the receiving region 22 of the charging station is configured to receive the docking region 39 of the base in a predefined orientation of the docking region with respect to the receiving region. For example, the receiving region 22 may be shaped in relation to the base 2 and/or docking region 39, such that docking of the base is directional with respect to the charging station. In the embodiments as shown, the charging station comprises sidewalls 60 that define the receiving region 22, the sidewalls 60 being configured to accommodate the docking region in the predefined orientation, where the charging station further comprises an aperture 61 in the sidewalls 60 that is configured to pass the docking region therethrough to be received by the receiving region 22. The sidewalls 60 may, according to certain embodiments, help to retain the base 2 at the receiving region. The sidewalls 60 can also be contoured to receive the docking region 39 of the base in a predefined orientation that facilitates detection by the sensors 25, 50 of the predetermined spatial relationship. For example, the sidewall contour and/or shape may be selected to conform or otherwise fit to a first side 63 of the base (see, e.g., FIG. 15G), such that the base fits with the receiving region and/or sidewalls of the receiving region only when the first side 63 is oriented facing the sidewalls (e.g. other sides of the base do not fit with the receiving region and/or sidewalls when oriented facing the sidewalls), to provide a directional fit of the base that assists the user in properly docking the base in a position where, for example, charging coils of the base and charging station are aligned. In one version, the sidewalls 60 are angled inwardly towards a center of the charging station at an angle that accommodates an angle of the first side 63 of the base, but that does not accommodate an angle of a second opposing side 64 of the base (see, e.g., FIG. 13E), such as for example where the first side of the base is more angled but the second side is more straight, such that the base is required to be directionally docked with the first side facing the sidewalls. The sidewalls 60 may also be provided to angle inwardly to at least partially cover and accommodate a lower portion of the angled first side 63 of the base, and help to retain the base on the charging station. As another example, in the case where the charging station sensor 25 (or the base sensor 50) comprises a Hall effect sensor, and the docking region 39 (or receiving region 22) comprises a magnetic field generating element, and the receiving region and/or sidewalls may be configured to receiving the docking region of the base in an orientation such that the Hall effect sensor and magnetic field generating element of the respective base and/or charging station are aligned with one another, such that the predetermined spatial relationship can be detected. In yet another embodiment, the receiving region 22 comprises a pocket 62 or depression that is sized to receive a lower portion 41 of the base, and that may also position and retain the base on the charging station. According to some embodiments, this pocket and/or depression may also be directional so as to provide a predetermined alignment between the base and charging station.

Figure 24A:
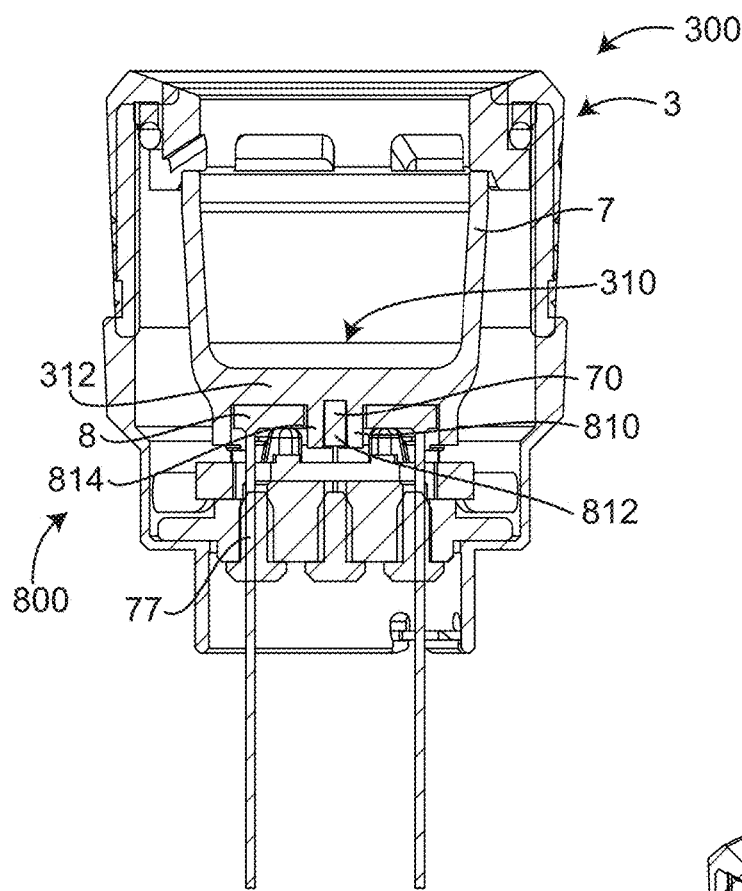
FIGS. 24A-24B are sectional schematic views of an embodiment of an atomizer for the portable electronic vaporizing device.
Figure 24B:
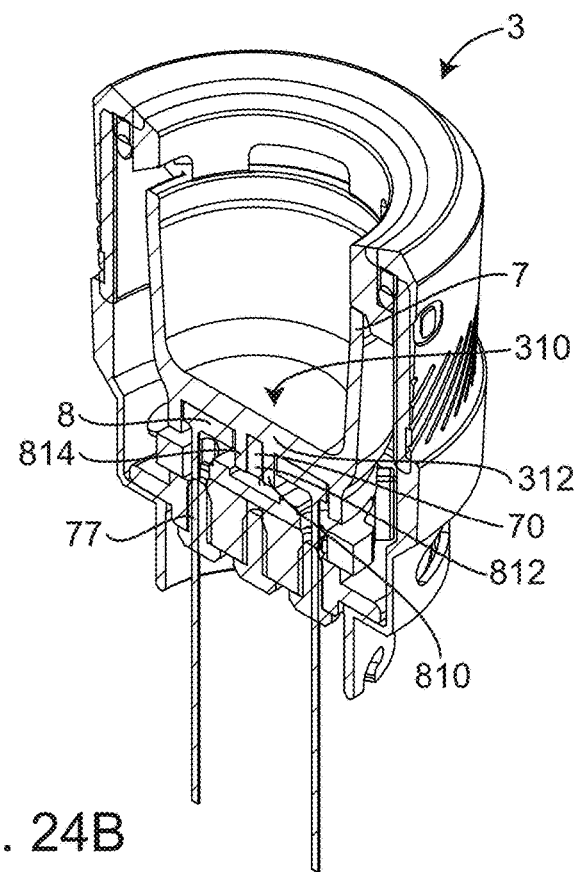
Figure 26:
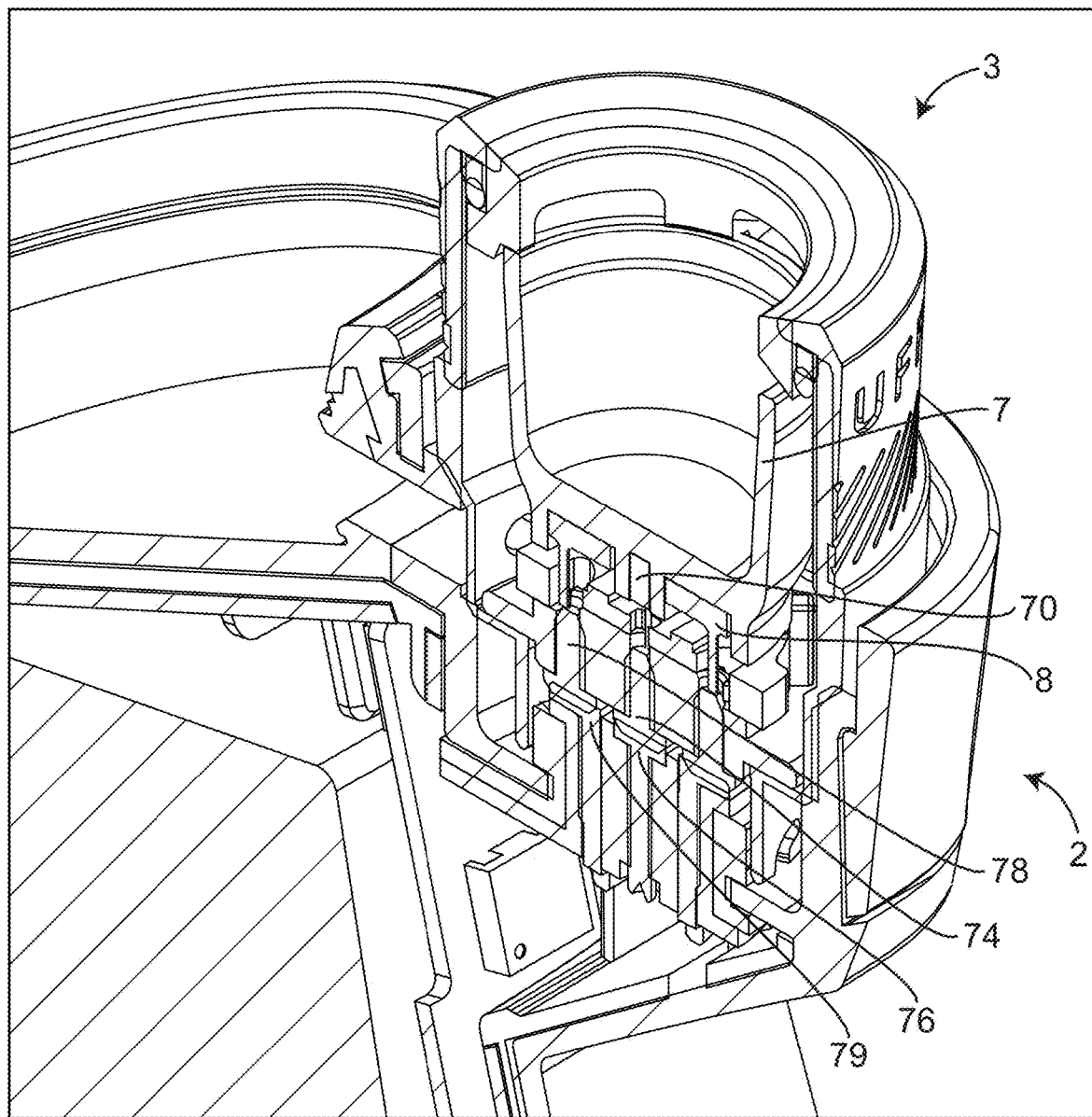
FIG. 26 is a sectional schematic side view of an embodiment of an atomizer and base for a portable electronic vaporizing device, showing a heating element and temperature sensor.
Figure 27A:
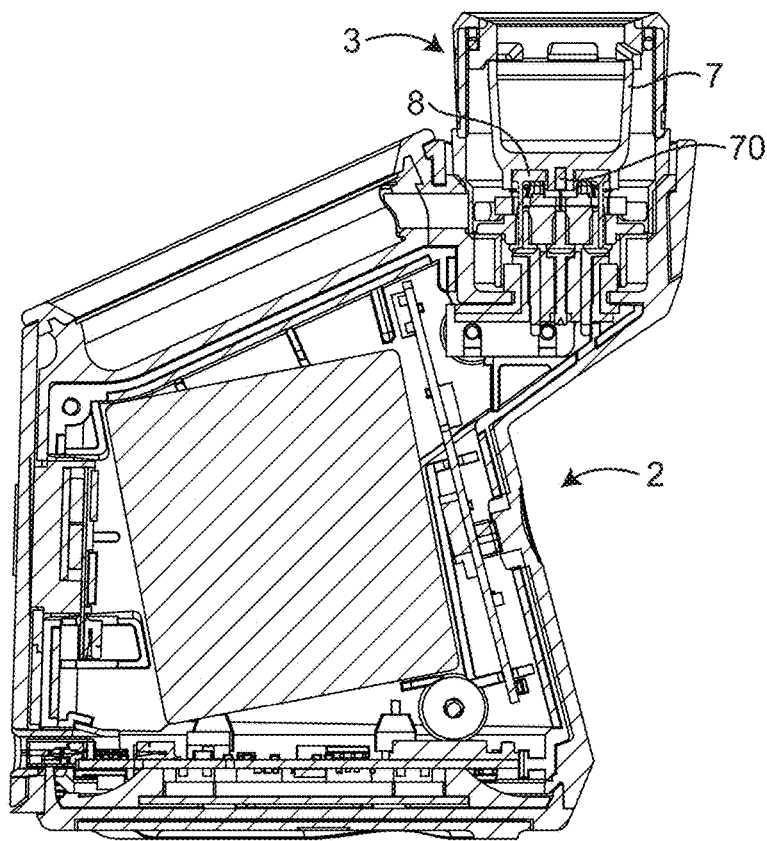
FIGS. 27A-27B are sectional schematic side views of an embodiment of an atomizer and base for a portable electronic vaporizing device, with temperature sensor.
Figure 27B:
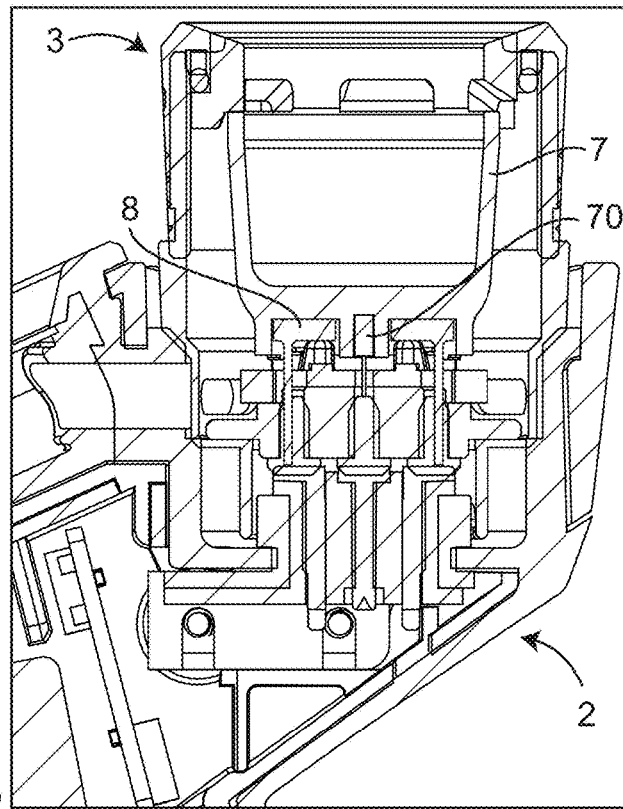

Referring to FIGS. 24A-24B, according to yet another embodiment, the device 1 can comprise a vaporization assembly 300 such as an atomizer 3 having a container 7 to receive a vaporizable product therein, such as for example as discussed above, and can further comprise a temperature sensor 70 configured to detect a temperature of any one or more of the container and/or vaporizable product held within the container 7. In the embodiment as shown in FIGS. 24A-24B, the temperature sensor 70 is disposed below a bottom surface 310 of the bottom wall 312 container 7 to provide temperature sensing in relation to the vaporizable product at the bottom surface 310, while also shielding the temperature sensor 70 from contact with vaporizable product in the container. According to certain embodiments, the temperature sensor 70 is configured to provide a signal to the heating controller 58 in relation to a temperature detected by the temperature sensor, for example to provide feedback control of a heating device 800 such as a heating element 8 in response to the temperature detected by the temperature sensor. For example, the heating controller 58 may adjust a current provided to the heating element 8 in response to a signal provided by the temperature sensor 70, such as for example to reduce and/or increase heating by the heating element to achieve a predetermined temperature, and/or to initiate a heating and/or cooling program based on stored heating and/or cooling algorithms. According to one embodiment, the temperature sensor 70 comprises at least one of a thermocouple and a resistance thermometer (RTD) capable of being placed in thermal contact with the bottom wall 312 of the container, such as for example by adhering the temperature sensor 70 to the bottom wall 312 with a thermally conducting cement.

In the embodiment as shown in FIGS. 24A-24B, the temperature sensor 70 is located below a bottom wall 312 of the container 7, and is disposed radially internally to a heating element 7 comprising an annular heating ring that also is disposed below the bottom wall 312 of the container. Furthermore, according to certain embodiments, the temperature sensor 70 can be at least partially thermally shielded from the heating element 8 by thermal shielding material 810 provided between the temperature sensor 70 and the heating element 8, for example such that the temperature detected by the temperature sensor 70 reflects the temperature of the container 7 and/or vaporizable product, as opposed to the temperature of the adjacent heating element. In the embodiment as shown, the bottom wall 312 of the container 7 comprises a compartment 812 for receiving the temperature sensor at the bottom surface 310, the compartment 812 comprising sidewalls 814 that thermally shield the temperature sensor from the heating element. The sidewalls 814 can comprise, for example, the same or different thermally shielding material as the container walls, and may be unitary with and/or separate from the bottom wall 312 of the container.

Figure 28:
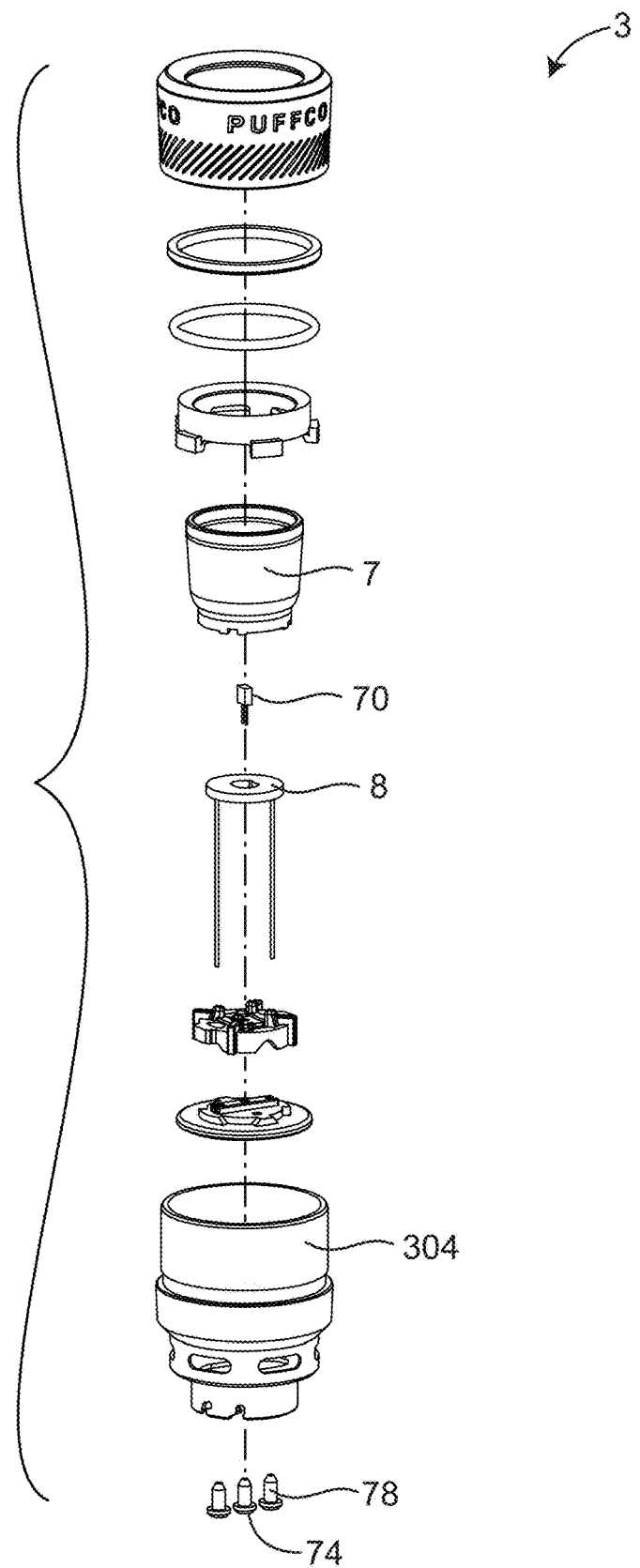
FIG. 28 is an exploded side view of an embodiment of an atomizer.
Figure 29A:
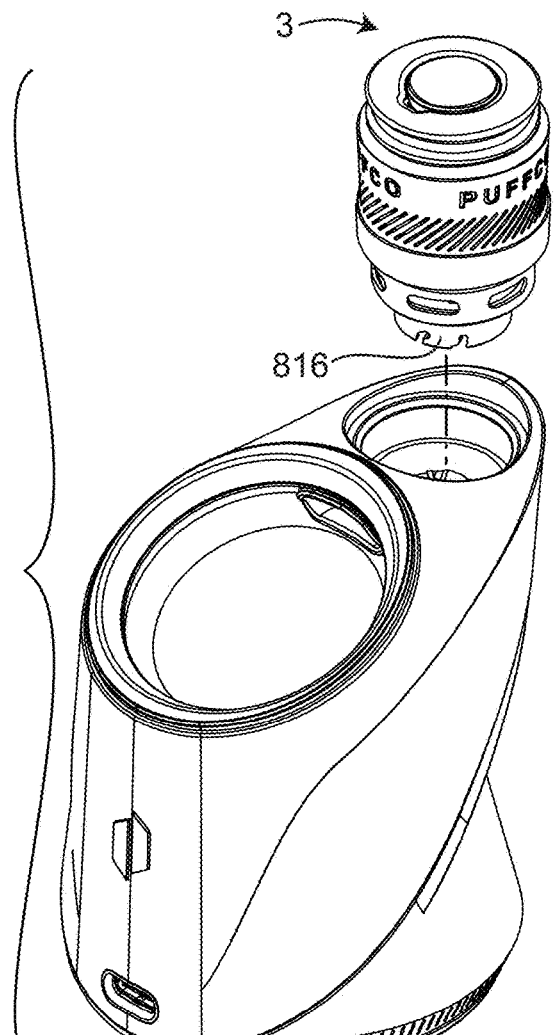
FIGS. 29A-29B are perspective views of embodiment of a base and atomizer with an engagement feature for a portable electronic vaporizing device.
Figure 29B:
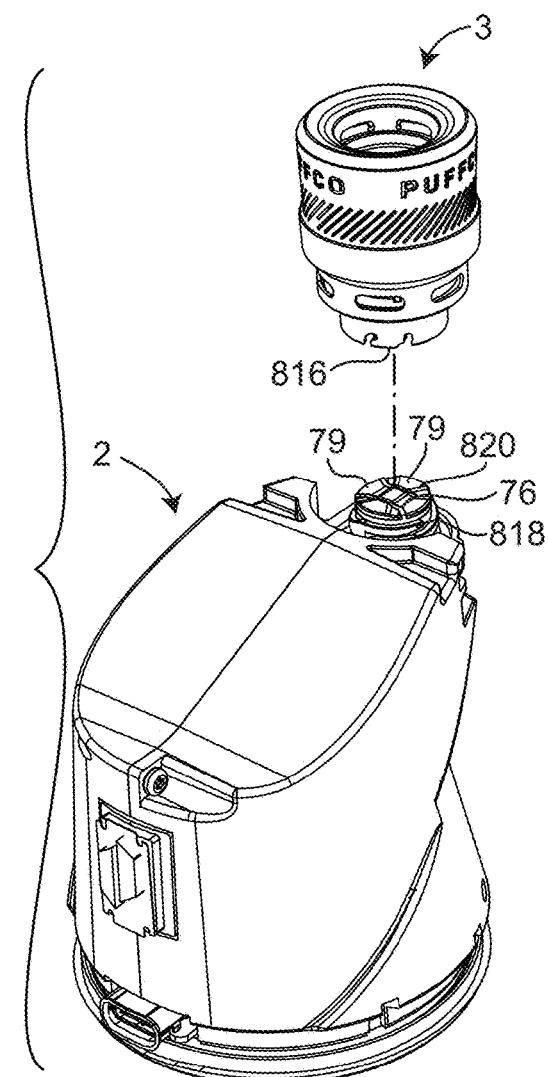
Figure 30A:
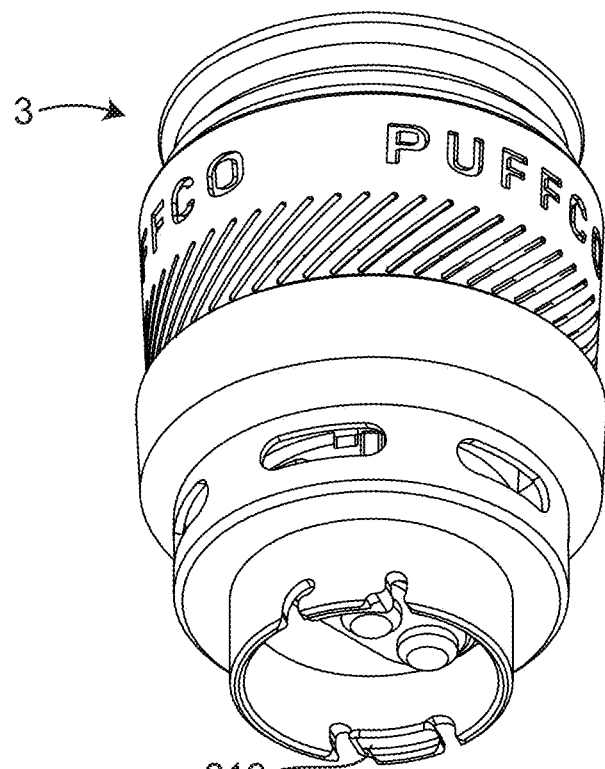
FIG. 30A is a perspective side view of an embodiments of an atomizer with an engagement feature.
Figure 30B:
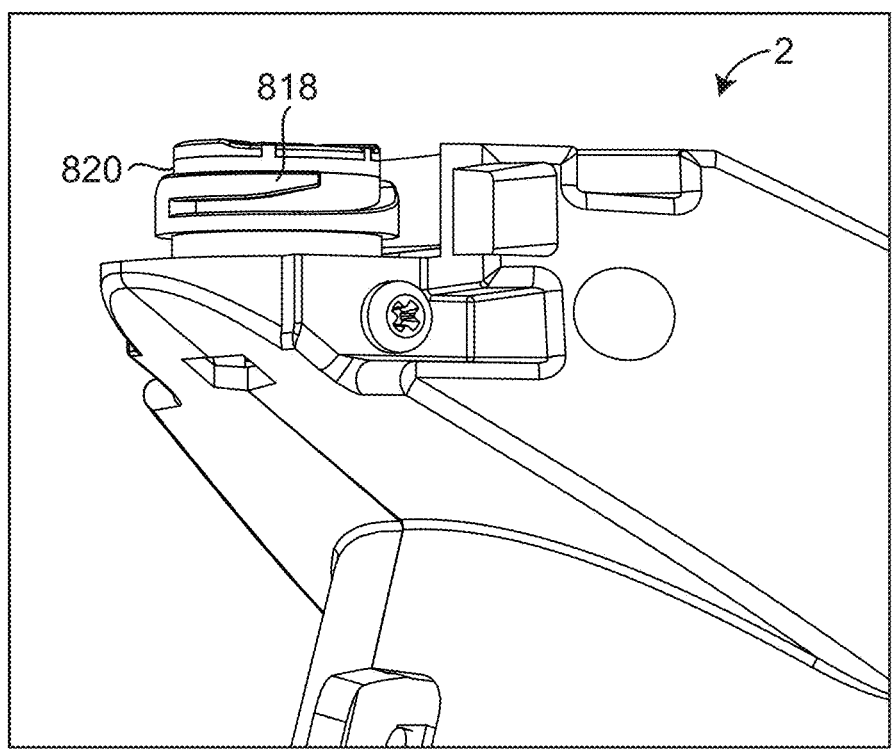
FIG. 30B is a schematic sectional view of an embodiment of a base with receiving feature.
Figure 31A:
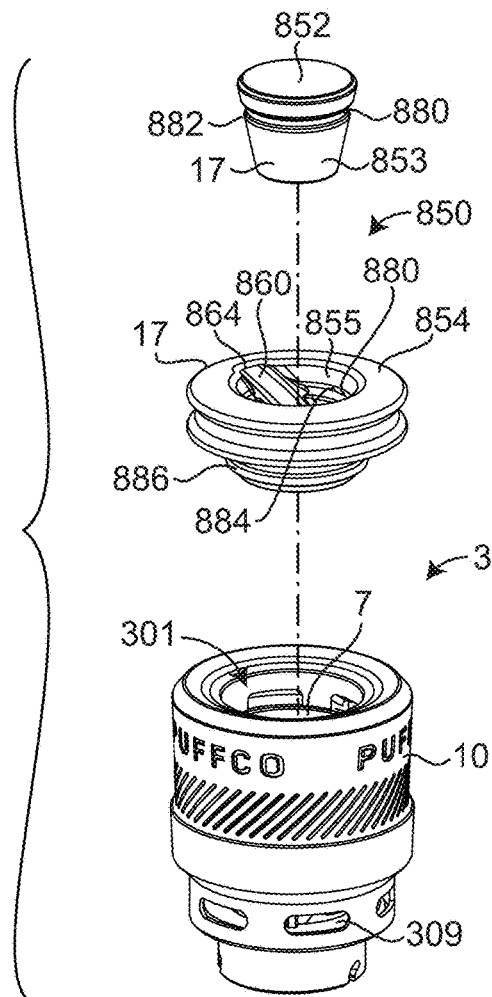
FIGS. 31A-31B are exploded side views of an embodiment of an atomizer and cap.
Figure 31B:
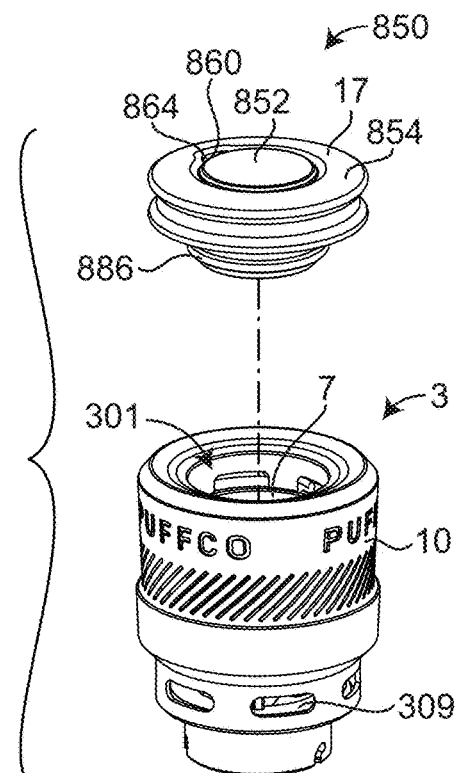
Figure 32A:
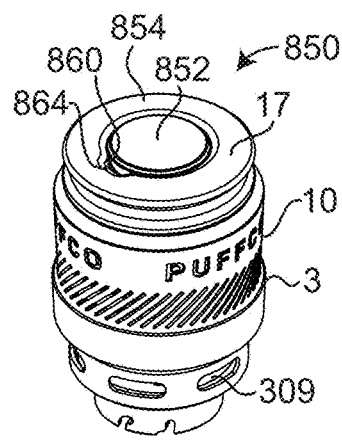
FIGS. 32A-32I are further views of an embodiment of an atomizer with cap.
Figure 32B:
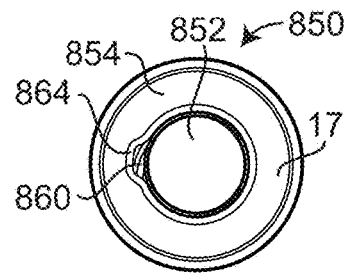
Figure 32C:
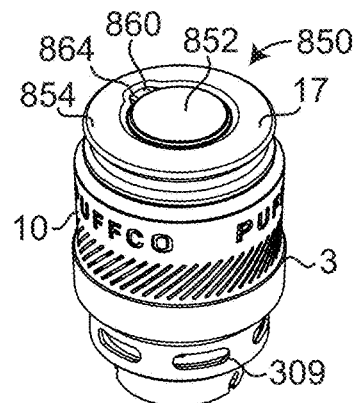
Figure 32D:
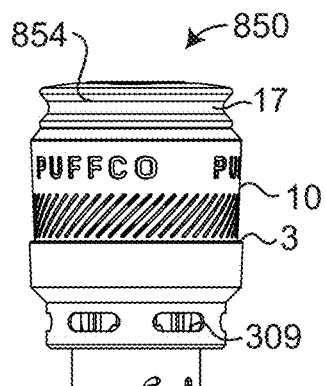
Figure 32E:
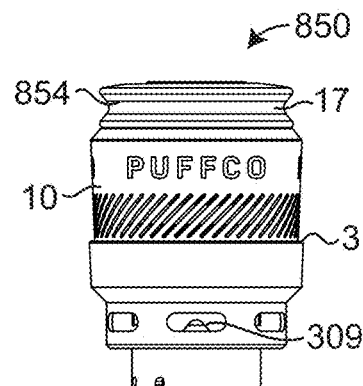
Figure 32F:
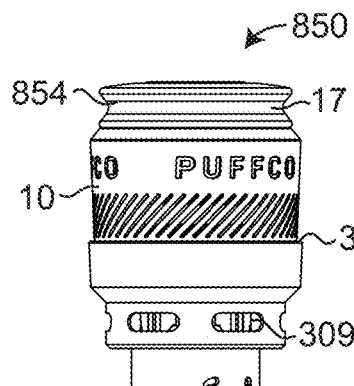
Figure 32G:
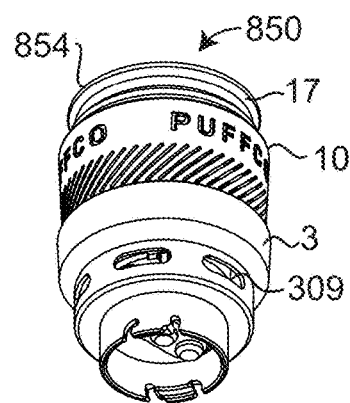
Figure 32H:
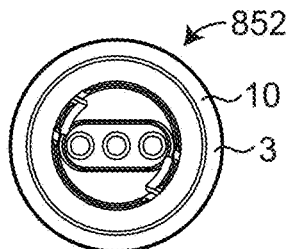
Figure 32I:
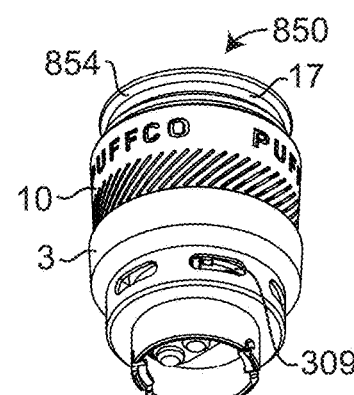
Figure 33A:
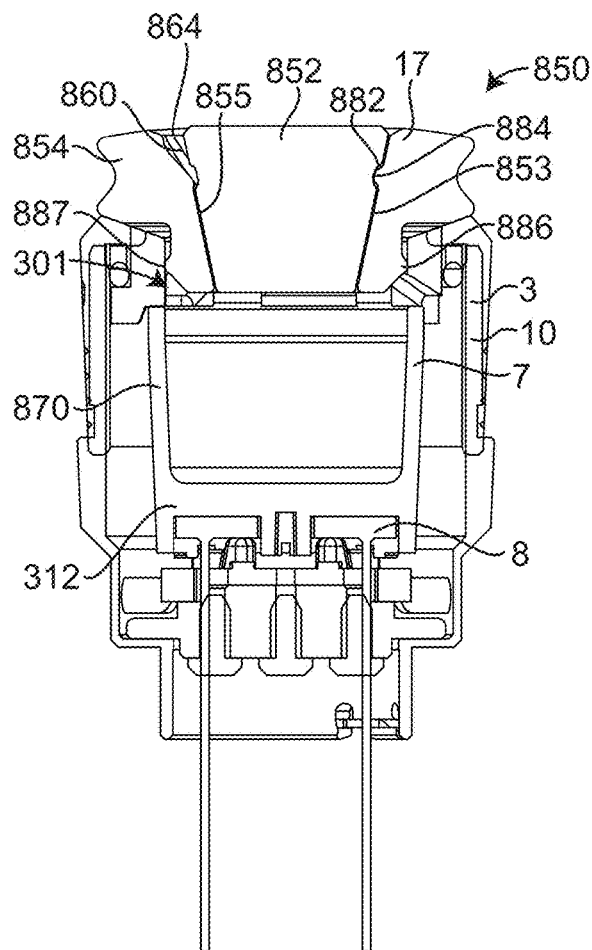
FIGS. 33A-33B are sectional schematic side views of an embodiment of an atomizer with cap, showing the cap rotated 180° C. between views.
Figure 33B:
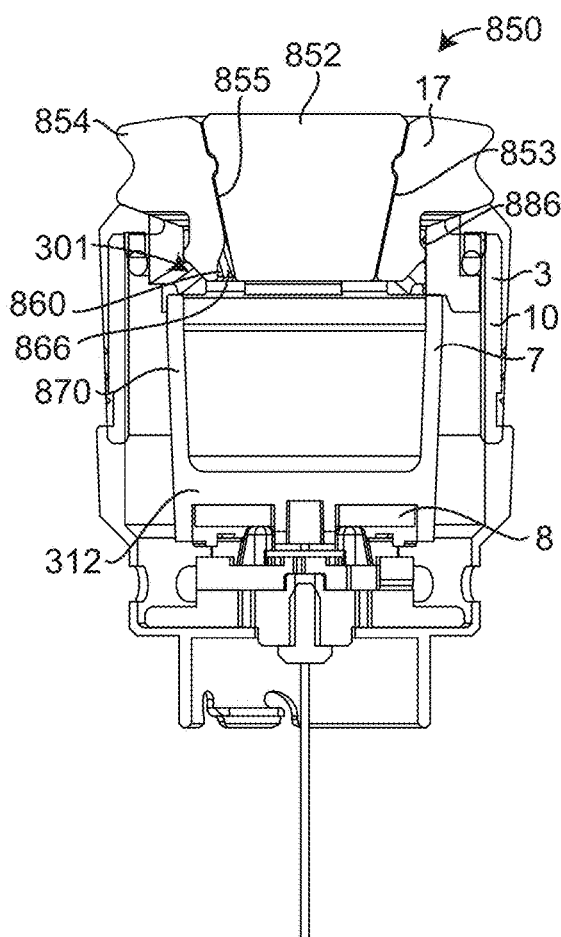
Figure 34A:
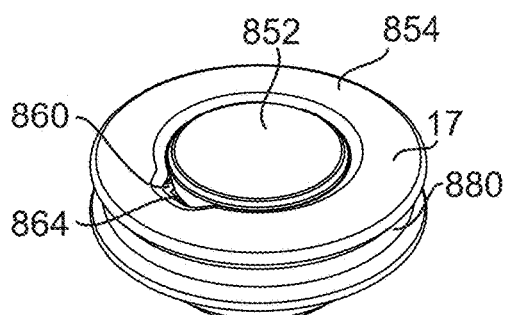
FIGS. 34A-34G are views of an embodiment of a cap.
Figure 34B:
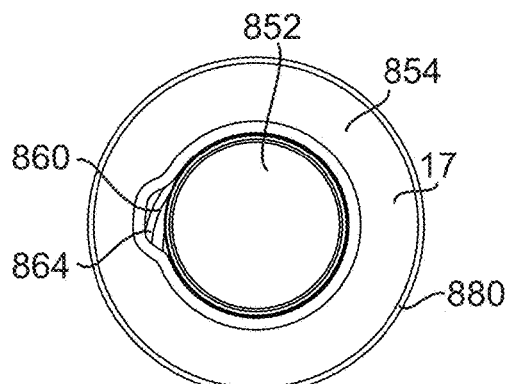
Figure 34C:
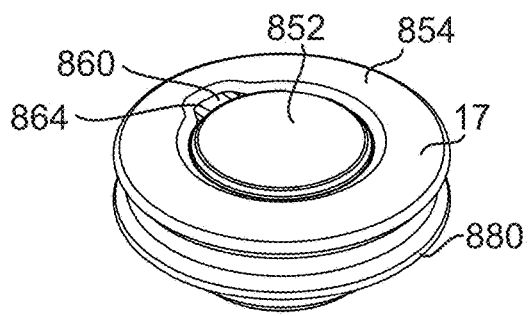
Figure 34D:
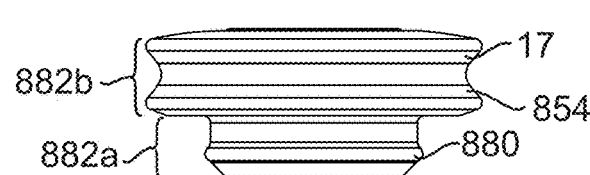
Figure 34E:
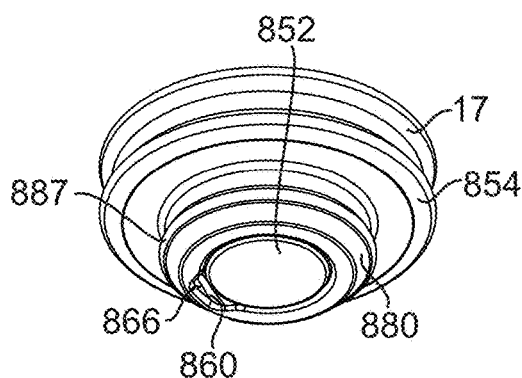
Figure 34F:
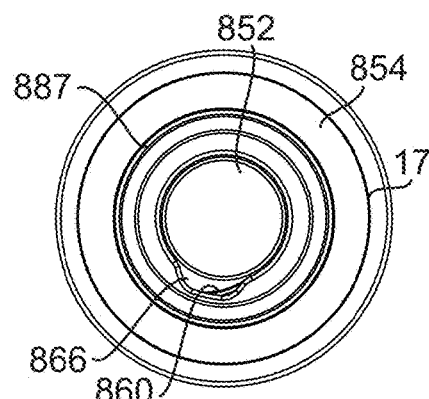
Figure 34G:
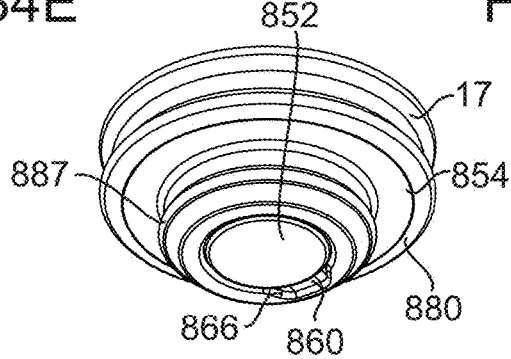
Figure 35A:
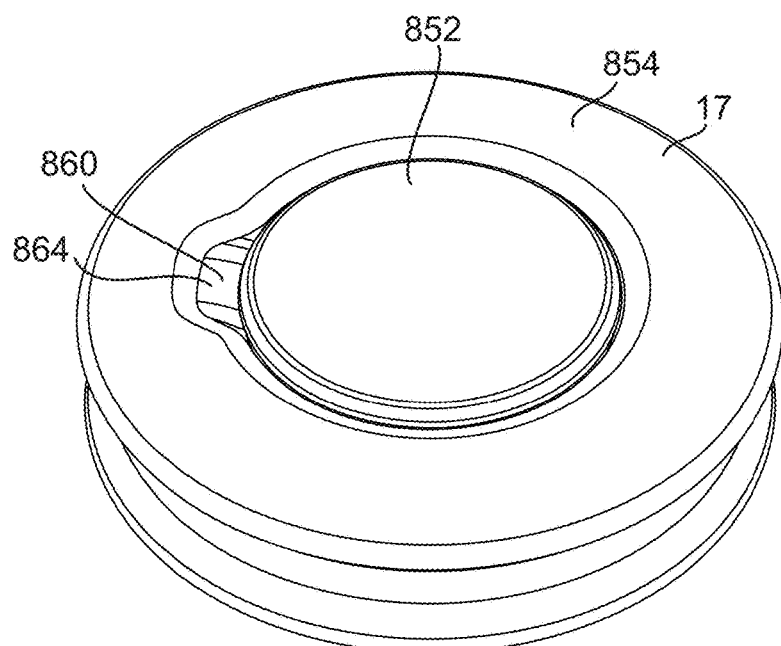
FIGS. 35A-35B are top and bottom perspective views of the cap of FIGS. 34A-34G.
Figure 35B:
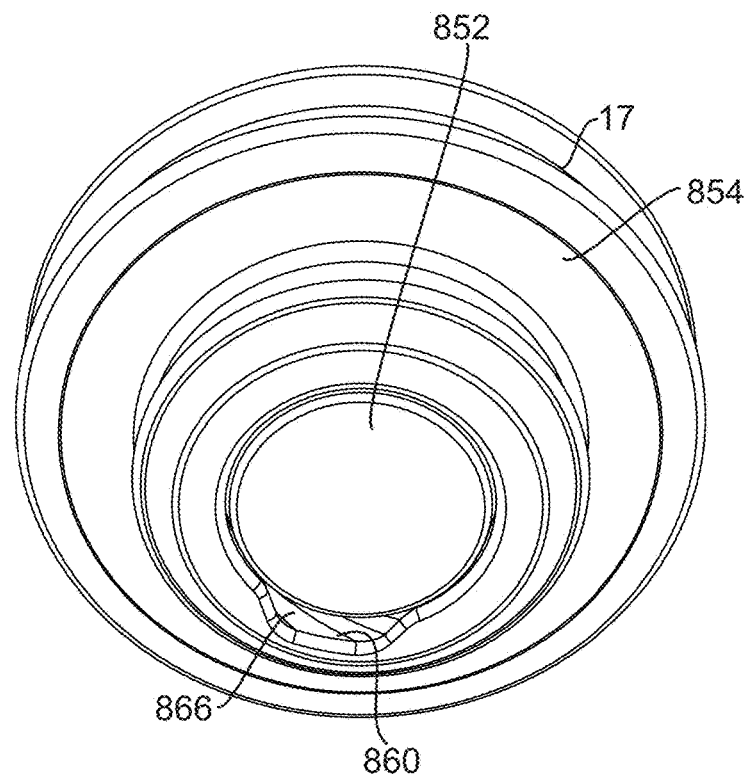

Referring to FIGS. 25A-25B, 26 and 27A-27B, in one embodiment, the temperature sensor 70 comprises at least one electrical lead 72 that terminates in one or more temperature sensor atomizer pins 74, which is in turn configured to electrically connect to one or more temperature sensor receiving pins 76 located in the first recessed region 203a of the base that is configured to receive the atomizer 8. The connection between the pins 74, 76 allows for electrical signals to be provided in relation to the detected temperature to the heating controller 58. According to yet another embodiment, the atomizer pin(s) 74 are detachable from the receiving pins 76, such that the temperature sensor 70 is removable with the atomizer 8 when the atomizer is removed from the base. Furthermore, in certain embodiments the container 7 may be fixed within the atomizer 8 (e.g. is affixed within the atomizer such that it is not readily removable), for example such that the temperature sensor 70 can be maintained in relationship to the bottom wall of the container even when the atomizer is removed from the base. According to yet another embodiment, the heating element 8 comprises at least one electrical lead 77 that terminates in a heating element atomizer pin 78 configured to electrically connect to a heating element receiving pin 79 located in the first recessed region 203a of the base that is configured to receive the atomizer 8. The connection between the pins 78, 79 can allow for a current to be received for heating the heating element in response to control by the heating controller 58. As with the temperature sensor 70, the heater atomizer pin(s) 78 are detachable from the heater receiving pins 79, such that the heating element 8 is removable with the atomizer 8 when the atomizer is removed from the base. According to certain embodiments, one or more, and even all, of the heating element atomizer pin 78, heating element receiving pin 79, temperature sensor atomizer pin 74, and temperature sensor receiving pin 76 are configured to be placed in respective electrical connection with one another via connection of the atomizer 8 to the base (e.g. connection of the atomizer 8 to the base in the first recessed region 203a of the case. FIG. 28 further depicts an embodiment of the atomizer 8 in an exploded view form, having the temperature sensor 70, heating element 9, and electrical connection pins.

Referring to FIGS. 29A-29B, and 30A-30B, according to one embodiment, the atomizer 8 comprises an engagement feature 816 configured to engage a receiving feature 818 located in the first recessed region 203a of the base 2, such as on a threading block 820. For example, the engagement feature 816 may engage the receiving feature 818 by rotation of the atomizer with respect to the receiving feature 818. The engagement feature and receiving feature may further configured with respect to the pins 76, 74, 78 and 79, such that the heating element and temperature sensor pins in the atomizer are aligned and in electrical communication with their respective pins in recessed region 203a of the base (e.g., on a top surface of the threading block 820), when the engagement feature and receiving feature are engaged. For example, they may be aligned such that by rotation of the atomizer to engage the engagement feature with the receiving feature, the pins are brought into and held in alignment with each other to provide electrical connection therebetween. In one embodiment, the engagement feature and receiving feature comprise a bayonet locking mechanism to engage the atomizer within the first recessed region of the base in a configuration where the heating element and temperature sensor pins in the atomizer are aligned and in electrical communication with their respective pins in the first recessed region. In the bayonet locking mechanism, slots on either of the atomizer or threading block engage a protrusion on the other of the atomizer or threading block, such that rotation creates engagement between the two components that can be released by rotation in the opposite direction. The atomizer 8 can thus, according to certain embodiments, be securely but detachably attached to the base 2, while also providing for good electrical connection of the temperature sensor 70 and heating element 8.

According to yet another embodiment, an atomizer assembly 850 is provided for the portable electronic vaporizing device 1, as shown for example in FIGS. 31A-31B, FIGS. 32A-32I, and FIGS. 33A-33B. The atomizer 8 can comprise any of the atomizer embodiments described herein, or any other suitable atomizers. According to certain embodiments, the atomizer 8 can generally comprise an atomizer housing 10 configured to accommodate a container 7 therein, the container 7 being capable of holding a vaporizable product. The atomizer 8 can further comprise an atomizer inlet 301 configured to receive a flow of gas into the atomizer housing 10, such as into the container 7 held in the atomizer housing 10. The atomizer 8 can further comprise the heating element 8 that is capable of heating the vaporizable product held in the container. According to the embodiment as shown, the atomizer further comprises one or more atomizer outlets 309 capable of exhausting the flow of gas having vaporizable product therein from the atomizer.

According to certain embodiments, the atomizer assembly 850 or other vaporization assembly 300 further comprises a cap 17 (e.g. carb cap) that is configured to releasably cover the atomizer inlet 301 or other inlet to a vaporization assembly. According to certain embodiments, the cap 17 can comprise a multi-part piece, at least a portion of which is fitted in the atomizer inlet 301 to releasably cover the inlet. In one embodiment, the cap 17 comprises a first inner cap portion 852 comprising an outer sidewall 853, and a second outer cap portion 854 comprising an inner sidewall 855 that at least partly circumferentially surrounds the outer sidewall 853 of the inner cap portion 852. The cap 17 further comprises at least one channel 860 formed in between the first inner cap portion 852 and the second outer cap portion 854, the channel 860 having first and second opposing ends 862a,862b (see, e.g., FIG. 36). According to certain embodiments, the cap 17 comprises a cap inlet 864 configured to flow gas into the first end 862a of the channel 860, and comprises a cap outlet 866 to configured to exhaust gas from the second end 862b of the channel 860. Accordingly, in certain embodiments herein, the cap is configured to flow gas therethrough from the cap inlet to the cap outlet via the channel, to introduce gas into the atomizer, when the cap is positioned to cover the atomizer inlet or inlet of another vaporization assembly 300. FIGS. 34A-36G, 35A-35B, 36, and 37A-37B depict further embodiments of the multi-part cap 17 having the channel 860 formed therein.

Figure 36:
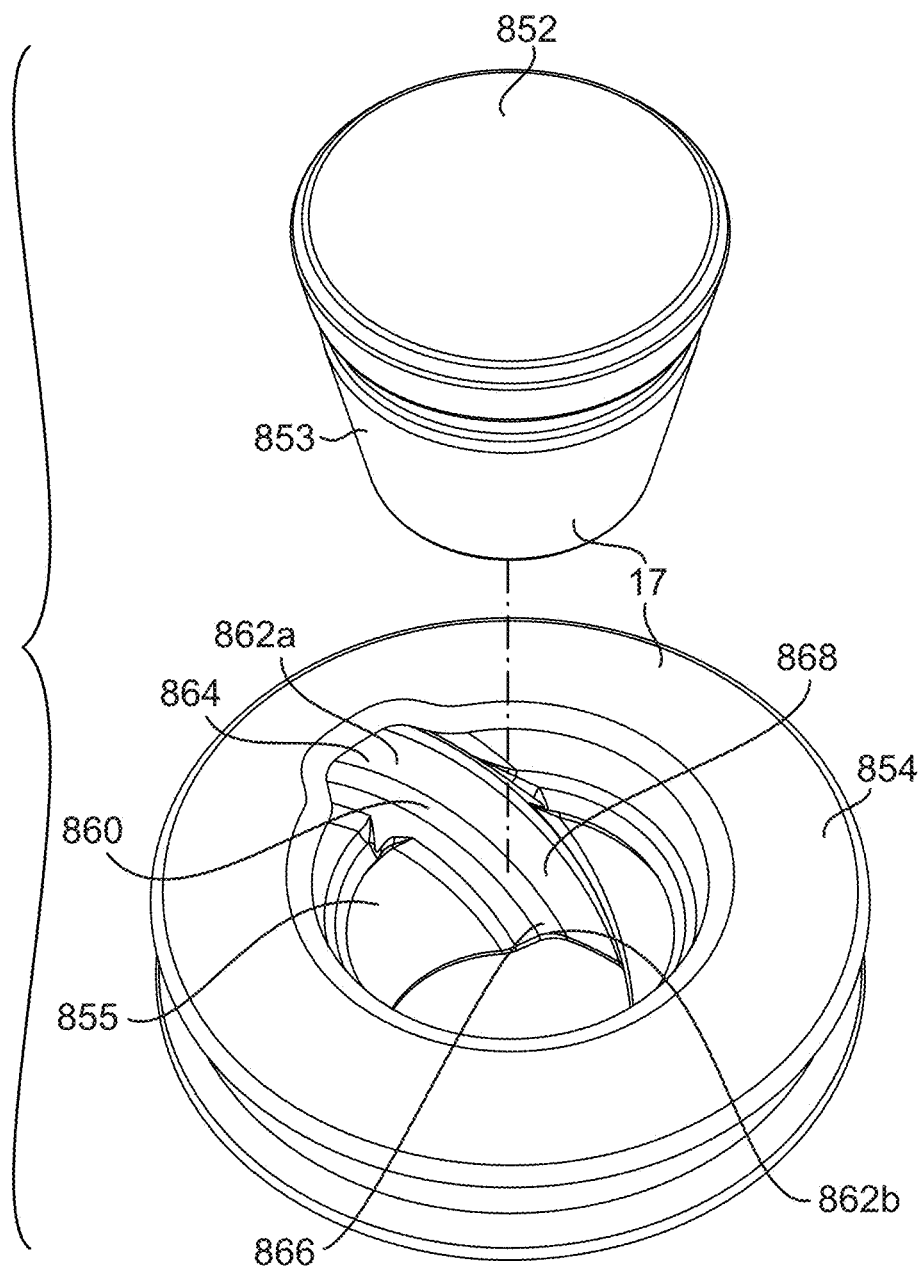
FIG. 36 is an exploded side view of an embodiment of a cap with inner and outer cap portions.
Figure 37A:
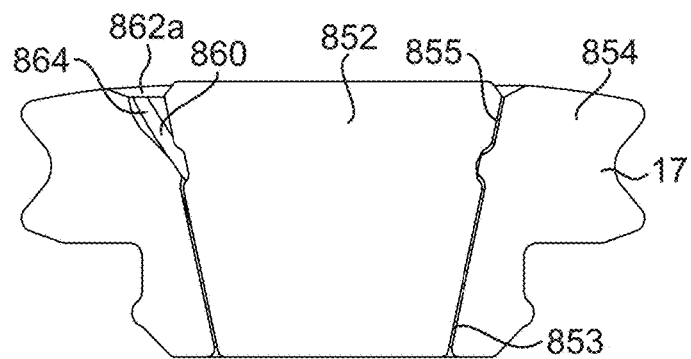
FIGS. 37A-37D are sectional side views of embodiments of a cap, with the cap rotated between views.
Figure 37B:
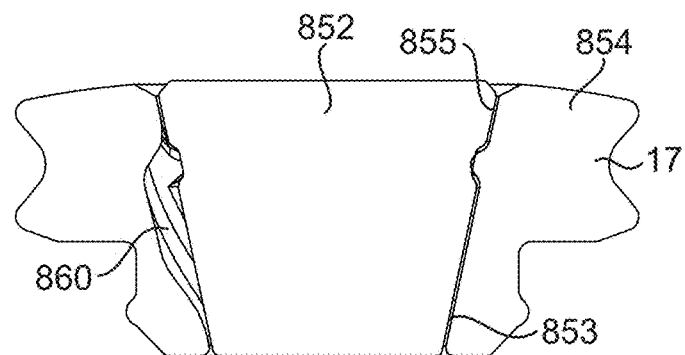
Figure 37C:
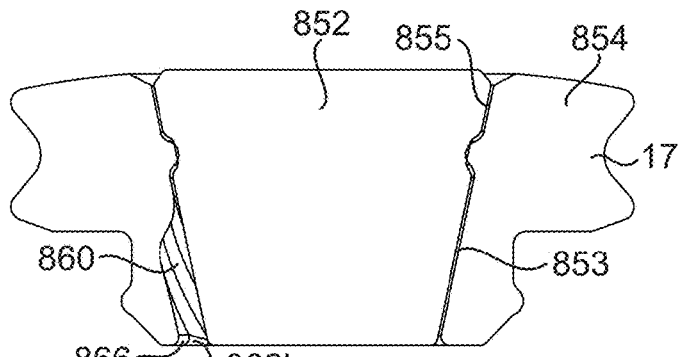
Figure 37D:
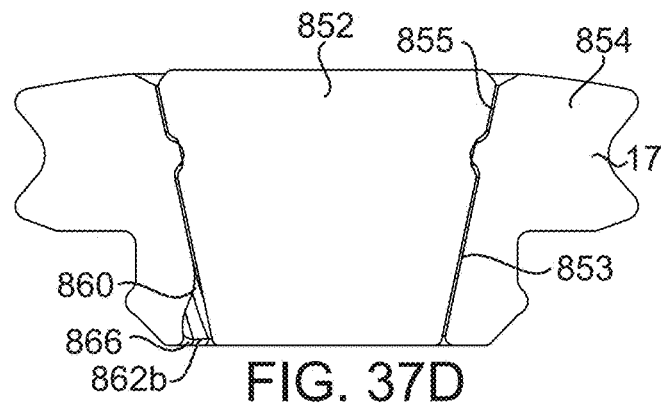

According to one embodiment, the outer sidewall 853 of the first inner cap portion 852 and the inner sidewall 855 of the second outer cap portion 854 together form channel sidewalls defining the channel 860. For example, as shown in FIG. 36, according to one embodiment the inner sidewall 855 of the second outer cap portion 854 comprises a groove 868 formed therein that forms at least a portion of the channel 8. As also shown in FIG. 36, according to one embodiment, the channel 860 can comprises an at least partly helical channel from the cap inlet 864 to the cap outlet 866. FIGS. 37A-37B further depict embodiments showing the cap 17 as rotated 90 degrees per figure, to show an example of a helical profile of the channel 860. The helical profile can be advantageous in terms of introduction of gas into the atomizer and/or container, in certain embodiments, for example by providing a semicircular and/or angled flow of gas into the atomizer and/or container with respect to the bottom of the container, that facilitates the entraining of vaporizable product therein, as opposed to a flow directed perpendicular to the bottom wall 312 of the container, which in certain cases can cause splattering of the product. For example, according to one embodiment, the channel 860 is configured to introduce gas towards a sidewall 870 of the container 7 accommodated in the atomizer housing, as opposed to directed in a perpendicular flow towards the bottom wall 312 of the container. Furthermore, according to one embodiment, the cap 17 can comprise one or a plurality of gas flow channels 860 formed between the first inner cap portion and second outer cap portion.

According to one embodiment, the first inner cap portion and second outer cap portion can be formed of different materials. For example, the second outer cap portion can be, in certain embodiments, be formed of a material that is more pliant and/or flexible than a material used to form the inner cap portion. The second outer cap portion may also be formed of a material that is capable of sealing to the internal sidewalls of the atomizer inlet, e.g. by friction, to releasably hold the cap over the inlet 130. In one embodiment, the second outer cap portion comprises at least one of plastic, rubber and silicone. In another embodiment, the first inner cap portion comprises at least one of glass, ceramic, metal plastic, rubber, silicone and wood. In yet another embodiment, the first inner cap portion comprises a material that is non-porous. In one embodiment, the first inner cap portion comprises a clear or translucent material that allows viewing of an interior of the atomizer and/or container when the cap is positioned to cover the atomizer inlet 103. In the embodiments depicted herein, each of the inner cap portion and outer cap portion respectively comprise single part formed of a single material (e.g., they are each respectively unitary pieces that together form the whole of the cap). However, in further embodiments, it may also be the case that one or more of the inner and outer cap portions are themselves formed of a plurality of portions. For example, the second outer-cap portion can be a multi-part portion, and/or the inner cap portion can be a multi-part portion, and or the inner and/or outer cap portions can comprise further features and/or decorations added thereto.

According to one embodiment, the second outer cap portion is located radially externally to the first inner cap portion, and surrounds a circumferential periphery of the first inner cap portion. According to another embodiment, the first inner cap portion and second outer cap portion are separable from one another, but may be held together by frictional forces between the outer sidewall of the first inner cap portion and the inner sidewall of the second outer cap portion. For example, the first inner cap portion and second outer cap portion may be separated from one another by pulling the first inner cap portion out of the second outer cap portion, for example to provide for cleaning or replacement of one or more of the cap portions. According to one embodiment, one or more of the first inner cap portion and second outer cap portion can comprise at least one feature 880 on a surface thereof to hold the first inner cap portion and second outer cap portion together. For example, referring to FIGS. 31A and 33A, in one embodiment the inner cap portion 852 comprises a groove 882 formed along the outer sidewall 853 thereof that engages with a rib 884 formed on the inner sidewall 855 of the outer cap portion to register a longitudinal position of the first inner cap portion with respect to the second outer cap portion. For example, the groove 882 and rib 884 may inhibit longitudinal movement of the inner cap portion with respect to the outer cap portion once the groove and rib are engaged, to retain the portions in engagement with one another until a user exerts sufficient force to disengage the inner and outer portions from one another.

According to yet another embodiment, the second outer cap portion can further comprise one or more sealing features 886 configured to engage with the atomizer housing 10 about the atomizer inlet 301 to releasable retain the cap 17 in the atomizer inlet 301. For example, according to certain embodiments, the second outer cap portion can comprise one or more ribs 887 about a circumference of an outer wall 880 of the second outer cap portion (see, e.g., FIG. 34E), to engage with the atomizer housing 10 about the atomizer inlet. In one embodiment, the second outer cap portion comprises a lower region 882*a* configured to be disposed within the atomizer inlet 301, and comprises an upper region 882*b* configured to rest on an upper surface of the atomizer housing 10, and wherein the lower region comprises one or more features 886 configured to engage with the atomizer inlet 301 and retain the cap in a covered position on the atomizer inlet (see, e.g., FIG. 34D).

According to further embodiments the atomizer assembly, vaporization assembly and/or cap may be used with any of the systems and/or portable electronic vaporizing devices described herein.

According to yet another embodiment, a method of use of the systems, portable vaporizing devices, wireless charging stations, and/or atomizer assemblies herein may be provided. For example, a method of use of a system, wireless charging station, portable electronic device and/or portable electronic vaporizing device can comprising positioning the base in the predetermined spatial relationship with respect to the wireless charging station to automatically initiate wireless charging of the device battery. According to yet another embodiment, a method can comprise removing the base from the wireless charging station to automatically initiate activation of a heating cycle of the portable electronic vaporizing device. Other methods of using the devices, systems and assemblies herein can also be provided.

What is claimed is:

1. A wireless charging station configured to charge an electronic device, the electronic device comprising a device battery for powering the electronic device, and a wireless charge receiving system configured to receive a wireless charge from the wireless charging station to charge the device battery, wherein
the wireless charging station comprises:
a wireless charge providing system configured to provide a wireless charge to the wireless charge receiving system of the electronic device;
a wireless charging station battery configured to provide power to the wireless charge providing system;
a wireless charging station sensor configured to detect a predetermined spatial relationship between the wireless charge receiving system of the electronic device and the wireless charge providing system of the wireless charging station; and
a wireless charging station controller configured to activate the wireless charge providing system to automatically initiate wireless charging to the wireless charge receiving system of the electronic device, in relation to detection of the predetermined spatial relationship between the wireless charge receiving system of the electronic device and the wireless charge providing system of the wireless charging station by the wireless charging station sensor.

2. The wireless charging station according to claim 1, wherein the electronic device comprises an electronic vaporizing device further comprising:
a vaporization assembly comprising:
a container to receive a vaporizable product; and
a heating device configured to transfer energy to the vaporizable product in the container to heat the vaporizable product and form a vapor therefrom;
a mouthpiece for receiving a flow of gas comprising the vaporizable product entrained therein from the vaporization assembly, the mouthpiece comprising an inhalation outlet through which the flow of gas having the vaporizable product therein can exit the electronic vaporizing device.

3. The wireless charging station according to claim 2, wherein the heating device of the electronic vaporizing device is capable of transferring energy to the vaporizable product via any one or more of resistive, conductive, convective and inductive heating.

4. The wireless charging station of claim 3, wherein the vaporization assembly comprises an atomizer, and wherein the heating device comprises a heating element that is capable of resistively heating the vaporizable product received in the atomizer.

5. The wireless charging station according to claim 1, wherein the electronic device comprises a docking region configured to dock with the wireless charging station, and the wireless charging station comprises a receiving body with a receiving region configured to receive the docking region of the electronic device,
wherein the wireless charging station sensor is configured to detect a predetermined spatial relationship between the docking region of the electronic device and the receiving region of the wireless charging station; and
the wireless charging station controller is configured to activate the wireless charge providing system to automatically initiate wireless charging to the wireless charge receiving system of the electronic device, in relation to detection of the predetermined spatial relationship between the docking region of the electronic device and the receiving region of the wireless charging station by the wireless charging station sensor.

6. The wireless charging station of claim 5, wherein the predetermined spatial relationship detected by the wireless charging station sensor comprises any one or more of (i) a distance from and/or configuration of the docking region of the electronic device with respect to the receiving region of the wireless charging station that is within predetermined limits, and (ii) a distance from and/or configuration of the wireless charge receiving system of the electronic device with respect to the wireless charge providing system of the wireless charging station that is within predetermined limits.

7. The wireless charging station of claim 5, wherein the predetermined spatial relationship detected by the wireless charging station sensor corresponds to docking of the docking region of the electronic device with the receiving region of the wireless charging station.

8. The wireless charging station of claim 5, wherein the predetermined spatial relationship detected by the wireless charging station sensor corresponds to a configuration of the docking region of the electronic device with respect to the receiving region of the wireless charging station, and/or a configuration of the wireless charge receiving system of the electronic device with respect to the wireless charge providing system of the wireless charging station, that permits wireless charging from the wireless charge providing system of the wireless charging station to the wireless charge receiving system of the electronic device.

9. The wireless charging station of claim 5, wherein the docking region of the electronic device is received on an upper surface of the wireless charging station.

10. The wireless charging station of claim 1, wherein the wireless charging station sensor comprises any one or more of a Hall effect sensor, an inductive sensor, a light detector, a pressure sensor, a reed switch, an infrared (IR) proximity sensor and near field communication (NFC) sensor.

11. The wireless charging station of claim 1, wherein the wireless charging station sensor comprises a Hall effect sensor, and wherein the electronic device further comprises a magnetic field generating element configured to be sensed by the Hall effect sensor, and wherein the predetermined spatial relationship is detected when the magnetic field generating element is brought within a detection range of the Hall effect sensor.

12. The wireless charging station of claim 5, wherein the wireless charging station sensor is capable of detecting the presence of the docking region of the electronic device on the upper surface of the wireless charging station.

13. The wireless charging station of claim 1, wherein the wireless charging station sensor uses less than 5 mA, less than 3 mA, less than 2 mA, less than 1.5 mA and/or less than 1 mA of power, for sensing the predetermined spatial relationship.

14. The wireless charging station of claim 1, wherein the wireless charging station controller is configured to activate the wireless charge providing system of the wireless charging station to automatically initiate wireless charging to the wireless charge receiving system of the electronic device, when the predetermined spatial relationship is detected.

15. The wireless charging station of claim 1, wherein the wireless charging station controller is configured to automatically initiate wireless charging immediately upon detection of the predetermined spatial relationship, or after a predetermined duration of time has passed following detection of the predetermined spatial relationship.

16. The wireless charging station of claim 1, wherein the wireless charging station controller is configured to automatically initiate wireless charging in relation to detection of the predetermined spatial relationship, without requiring input from a user of the wireless charging station.

17. The wireless charging station of claim 1, wherein the wireless charging station controller is configured to control the wireless charge providing system of the wireless charging station to cease wireless charging once a wireless charging end condition is met.

18. The wireless charging station of claim 17, wherein the wireless charging end condition corresponds to a predetermined wireless charging duration.

19. The wireless charging station of claim 17, wherein the wireless charging station sensor is configured to detect when the wireless charge receiving system and/or docking region of the electronic device has been moved with respect to the wireless charge providing system and/or receiving region of the wireless charging station such that they are no longer in the predetermined spatial relationship with respect to one another, and wherein the wireless charging end condition corresponds to detection of the end of the predetermined spatial relationship.

20. The wireless charging station of claim 1, wherein the wireless charging station sensor comprises a sensing device that is other than a device used as a part of the wireless charge providing system to provide the wireless charge.

21. The wireless charging station of claim 1, wherein the wireless charging station battery is capable of powering the wireless charging station sensor to detect the predetermined spatial relationship, without requiring connection to a power source external to the wireless charging station.

22. The wireless charging station of claim 5, wherein the receiving region of the wireless charging station is configured to receive the docking region of the electronic device in a predefined orientation of the docking region with respect to the receiving region.

23. The wireless charging station of claim 22, wherein the receiving region of the wireless charging station is configured to receive the docking region of the electronic device in a predefined orientation that facilitates detection by the wireless charging station sensor of the predetermined spatial relationship.

24. The wireless charging station of claim 23, wherein the wireless charging station sensor comprises a Hall effect sensor, and the docking region of the electronic device comprises a magnetic field generating element, and wherein the receiving region of the wireless charging station is configured to receive the docking region in an orientation such that the Hall effect sensor and magnetic field generating element are aligned with one another.

25. The wireless charging station of claim 22, wherein the wireless charging station comprises sidewalls that define the receiving region, the sidewalls being configured to accommodate the docking region of the electronic device in the predefined orientation, and the wireless charging station further comprises an aperture in the sidewalls that is configured to pass the docking region therethrough to be received by the receiving region.

26. The wireless charging station of claim 1, wherein the wireless charge providing system comprises at least one charging coil, and wherein the wireless charging station sensor comprises a second device other than the at least one charging coil that is capable of detecting the predetermined spatial relationship.

27. A method of using the wireless charging station of claim 1, comprising positioning the electronic device in the predetermined spatial relationship with respect to the wireless charging station to automatically initiate wireless charging of the device battery.

28. The wireless charging station of claim 1, wherein the electronic device is a portable electronic device.

* * * * *